United States Patent
Minowa

(10) Patent No.: US 8,593,801 B2
(45) Date of Patent: Nov. 26, 2013

(54) SLIDE MECHANISM AND PORTABLE COMMUNICATION TERMINAL PROVIDED WITH SAME, AND SLIDE MOVEMENT METHOD

(75) Inventor: Tomoji Minowa, Tokyo (JP)

(73) Assignee: NEC Corporation, Tokyo (JP)

( * ) Notice: Subject to any disclaimer, the term of this patent is extended or adjusted under 35 U.S.C. 154(b) by 354 days.

(21) Appl. No.: 13/057,840

(22) PCT Filed: Aug. 31, 2009

(86) PCT No.: PCT/JP2009/004272
§ 371 (c)(1),
(2), (4) Date: Feb. 7, 2011

(87) PCT Pub. No.: WO2010/023961
PCT Pub. Date: Mar. 4, 2010

(65) Prior Publication Data
US 2011/0141675 A1     Jun. 16, 2011

(30) Foreign Application Priority Data

Sep. 29, 2008 (JP) ................... P2008-222680
Mar. 19, 2009 (JP) ................... P2009-068724

(51) Int. Cl.
*G06F 1/16*     (2006.01)
(52) U.S. Cl.
USPC .............. 361/679.3; 361/679.55; 361/679.56; 455/575.1; 455/575.4; 379/433.12; 379/433.13
(58) Field of Classification Search
None
See application file for complete search history.

(56) References Cited

U.S. PATENT DOCUMENTS 7,529,571 B2 * 5/2009 Byun et al. ................. 455/575.4
7,885,693 B2 * 2/2011 Park et al. .................. 455/575.4

(Continued)

FOREIGN PATENT DOCUMENTS

| JP | 2005109971 A | 4/2005 |
| JP | 2006019925 A | 1/2006 |
| JP | 2008193519 A | 8/2008 |
| JP | 2008193523 A | 8/2008 |

OTHER PUBLICATIONS

International Search Report for PCT/JP2009/004272 mailed Oct. 27, 2009.

*Primary Examiner* — Anthony Q Edwards

(57) ABSTRACT

A slide mechanism of the present invention is provided between a first casing section and a second casing section arranged so that one surfaces thereof face each other, and is capable of, with respect to the first casing section, relatively moving the second casing section, on the one surface of the first casing section, from a basic position. The slide mechanism includes: a first slit which extends along a predetermined linear movement direction on the one surface of the first casing section; a second slit which extends in parallel with the first slit on the one surface of the first casing section; a third slit which extends on the one surface of the second casing section so as to correspond to the first slit; a fourth slit which extends on the one surface of the second casing section so as to correspond to the second slit; a first support shaft which is inserted in the first slit and the third slit, is rotatable about its axis with respect to at least either one of the first slit and the third slit, and is movable along the first slit and the third slit; and a second support shaft which is inserted in the second slit and the fourth slit, is rotatable about its axis with respect to at least either one of the second slit and the fourth slit, and is movable along the second slit and the fourth slit.

13 Claims, 98 Drawing Sheets

(56) References Cited

U.S. PATENT DOCUMENTS

| | | | |
|---|---|---|---|
| 8,155,718 B2* | 4/2012 | Byun et al. | 455/575.4 |
| 8,352,001 B2* | 1/2013 | Iwaki | 455/575.4 |
| 2005/0255897 A1* | 11/2005 | Lee et al. | 455/575.4 |
| 2007/0293283 A1* | 12/2007 | Inubushi et al. | 455/575.1 |
| 2008/0207272 A1* | 8/2008 | Thornton et al. | 455/566 |
| 2009/0298560 A1* | 12/2009 | Saitoh | 455/575.4 |

* cited by examiner

SLIDE MECHANISM AND PORTABLE COMMUNICATION TERMINAL PROVIDED WITH SAME, AND SLIDE MOVEMENT METHOD

The present application is the National Phase of PCT/JP2009/004272, filed Aug. 31, 2009, which claims priority on Japanese Patent Application No. 2008-222680, filed Aug. 29, 2008, and Japanese Patent Application No. 2009-068724, filed Mar. 19, 2009, the contents of which are incorporated herein by reference.

TECHNICAL FIELD

The present invention relates to a slide mechanism which connects two casings while allowing them to move relative to each other, and a portable communication terminal provided therewith, and a slide movement method.

BACKGROUND ART

Heretofore, multi-functionality has been achieved in portable communication terminals which perform transmission/reception of various types of data by means of wireless transmission/reception. A portable communication terminal is capable of performing, in addition to telephone transmission/reception and email transmission/reception, video telephoning, reception of television broadcasting, and referencing a website. In order to perform superior display of received image and text data, it is preferable that this type of a multi-functional portable communication terminal is provided with a display screen section having a larger screen.

However, if the display screen section and operation section are made large, the entire device becomes larger in the meantime, and this is not preferable in terms of maintaining superior portability as a portable communication terminal.

For this reason, heretofore, there have been proposed slide type and rotation type portable communication terminals in order to achieve an increase in the size of the display screen section and operation section while minimizing the size of the entire device. A slide type portable communication terminal is configured such that an operation section and a display screen section are separately provided on a pair of casings, and these respective casings are attached in a slide mechanism so as to be able to slide on each other. A rotation type portable communication terminal is configured such that respective casings are attached so that they can be operated to rotate mutually.

Some of the above types of multi-functional portable communication terminals have functions for viewing television broadcasting and referencing a website, for which a landscape-oriented screen is originally intended. In these types of portable communication terminals, there is a strong demand for the display screen section to be a landscape-oriented screen when seen from a user, as with that of a television receiver or a personal computer. Moreover, in this type of case, the operation section positioned on the lower side of the center part of the display screen section when seen from the user, yields the highest level of usability for the user.

For this reason, there has heretofore been proposed a portable communication terminal in which first and second casing sections are mutually rotated by 90° from the initial state, and then the first and second casing sections are mutually slid, so that it can be operated in a state where the display screen section is a landscape-oriented screen when seen from the user and the operation section is positioned on the lower side of the center part of the display screen section when seen from the user (for example, refer to Patent Document 1).

The type of portable communication terminal described above, in which the display screen section is a landscape-oriented screen when seen from the user, and the operation section is positioned on the lower side of the center part of this display screen section, is required to allow selection of mainly the two following functions so that specifically the level of convenience in terminal operation will not be compromised. The first function is a conventional function for operating the terminal from a closed state, which is the initial state, to an open state, which is the state of normal use, where the display screen section is portrait-oriented when seen from the user. The second function is a function for operating the terminal from the closed state to an open state where the display screen section is a landscape-oriented screen when seen from the user, and the operation section is positioned on the lower side of the center part of the display screen section. These functions reduce an amount of time required for shifting to the open state which is suitable for a function required by the user.

PRIOR ART DOCUMENT

Patent Document

[Patent Document 1] Japanese Unexamined Patent Application, First Publication No. 2005-109971

SUMMARY OF THE INVENTION

Problem to be Solved by the Invention

However, according to the above slide mechanism, although the pair of casing sections can be relatively moved from the basic position to the position of a certain usage state, the casing sections cannot be brought to different use states. That is to say, in a case where this type of slide mechanism is applied to a portable communication terminal as described above for example, it is necessary, depending on the mechanism, to choose either use in which with respect to one of the casings having an operation section, the other casing having a display screen section is relatively moved without changing the orientation thereof, or use in which it is relatively rotated by 90 degrees to a landscape orientation. For this reason, despite the strong demand in recent years for multi-functionality in portable communication terminals, the level of operability suitable for respective functions has not been obtained. Moreover, in the above slide mechanism, in order to shift from a state where the one casing and the other casing are overlapped on each other, to a substantially T-shaped state as being in a specific usage state, it is necessary to perform a slide-rotation and then a linear movement. Consequently, a plurality of operations need to be performed when switching the usage state.

The present invention takes into consideration the above circumstances The present invention provides a slide mechanism, a portable communication terminal, and a slide movement method which can, with only a single operation, relatively slide-moving casing sections respectively from a position serving as a basic position to positions of different usage states.

Means for Solving the Problem

In order to solve the above problems, the present invention proposes following measures.

A slide mechanism is provided between a first casing section and a second casing section arranged so that one surfaces thereof face each other, and is capable of, with respect to the first casing section, relatively moving the second casing section, on the one surface of the first casing section, from a basic position, and the slide mechanism includes: a first slit which extends along a predetermined linear movement direction on the one surface of the first casing section; a second slit which extends in parallel with the first slit on the one surface of the first casing section; a third slit which extends on the one surface of the second casing section so as to correspond to the first slit; a fourth slit which extends on the one surface of the second casing section so as to correspond to the second slit: a first support shaft which is inserted in the first slit and the third slit, is rotatable about its axis with respect to at least either one of the first slit and the third slit, and is movable along the first slit and the third slit; and a second support shaft which is inserted in the second slit and the fourth slit, is rotatable about its axis with respect to at least either one of the second slit and the fourth slit, and is movable along the second slit and the fourth slit.

Moreover, a slide move method of the present invention is such that: a second casing section, which is arranged with respect to a first casing section so that one surface thereof faces each other, can be relatively moved on the one surface of the first casing section from a basic position, and which can be relatively moved from the basic position in a predetermined linear movement direction; and further, at the basic position, the second casing section can be relatively rotated to one direction side of a rotational direction about a first support shaft serving as a predetermined rotational center on the one surface of the first casing section, and it can be relatively rotated about a second support shaft, which is in a position different from the first support shaft, to an other direction side, which is an opposite side of the one direction side of the rotational direction.

Effect of the Invention

The slide mechanism of the present invention includes the first slit, the second slit, the third slit, and the fourth slit, as well as the first support shaft and the second support shaft inserted therethrough. Therefore, according to the slide mechanism of the present invention, it is possible, with only a single operation, to relatively slide-move the casing sections respectively from a position serving as the basic position to positions of different usage states, namely, a usage position, to which it has been relatively moved along the movement direction, and a usage position, to which it has been relatively rotated.

Furthermore, according to the slide movement method of the present invention, it is possible, with only a single operation, to relatively slide-move the casing sections respectively from a position serving as the basic position to positions of different usage states, namely, a usage position, to which it has been relatively moved along the movement direction, and a usage position, to which it has been relatively rotated.

EMBODIMENT FOR CARRYING OUT THE INVENTION

First Exemplary Embodiment

A first exemplary embodiment according to the present invention is described, with reference to FIG. 1 to FIG. 21.

Figure 1:
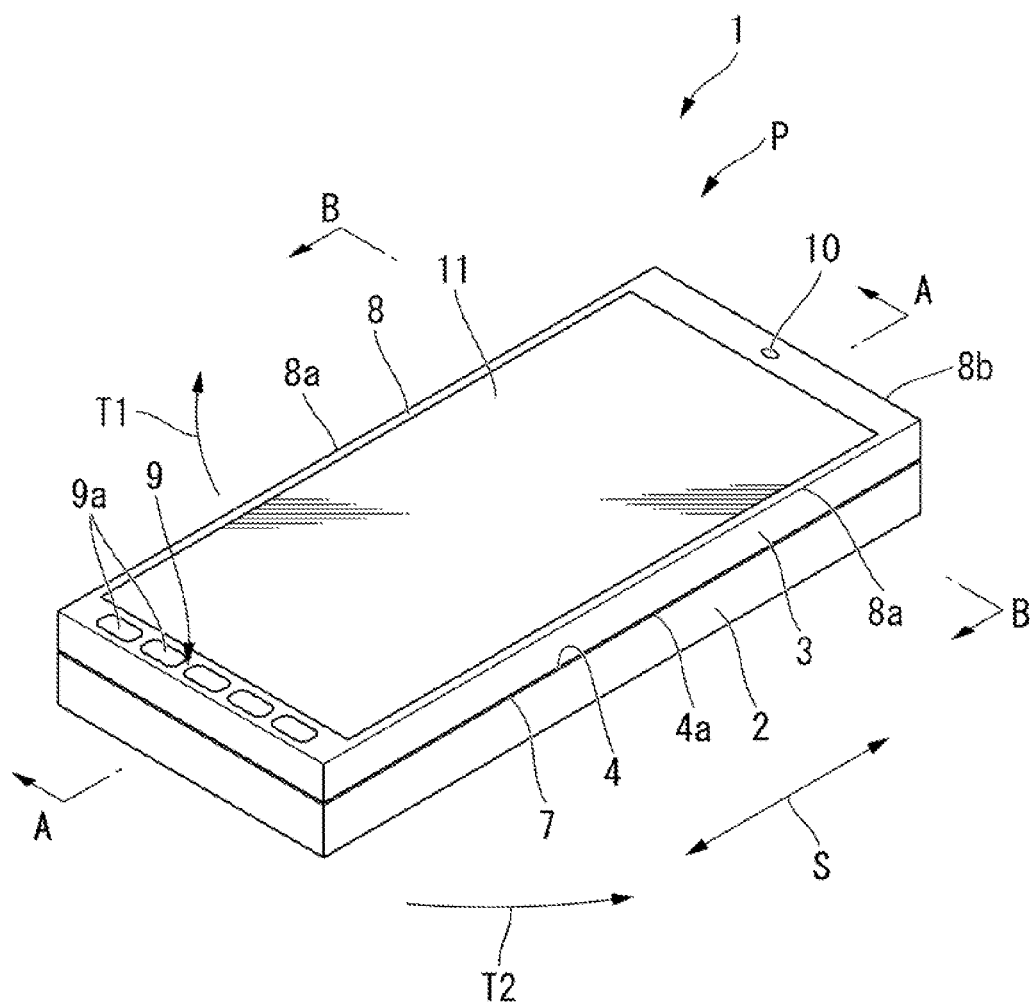
FIG. 1 is an overall view of a portable terminal of a first exemplary embodiment of the present invention in a state of being in a basic position.
Figure 5:
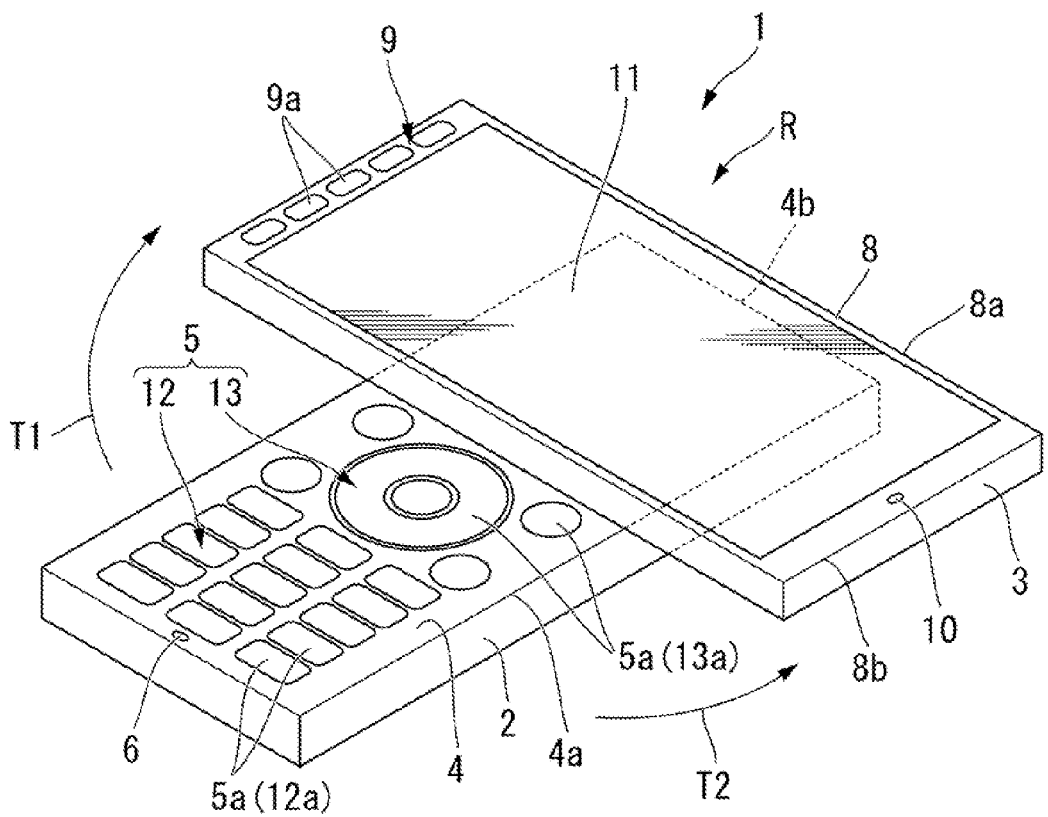
FIG. 5 is an overall view of the portable terminal of the first exemplary embodiment of the present invention in a state of being in the second usage position.
Figure 6:
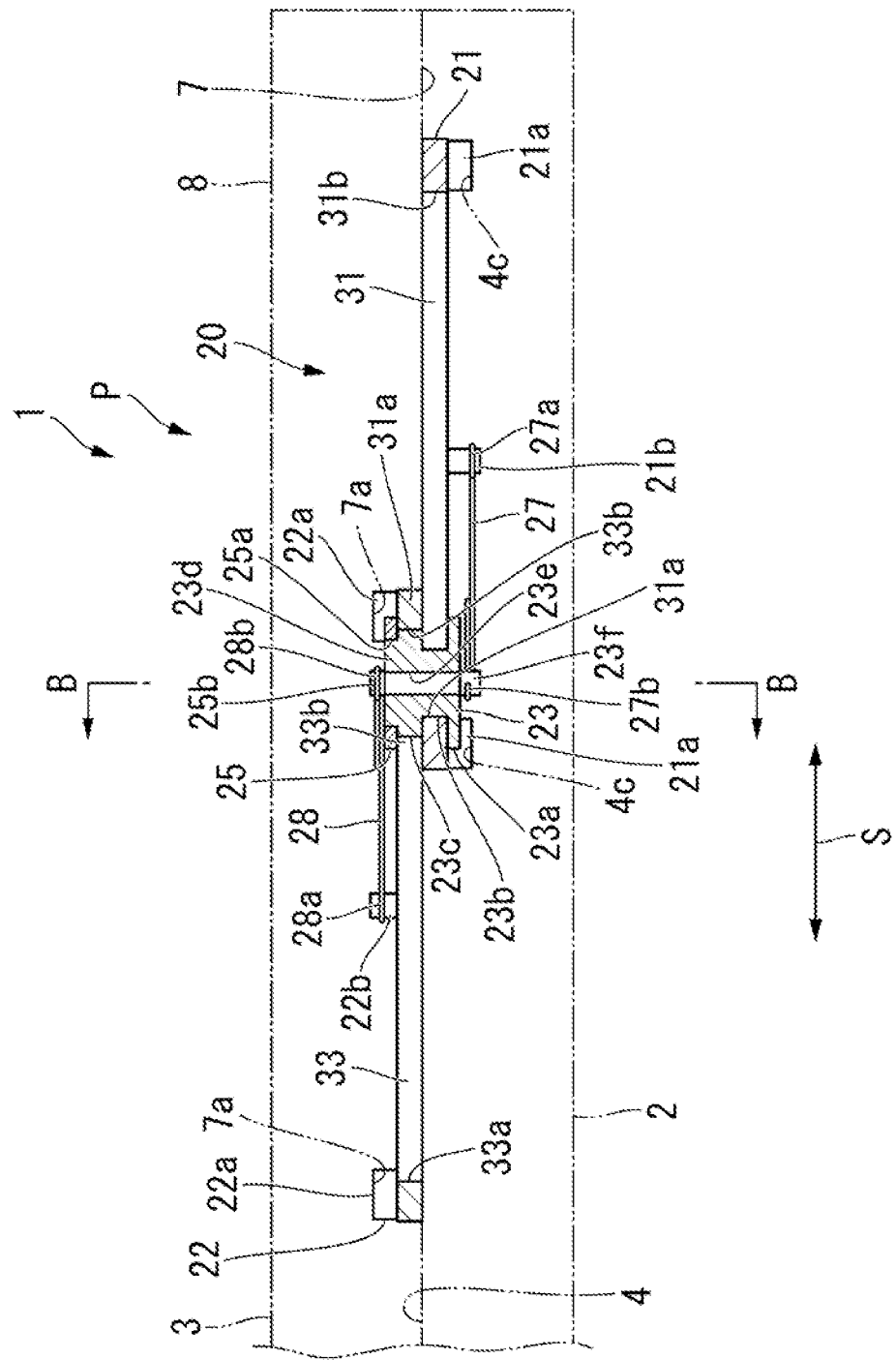
FIG. 6 is a cross-sectional view taken along the section line A-A in FIG. 1.
Figure 7:
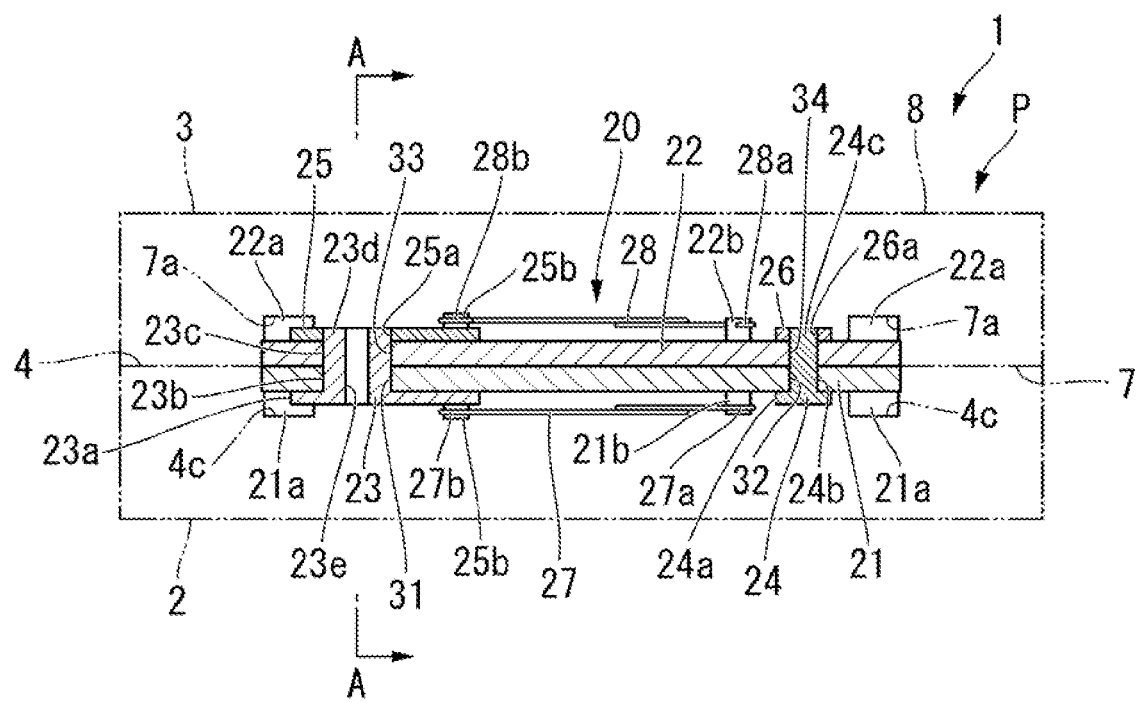
FIG. 7 is a cross-sectional view taken along the section line B-B in FIG. 6.

FIG. 1 to FIG. 7 show a portable terminal including a slide mechanism of the first exemplary embodiment. As shown in FIG. 1, FIG. 6, and FIG. 7, a portable terminal 1 of the present exemplary embodiment includes a first casing section 2, a second casing section 3, and a slide mechanism 20. The first casing section 2 and the second casing section 3 are arranged facing each other. The slide mechanism 20 is provided between the first casing section 2 and the second casing section 3, and the second casing section 3 is relatively slide-moved with respect to the first casing section 2. As shown in FIG. 1 to FIG. 5, the first casing section 2 is formed in a thin flat rectangular solid shape, and a rectangular surface thereof facing the second casing section 3 is a first main surface 4. On the first main surface 4, in a range on one side in a direction along a long edge 4a, there are provided a first operation section 5 having various types of buttons 5a including numeric keys, and a microphone 6 which receives audio inputs. In the first casing section 2, as an internal constituent, there are built-in a substrate, which is connected to the various types of buttons 5a and the microphone 6 on the first operation section 5, and a battery serving as a power supply.

As shown in FIG. 1 to FIG. 5, the second casing section 3 in the present exemplary embodiment is formed in a thin flat rectangular solid shape, which is the same shape as that of the first casing section 2. A surface of the second casing section 3, which faces the same direction as the first main surface 4 of the first casing section 2, that is, a rectangular surface on the opposite side of a slide surface 7 facing the first main surface 4, is a second main surface 8. On the second main surface 8, on both ends in a direction along a long edge 8a, there are respectively provided a second operation section 9 having various types of buttons 9a such as menu keys, and a speaker 10. Furthermore, on the second main surface 8, in the entire portion excluding the second operation section 9 and the speaker 10 of the center in the direction along the long edge 8a, and in the entire portion in the direction along a short edge 8b, there is provided a rectangular display screen section 11 such as liquid crystal display. In the present exemplary embodiment, the second operation section 9 is secondary with respect to the first operation section 5. The second operation section 9 enables minimal operation of the portable terminal 1 when the first casing section 2 and the second casing section 3 are in a basic position P. Moreover, in the second casing section 3, as an internal constituent, there are built-in a substrate, to which the various types of buttons 9a of the second operation section 9 are connected or the speaker 10 is connected, and an internal structure of the display screen section 11. As described later, the internal constituent of the first casing section 2 and the internal constituent of the second casing section 3 are electrically connected to each other via a conductive wire (not shown in the figure) arranged inside the slide mechanism 20. Through this conductive wire, electric power is supplied from one casing to the other, or signal input/output is conducted from one casing to the other.

The slide mechanism 20 is provided between the first main surface 4 (one surface) of the first casing section 2 and the slide surface 7 (one surface) of the second casing section 3 which are facing each other. In the present exemplary embodiment, the portable terminal 1 is such that this slide mechanism 20 enables the first casing section 2 and the second casing section 3 to relatively move from the basic position P to a first usage position Q, to a second usage position R, and to a third usage position Q'. In the basic position P, the first casing section 2 and the second casing section 3 overlap on each other with no displacement between the first main surface 4 and the slide surface 7 as shown in FIG. 1. In the basic position P, the direction along the long edges 4a and 8a of the first casing section 2 and the second casing section 3 is referred to as a movement direction S (first movement direction S). More specifically, the first casing section 2 and the second casing section 3 are slid in this movement direction S, and can be set in the third usage position Q', which is an intermediate position shown in FIG. 2. Moreover, the first casing section 2 and the second casing section 3 are further slid in the movement direction S, and can be set in the first usage position Q to which they have slide-moved as shown in FIG. 3. Furthermore, from the basic position P, the second casing section 3 can be slide-rotated, with respect to the first casing section 2, about a predetermined position serving as a rotational center, to one direction side T1 of the rotational direction or to the other direction side T2 (to one direction side T1 of the rotational direction or to the other direction side T2) on the first main surface 4. For example, in the case where the second casing section 3 is rotated to the one direction side T1 with respect to the first casing section 2, the first casing section 2 and the second casing section 3 can be set, through the state shown in FIG. 4, to the second usage position R in which the directions along the long edges 4a and 8a are orthogonal to each other and the entirety thereof is of a substantially T shape as shown in FIG. 5. Also in the case where the second casing section 3 is rotated to the other direction side with respect to the first casing section 3, a similar result is yielded. In this case, the first casing section 2 and the second casing section 3 can be set in the second usage position R in which they are entirely in a substantially T shape, so that the position of the second operation section 9 is on the opposite side compared to the state shown in FIG. 5. Hereunder, the one direction side T1 of the rotational direction and the other direction side T2 refer to the directions in which the second casing section 3 rotates when the first main surface 4 of the first casing section 2 is seen from the front side.

In the present exemplary embodiment, as shown in FIG. 3, the first operation section 5 is provided on the first main surface 4 of the first casing section 2. On the first operation section 5, a first area 12 and a second area 13 are arranged in a direction along the long edge 4a. The first area 12 includes a plurality of buttons 12a such as numerical keys. The second area 13 includes a plurality of buttons 13a such as directional keys for different directions. In the third usage position Q' shown in FIG. 2, only the first area 12 of the first operation section 5 is set to be exposed. Further, in the first usage position Q' shown in FIG. 3, not only the first area 12 but also the second area 13 is set to be exposed.

Next, details of the slide mechanism 20 are described.

As shown in FIG. 6 to FIG. 9, the slide mechanism 20 of this exemplary embodiment includes a first slit member 21, a second slit member 22, a first support shaft 23, a second support shaft 24, a first engagement member 25, a second engagement member 26, a first spring member 27, and a second spring member 28.

As shown in FIG. 6 to FIG. 9, the first slit member 21 is a substantially rectangular plate-shaped member. The first slit member 21 is such that on the surface thereof facing the first main surface 4 of the first casing section 2, there are provided a plurality of projecting fixation sections 21a. In each of the fixation sections 21a, there is formed a female thread. The first slit member 21 is such that the fixation section 21a is fitted into a concave section 4c formed in the first main surface 4 of the first casing section 2, and a fixing screw, which is arranged inside the first casing section 2 and is not shown in the diagram, is screwed thereon, to thereby fix itself on the first main surface 4 of the first casing section 2. The second slit member 22 is similar to the first slit member 21. That is to say, the second slit member 22 is a substantially rectangular plate-shaped member. The second slit member 22 is such that on the surface thereof facing the slide surface 7 of the second casing section 3, there are provided a plurality of projecting fixation sections 22a. In each of the fixation sections 22a, there is formed a female thread. The second slit member 22 is such that the fixation section 22a is fitted into a concave section 7a formed in the slide surface 7 of the second casing section 3, and a fixing screw, which is arranged inside the second casing section 3 and is not shown in the diagram, is screwed thereon, to thereby fix itself on the slide surface 7 of the second casing section 3.

Figure 8:
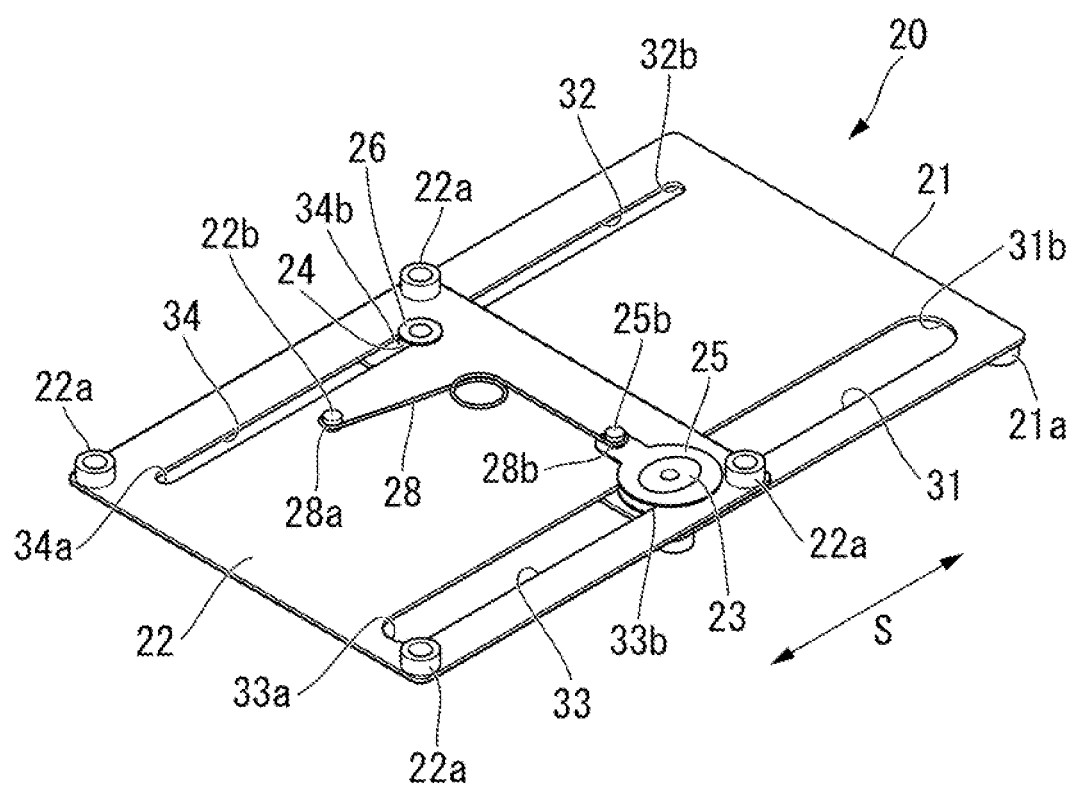
FIG. 8 is a perspective view of a slide mechanism of the first exemplary embodiment of the present invention in a state of being in the basic position.
Figure 9:
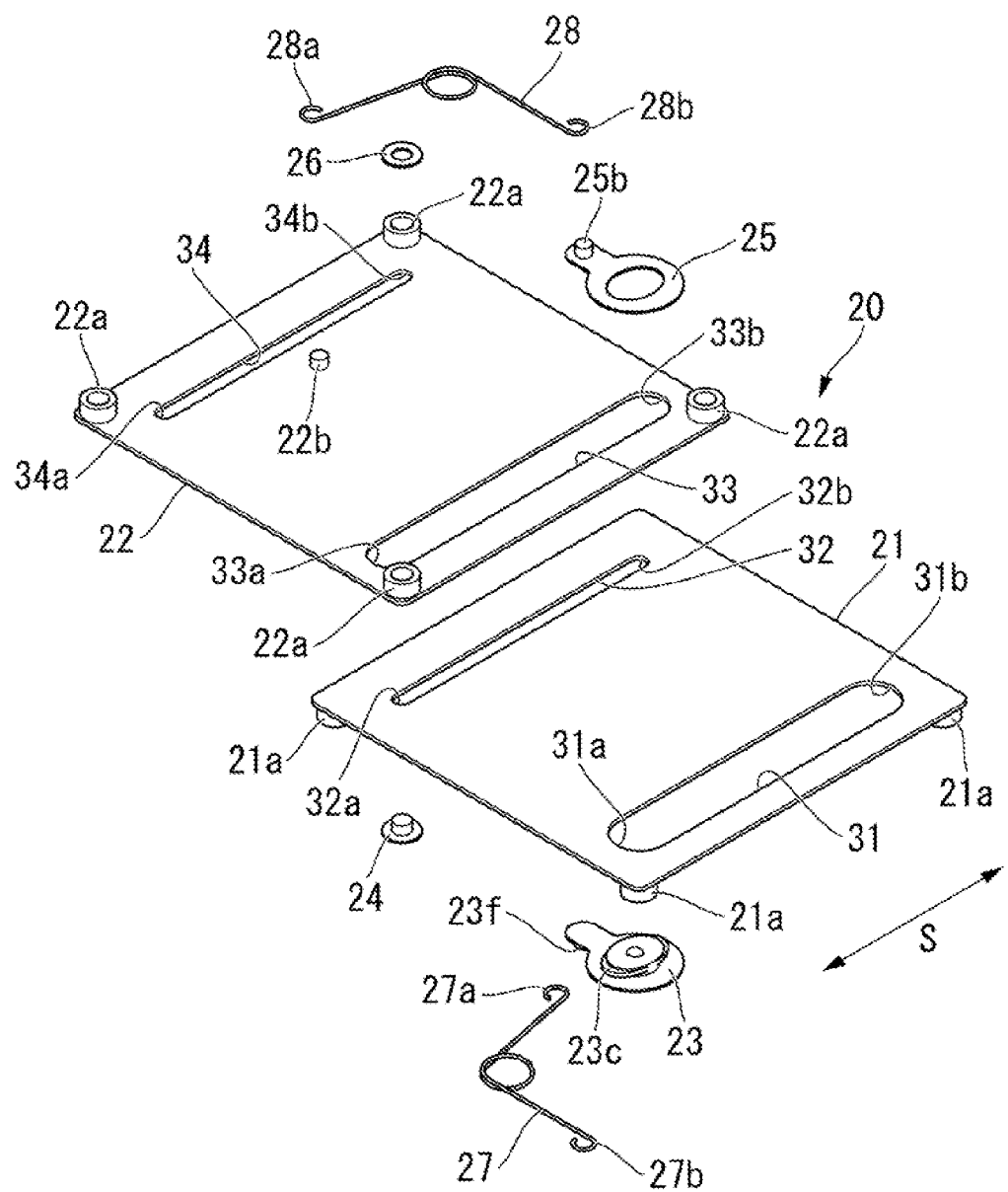
FIG. 9 is an exploded perspective view of the slide mechanism of the first exemplary embodiment of the present invention.

As shown in FIG. 7 and FIG. 8, in the first slit member 21, there are formed a first slit 31 and a second slit 32 which respectively pass therethrough to both sides. The first slit 31 and the second slit 32 respectively pass through to both sides of the first slit member 21, and they are parallel to each other. In the second slit member 22, there are formed a third slit 33 and a fourth slit 34 which respectively pass therethrough to both sides. The third slit 33 and the fourth slit 34 respectively pass through to both sides of the second slit member 22, and they are parallel to each other. The first slit 31 and the third slit 33 correspond to each other, and each has the same width. In the state where the first casing section 2 and the second casing section 3 are in the basic position P, the first slit 31 and the third slit 33 are communicated through slit ends 31a and 33b. Furthermore, the first slit 31 and the third slit 33 respectively extend from the slit ends 31a and 33b toward mutually opposite ends in the direction along the long edges 4a and 8a of the first casing section 2 and the second casing section 3, which is the movement direction S. Similarly, the second slit 32 and the fourth slit 34 correspond to each other, and each has the same width. In the state where the first casing section 2 and the second casing section 3 are in the basic position P, the second slit 32 and the fourth slit 34 are communicated through slit ends 32a and 34b. Furthermore, the second slit 32 and the fourth slit 34 respectively extend from the slit ends 32a and 34b toward mutually opposite ends in the direction along the long edges 4a and 8a of the first casing section 2 and the second casing section 3, which is the movement direction S. In the present exemplary embodiment, the lengths of the first slit 31, the second slit 32, the third slit 33, and the fourth slit 34 are set to an equivalent length. The distance between the first slit 31 and the second slit in the first slit member 21, and the distance between the third slit 33 and the fourth slit 34 in the second slit member 22, are set approximately equal to the length of each slit.

The first support shaft 23 and the second support shaft 24 are joined so as to allow the first slit member 21 and the second slit member 22 to mutually slide on each other. The first support shaft 23 has a flange section 23a, a shaft section 23b, and a rotation restriction section 23c. The flange section 23a has an outer diameter greater than the width of the first slit 31. The shaft section 23b projects from the flange section 23a, and has an outer diameter corresponding to the width of the first slit 31. The rotation restriction section 23c is of an oval shape and is provided on the tip end of the shaft section 23b, and it is formed such that the minor diameter corresponds to the width of the third slit 33 and the major diameter is greater than the width of the third slit 33. This first support shaft 23 is inserted into the first slit 31 of the first slit member 21 and the third slit 33 of the second slit member 22, from the side where the fixation sections 21a are formed (on the side of the surface facing the first main surface 4 of the first casing section 2). As a result, in a state where the flange section 23a is butted against the first slit member 21, the shaft section 23b is positioned in the first slit 31, the rotation restriction section 23c is positioned in the third slit 33 while the major diameter direction thereof is aligned with the direction in which the third slit 33 is extended, and the tip end section 23d thereof projects from the third slit 33. Rotation of the first support shaft 23 with respect to the third slit 33 is restricted by the rotation restriction section 23c, and it rotates integrally with the second slit member 22 having the third slit 33 formed therein. In this first support shaft 23, from the projecting tip end section 23d to the flange section 23a, there is formed a through hole 23e. This through hole 23e is provided for arranging a conductive wire, not shown in the diagram, therethrough. The through hole 23e is capable of electrically connecting, via a conductive wire, the internal constituents of the first casing section 2 and the second casing section 3, which are respectively positioned on both sides of the first support shaft 23.

As shown in FIG. 7, the second support shaft 24 has a flange section 24a and a shaft section 24b. The flange section 24a has an outer diameter greater than the width of the second slit 32. The shaft section 24b projects from the flange section 24a, and has an outer diameter corresponding to the width of the second slit 32 and the fourth slit 34. The second support shaft 24 is inserted into the second slit 32 of the first slit member 21 and the fourth slit 34 of the second slit member 22, from the side where the fixation sections 21a are formed (on the side of the surface facing the first main surface 4 of the first casing section 2). As a result, in a state where the flange section 24a is butted against the first slit member 21, the shaft section 24b is positioned inside the second slit 32 and the fourth slit 34, and the tip end section 24c of the shaft section 24b projects from the fourth slit 34.

The first engagement member 25 and the second engagement member 26 engage the first support shaft 23 and the second support shaft 24 with the first slit member 21 and the second slit member 22. The first engagement member 25 is of a circular plate shape having an outer shape greater than the width of the third slit 33. In the center part of the first engagement member 25, there is formed a through hole 25a which corresponds to the outer shape of the tip end section 23d of the first support shaft 23. This through hole 25a of the first engagement member 25 is fitted on the tip end section 23d of the first support shaft which projects from the third slit 33. Accordingly, the first support shaft 23, the first slit member 21, the second slit member 22, and the first engagement member 25 are integrally joined at the portion of the first slit 31 and the third slit 33. Furthermore, the first support shaft 23 can move within the first slit 31 and the third slit 33, and moreover, it can rotate with respect to the first slit 31 while rotation thereof with respect to the third slit 33 is being restricted. Moreover, in the case where the first casing section 2 and the second casing section 3 are in the basic position P, the first support shaft 23 is inserted through the one slit end 31a of the first slit 31 and through the other slit end 33b of the third slit 33, and it is engaged from both sides by the respective slit ends 31a and 33b.

The second engagement member 26 is of a circular plate shape having an outer shape greater than the width of the fourth slit 34. In the center part of the second engagement member 26, there is formed a through hole 26a which corresponds to the outer shape of the tip end section 24c of the second support shaft 24. This through hole 26a of the second engagement member 26 is fitted on the tip end section 24c of the second support shaft 24 which projects from the fourth slit 34. Accordingly, the second support shaft 24, the first slit member 21, the second slit member 23, and the second engagement member 26 are integrally joined at the portion of the second slit 32 and the fourth slit 34. Furthermore, the second support shaft 24 can move and rotate within the second slit 32 and the fourth slit 34. Moreover, in the case where the first casing section 2 and the second casing section 3 are in the basic position P, the second support shaft 24 is inserted through the one slit end 32a of the second slit 32 and through the other slit end 34b of the fourth slit 34, and it is engaged from both sides by the respective slit ends 32a and 34b. Each component which constitutes the slide mechanism 20 is, for example, partly or entirely formed from a steel material or resin material, and is molded in each shape by means of press molding or injection molding.

The first spring member 27 and the second spring member 28 respectively function as a retaining section which retains the positional relationship between the first slit member 21 and the second slit member 22. Furthermore, when the first slit member 21 and the second slit member 22 are slid, the first spring member 27 and the second spring member 28 respectively function as an auxiliary section which assists the movement operation and rotation operation thereof. As the first spring member 27, a torsion coil spring is used for example. The first spring member 27 is such that one end 27a thereof is fixed on the first slit member 21, and the other end 27b thereof is fixed on the first support shaft 23. More specifically, in the first slit member 21, in the substantially center in the movement direction S of the first slit 31, in a position distanced from the first slit 31 in the direction orthogonal to the movement direction S, there is provided a substantially columnar-shaped first supporting protuberance 21b. The one end 27a of the first spring member 27 is wound on the first supporting protuberance 21b, and is attached thereon so as to be able to rotate about the first supporting protuberance 21b. On the flange section 23a of the first support shaft 23, there is provided a substantially columnar-shaped second supporting protuberance 23f. The other end 27b of the first spring member 27 is wound on the second supporting protuberance 23f, and is attached thereon so as to be able to rotate about the second supporting protuberance 23f. The first spring member 27 is attached on the first supporting protuberance 21b and the second supporting protuberance 23f with the distance between the one end 27a and the other end 27b reduced. Thereby, the first supporting protuberance 21b and the second supporting section 23f are biased by the first spring member 27 so as to increase the distance therebetween.

Accordingly, in the case where the first support shaft 23 is positioned to the one slit end 31a side from the center position of the first slit 31 along the movement direction S of the first slit 31, it is biased toward the one slit end 31a side along the first slit 31. On the other hand, in the case where the first support shaft 23 is positioned on the other slit end 31b side, it is biased toward the other slit end 31b side. That is to say, the first support shaft 23 is biased by the first spring member 27 towards either one of the slit ends 31a and 31b, according to the position thereof within the first slit 31.

As the second spring member 28, a torsion coil spring is used for example. The second spring member 28 is such that one end 28a thereof is fixed on the second slit member 22, and the other end 28b thereof is fixed on the first engagement member 25 fixed on the first support shaft 23. More specifically, in the second slit member 22, in the substantially center in the movement direction S of the third slit 33, in a position distanced from the third slit 33 in the direction orthogonal to the movement direction S, there is provided a substantially columnar-shaped third supporting protuberance 22b. The one end 28a of the second spring member 28 is wound on the third supporting protuberance 22b, and is attached thereon so as to be able to rotate about the third supporting protuberance 22b. On the first engagement member 25, there is provided a substantially columnar-shaped fourth supporting protuberance 25b. The other end 28b of the second spring member 28 is wound on the fourth supporting protuberance 25b, and is attached thereon so as to be able to rotate about the fourth supporting protuberance 25b. The second spring member 28 is attached on the third supporting protuberance 22b and the fourth supporting protuberance 25b with the distance between the one end 28a and the other end 28b reduced. Thereby, the third supporting protuberance 22b and the fourth supporting section 25b are biased by the second spring member 28 so as to always increase the distance therebetween.

Accordingly, in the case where the first support shaft 23 is positioned to the one slit end 33a side from the center position of the third slit 33 along the movement direction S of the third slit 33, it is biased toward the one slit end 33a side along the third slit 33. On the other hand, in the case where the first support shaft 23 is positioned to the other slit end 33b side of the opposite side, it is biased toward the other slit end 33b side. That is to say, the second support shaft 24 is biased by the second spring member 28 towards either one of the slit ends 33a and 33b, according to the position thereof within the third slit 33.

Next, the operation in the portable terminal 1 and the slide mechanism 20 of this exemplary embodiment is described, based on FIG. 1 to FIG. 21. FIG. 10 to FIG. 21 are schematic diagrams illustrating the positional relationship in the respective configurations of the first casing section 2, the second casing section 3, and the slide mechanism 20 in respective states, and these diagrams illustrate only minimal configurations required for description.

Figure 10:
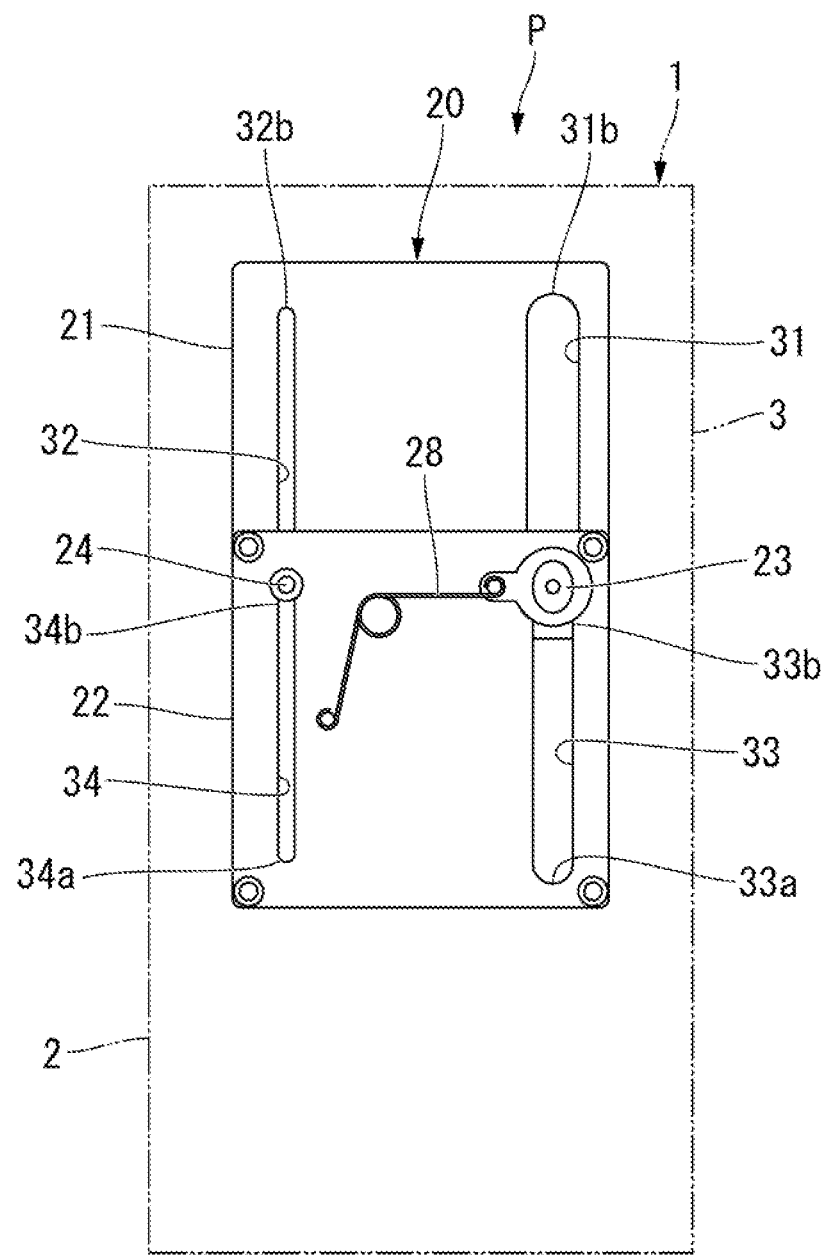
FIG. 10 is a top view of the slide mechanism of the first exemplary embodiment of the present invention in a state of being in the basic position.
Figure 11:
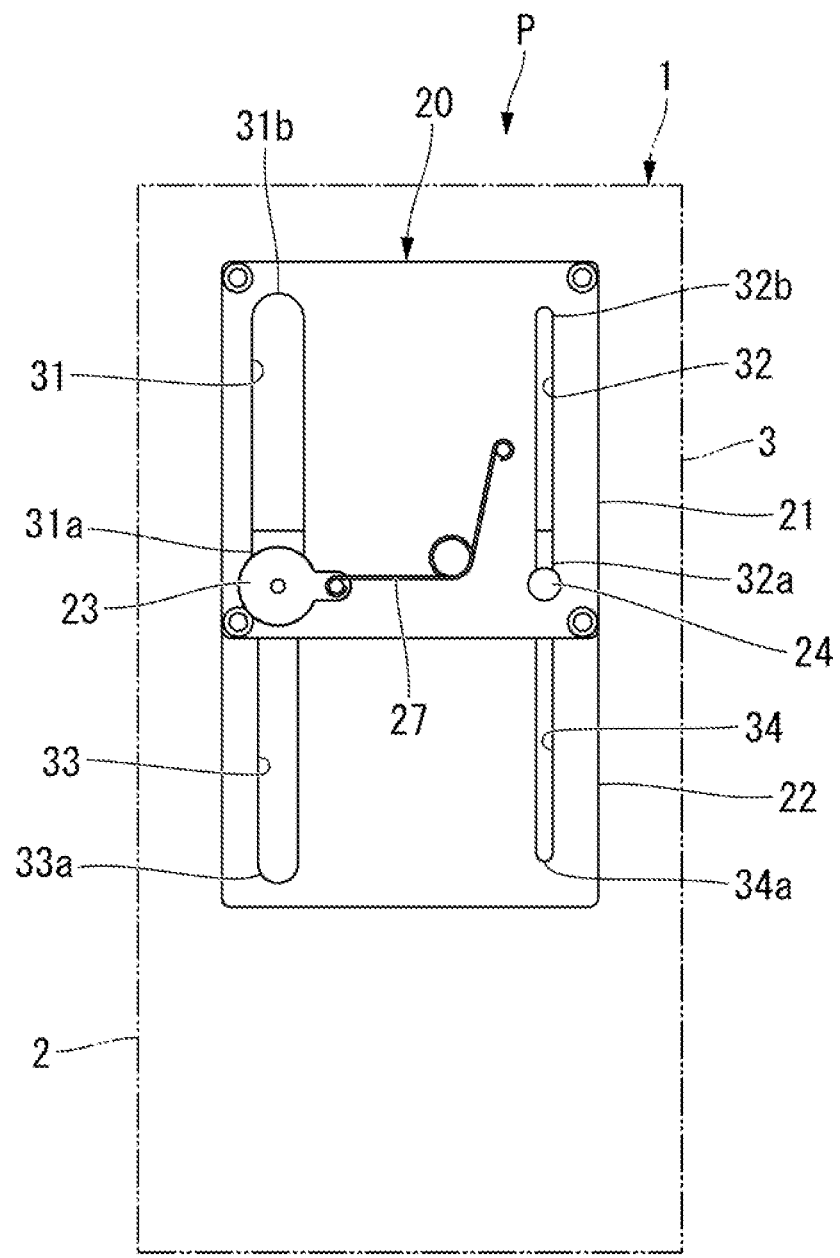
FIG. 11 is a bottom view of the slide mechanism of the first exemplary embodiment of the present invention in a state of being in the basic position.

As shown in FIG. 1, in the state of being in the basic position P, the entirety of the portable terminal 1 is compact, and the display screen section 11 and the second operation section 9 provided on the second main surface 8 of the second casing section 3 are exposed to the outside. Therefore, the operator is able to confirm information, using the display screen section 11, and is able to perform minimal basic operations with the second operation section 9. In this state, as shown in FIG. 10 and FIG. 11, in the slide mechanism 20, the first support shaft 23 is positioned at the one slit end 31a of the first slit 31 of the first slit member 21, and at the other slit end 33b of the third slit 33 of the second slit member 22. Moreover, the second support shaft 24 is positioned at the one slit end 32a of the second slit 32 of the first slit member 21, and at the other slit end 34b of the fourth slit 34 of the second slit member 22. The first spring member 27 provided on the first slit member 21 side, biases the first support shaft 23 to the one slit end 31a side of the first slit 31. The second spring member 28 provided on the second slit member 22 side, biases the first support shaft 23 to the other slit end 33b side of the third slit 33. That is to say, the first casing section 2 and the second casing section 3 are retained in the state of being in the basic position P by the first spring member 27 and the second spring member 28 serving as retaining sections.

Figure 12:
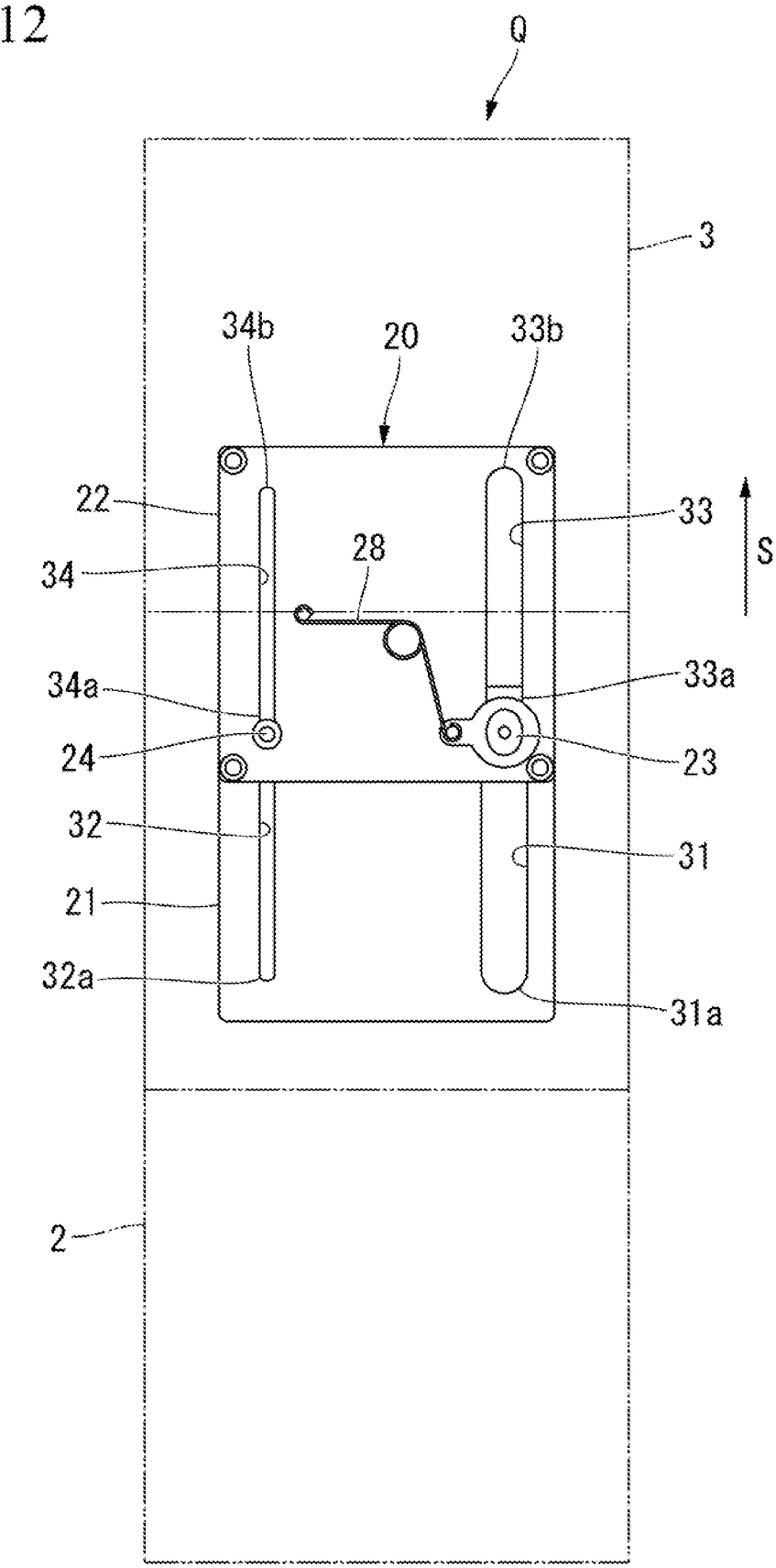
FIG. 12 is a top view of the slide mechanism of the first exemplary embodiment of the present invention in a state of being in the first usage position.
Figure 13:
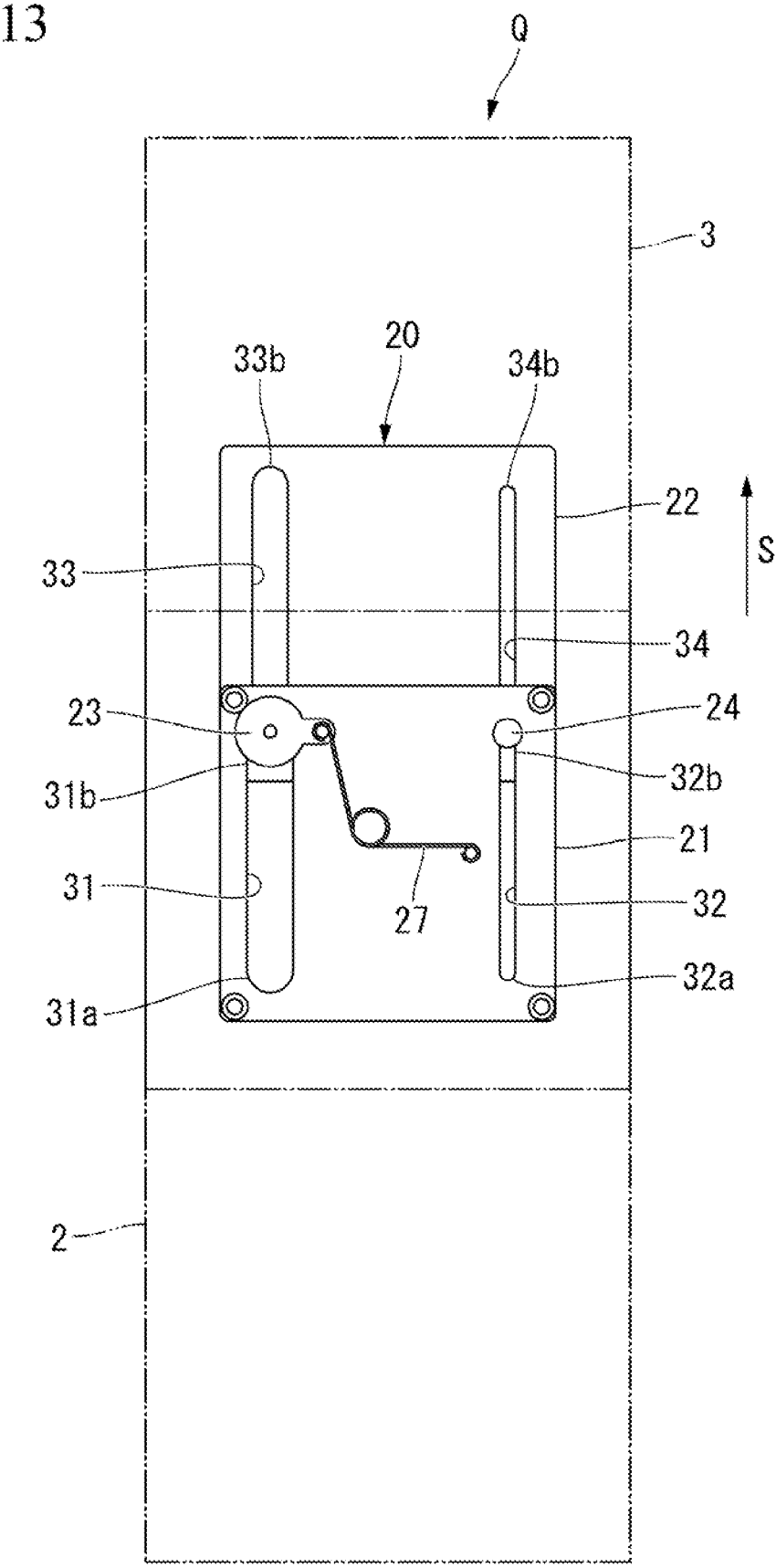
FIG. 13 is a bottom view of the slide mechanism of the first exemplary embodiment of the present invention in a state of being in the first usage position.

The operator provides an operating force so that the second casing section 3 is relatively moved with respect to the first casing section 2 toward one side in the movement direction S, against the biasing force of the first spring member 27 and the second spring member 28. With this operating force, the first support shaft 23 and the second support shaft 24 can move in the movement direction S within the first slit 31 and the third slit 33, and within the second slit 32 and the fourth slit 34. Accordingly, the second casing section 3 can move with respect to the first casing section 2 along the movement direction S, which is the direction along both of the long edges 4a and 8a. As a result, in the slide mechanism 20, the first support shaft 23 and the second support shaft 24 are positioned in the center, in the movement direction S, of the first slit 31 and the third slit 33, and the second slit 32 and the fourth slit 34. That is to say, the second casing section 3 comes to the third usage position Q' shown in FIG. 2, with respect to the first casing section 2. Furthermore, when the first support shaft 23 and the second support shaft 24 pass the center of the first slit 31 and the third slit 33, and the second slit 32 and the fourth slit 34, the orientation of biasing performed by the first spring member 27 and the second spring member 28 is reversed. Consequently, from this point on, the first support shaft 23 and the second support shaft 24 are assisted and moved by the biasing force of the first spring member 27 and the second spring member 28, to the other slit end 31b of the first slit 31 and the one slit end 33a of the third slit 33, and to the other slit end 32b of the second slit 32 and the one slit end 34a of the fourth slit 34. That is to say, the first spring member 27 and the second spring member 28 function as auxiliary sections for assisting the operation. As a result, as shown in FIG. 3, FIG. 12, and FIG. 13, the first support shaft 23 moves until it has come in contact with the other slit end 31b of the first slit 31 and the one slit end 33a of the third slit 33. Moreover, the second support shaft 24 moves until it has come in contact with the other slit end 32b of the second slit and the one slit end 34b of the fourth slit 34. In this state, the biasing force of the first spring member 27 and the second spring member 28 acts toward the other slit end 31b of the first slit 31 and the other slit end 32b of the second slit 32. That is to say, the first spring member 27 and the second spring member 28 function as retaining sections. Consequently, the first support shaft 23 is retained in the state of being pressed against and engaged with the other slit end 31b of the first slit 31 and the one slit end 33a of the third slit 33. Moreover, the second support shaft 24 is retained in the state of being pressed against and engaged with the other slit end 32b of the second slit 32 and the one slit end 34a of the fourth slit 34.

Figure 2:
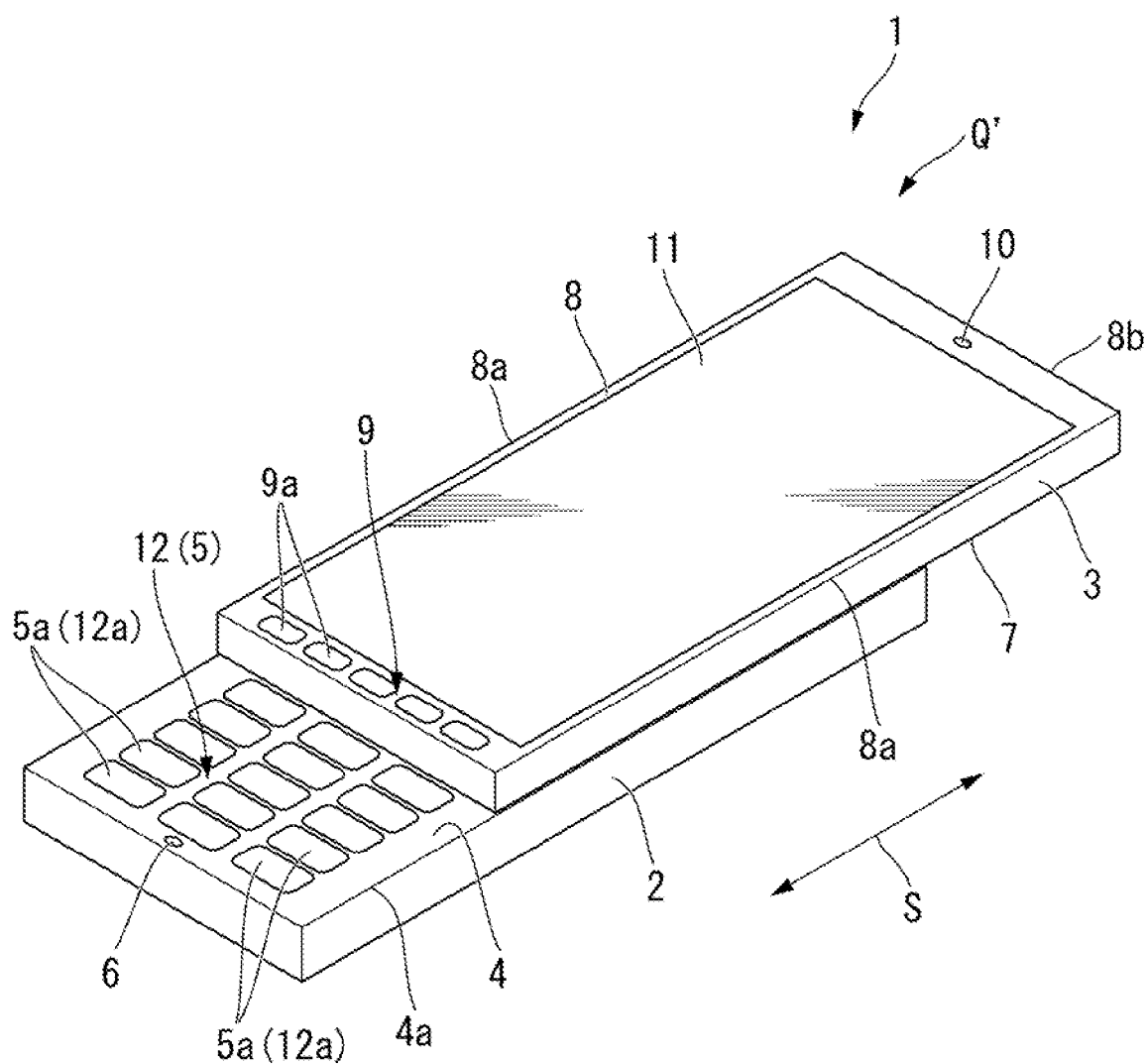
FIG. 2 is an overall view of the portable terminal of the first exemplary embodiment of the present invention in a state of being in a third usage position.
Figure 3:
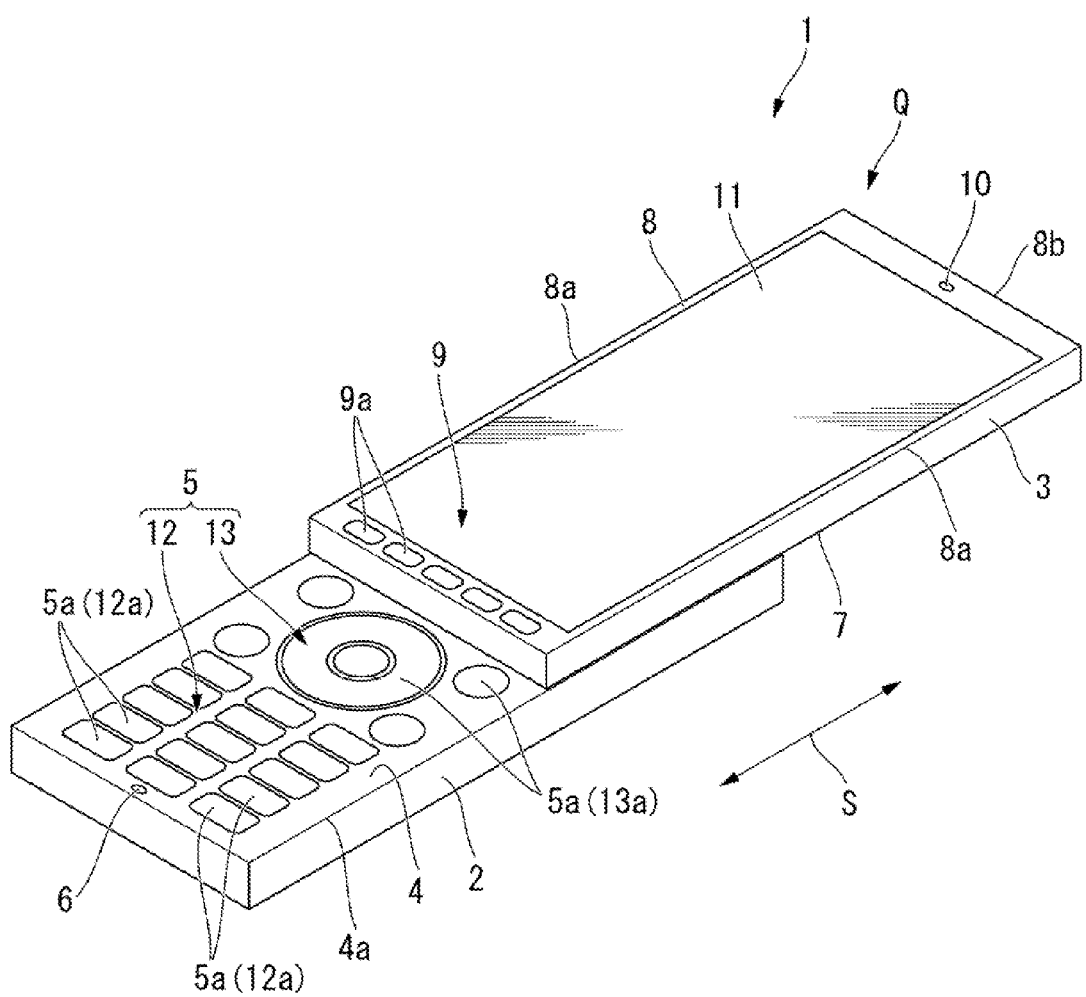
FIG. 3 is an overall view of the portable terminal of the first exemplary embodiment of the present invention in a state of being in a first usage position.
Figure 4:
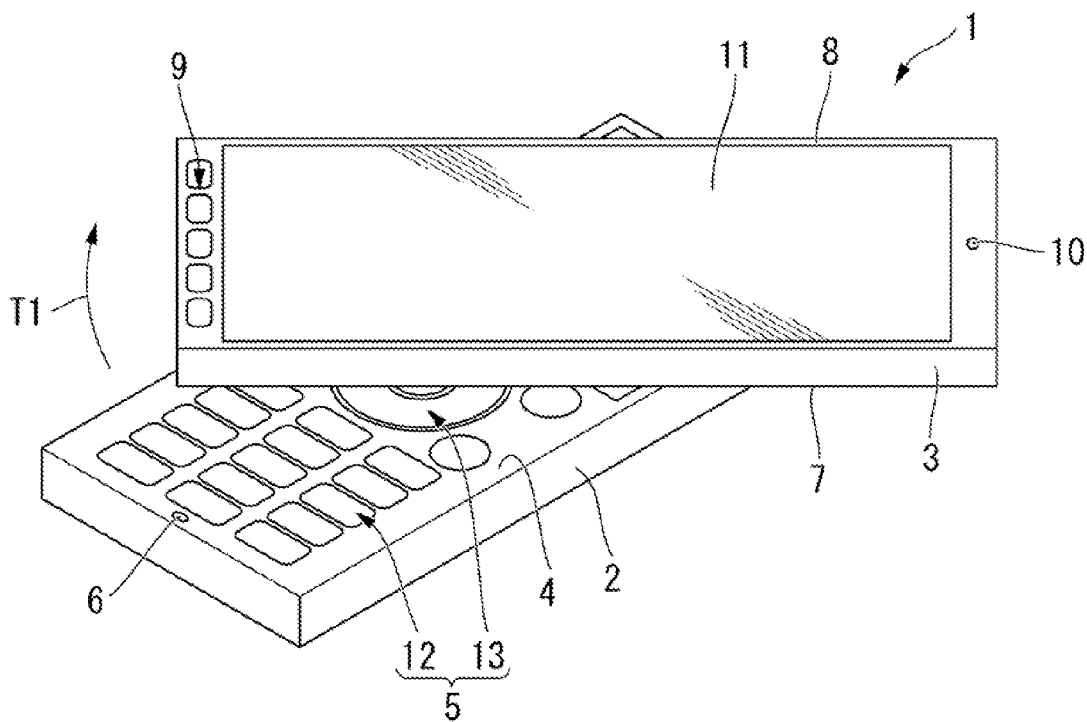
FIG. 4 is an overall view of the portable terminal of the first exemplary embodiment of the present invention in a state of being in the middle of rotating to a second usage position.

With the above type of operation, the first casing section 2 and the second casing section 3 are brought from the basic position P shown in FIG. 1 through the third usage position Q' shown in FIG. 2 to the first usage position Q shown in FIG. 3. As a result, the first casing section 2 and the second casing section 3 are both brought to a portrait-oriented arrangement, thereby enabling use of the portable terminal 1 while the first operation section 41 is exposed. Therefore, the portable terminal 1 can be brought to an optimum state for using functions such as telephone communication.

The operator gives the second casing section 3, with respect to the first casing section 2, a certain level of operating force against the biasing force of the first spring member 27 and the second spring member 28 toward the other side of the movement direction S. With this operating force, the first casing section 2 and the second casing section 3 can be returned to the basic position P shown in FIG. 1 from the state shown in FIG. 3 of being in the first usage position Q, through the state shown in FIG. 2 of being in the third usage position Q. Also at this time, when the position of the state shown in FIG. 2 is passed, the orientation of biasing performed by the first spring member 27 and the second spring member 28 is reversed. In the position of the state shown in FIG. 2 and thereafter, the first support shaft 23 and the second support shaft 24 are assisted and moved by the biasing force of the first spring member 27 and the second spring member 28, to the one slit end 31a of the first slit 31 and the other slit end 33b of the third slit 33, and to the one slit end 32a of the second slit 32 and the other slit end 34b of the fourth slit 34. Thus, similarly, the first spring member 27 and the second spring member 28 function as auxiliary sections for assisting the operation.

Figure 14:
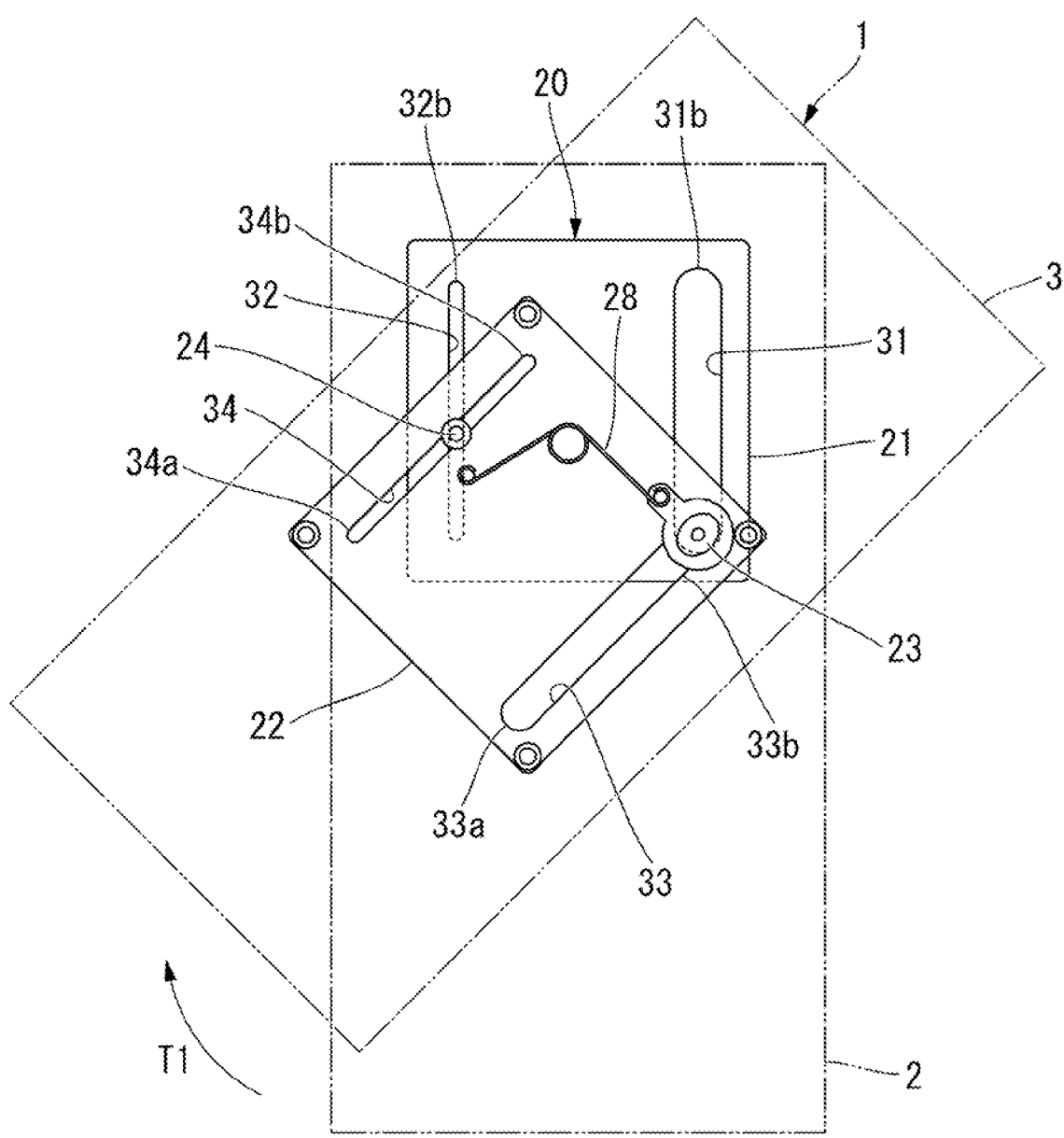
FIG. 14 is a top view of the slide mechanism of the first exemplary embodiment of the present invention in a state of being in the middle of rotating in one direction side of a rotational direction.
Figure 15:
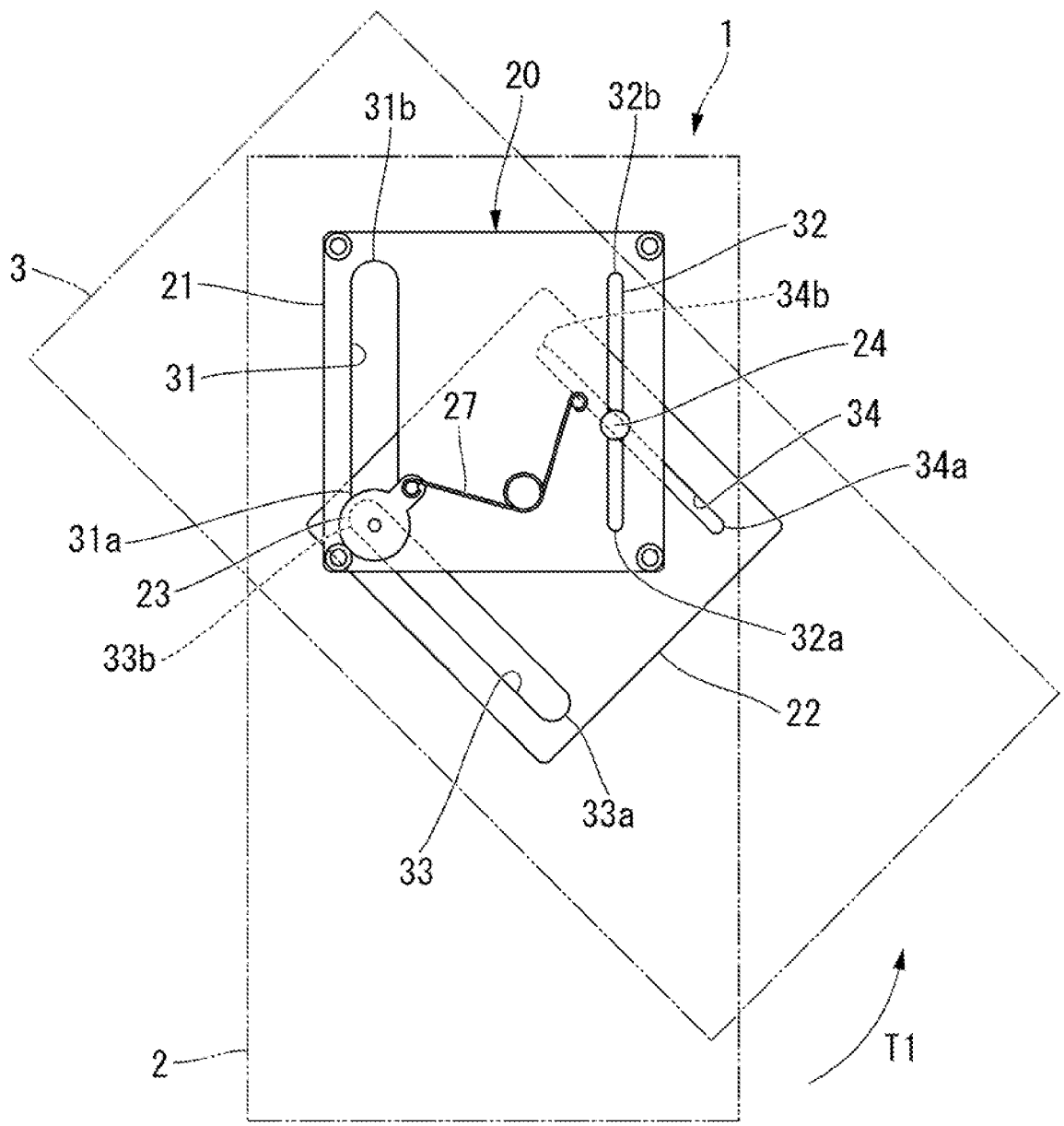
FIG. 15 is a bottom view of the slide mechanism of the first exemplary embodiment of the present invention in a state of being in the middle of rotating in the one direction side of the rotational direction.
Figure 16:
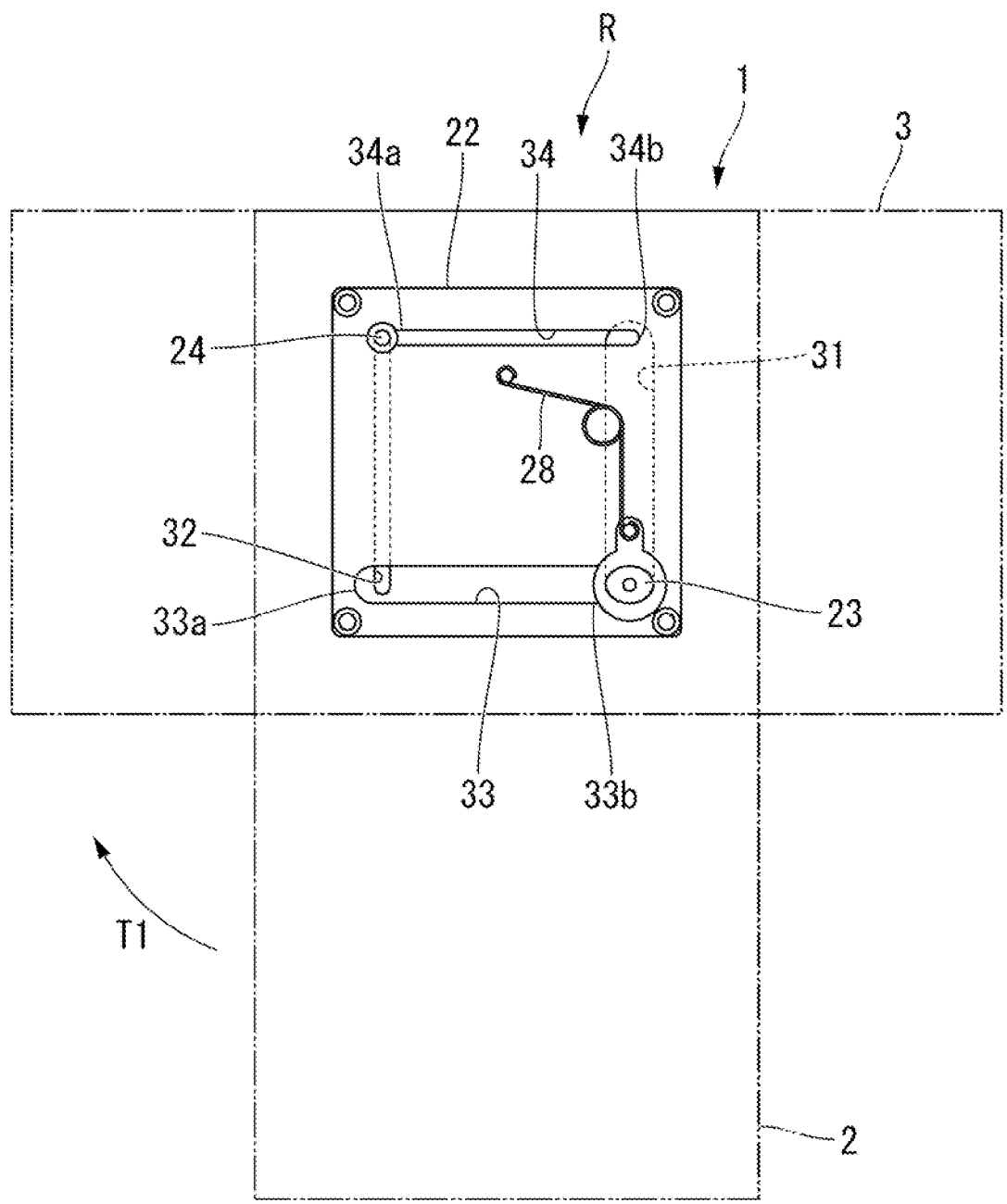
FIG. 16 is a top view of the slide mechanism of the first exemplary embodiment of the present invention in a state of having been rotated in the one direction side of the rotational direction and being in the second usage position.
Figure 17:
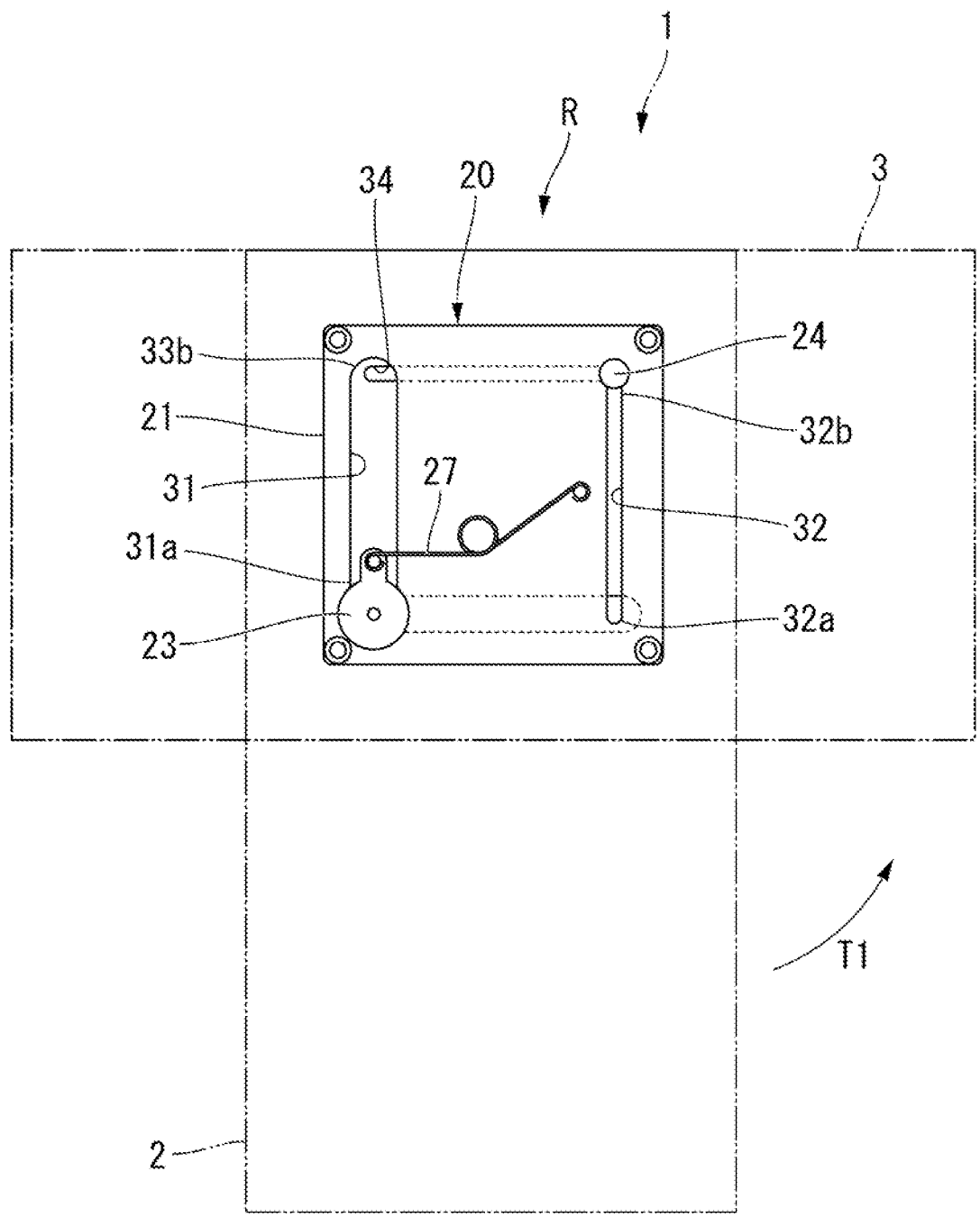
FIG. 17 is a bottom view of the slide mechanism of the first exemplary embodiment of the present invention in a state of having been rotated in the one direction side of the rotational direction and being in the second usage position.
Figure 18:
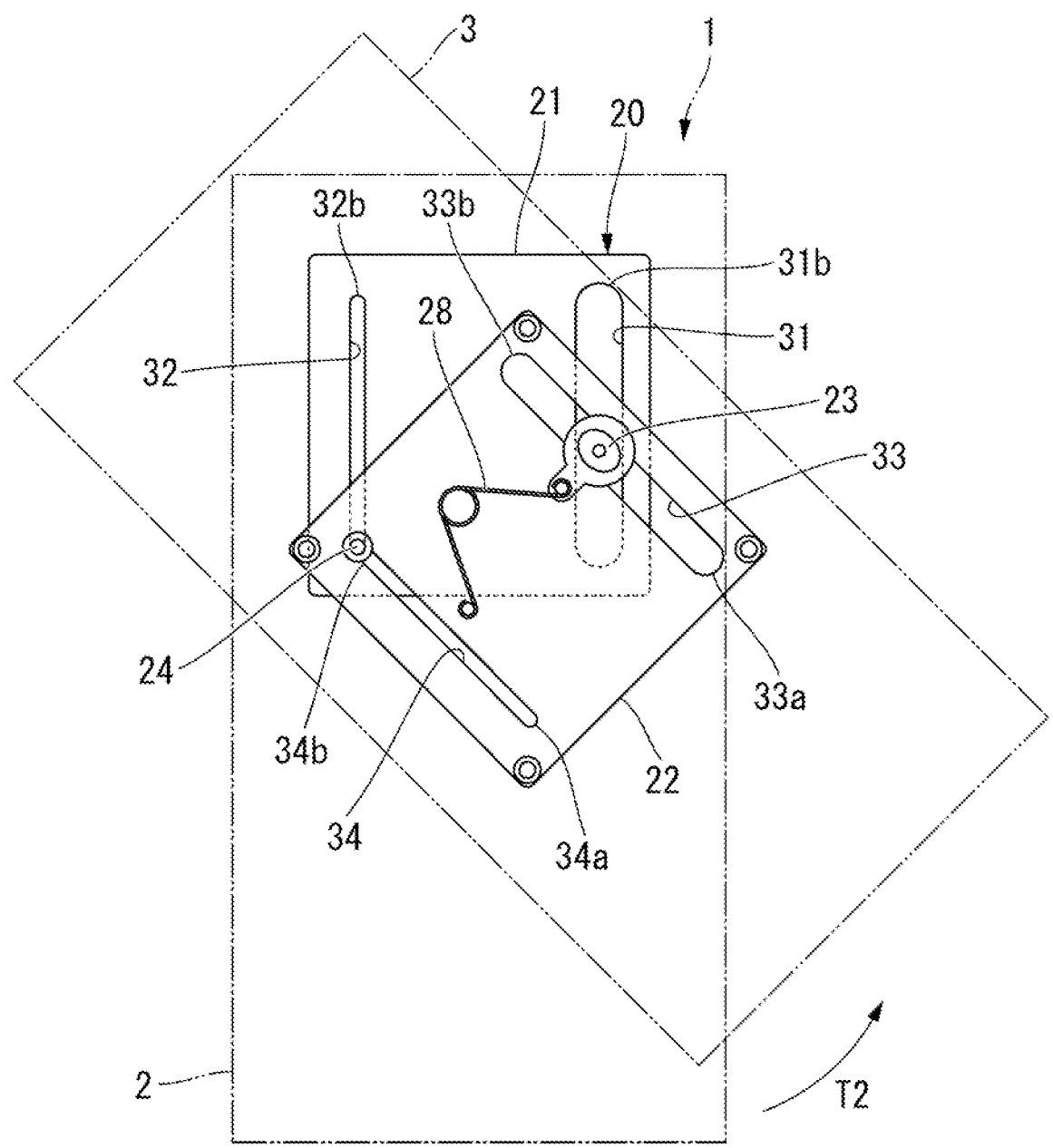
FIG. 18 is a top view of the slide mechanism of the first exemplary embodiment of the present invention in a state of being in the middle of rotating in the other direction side of the rotational direction.
Figure 19:
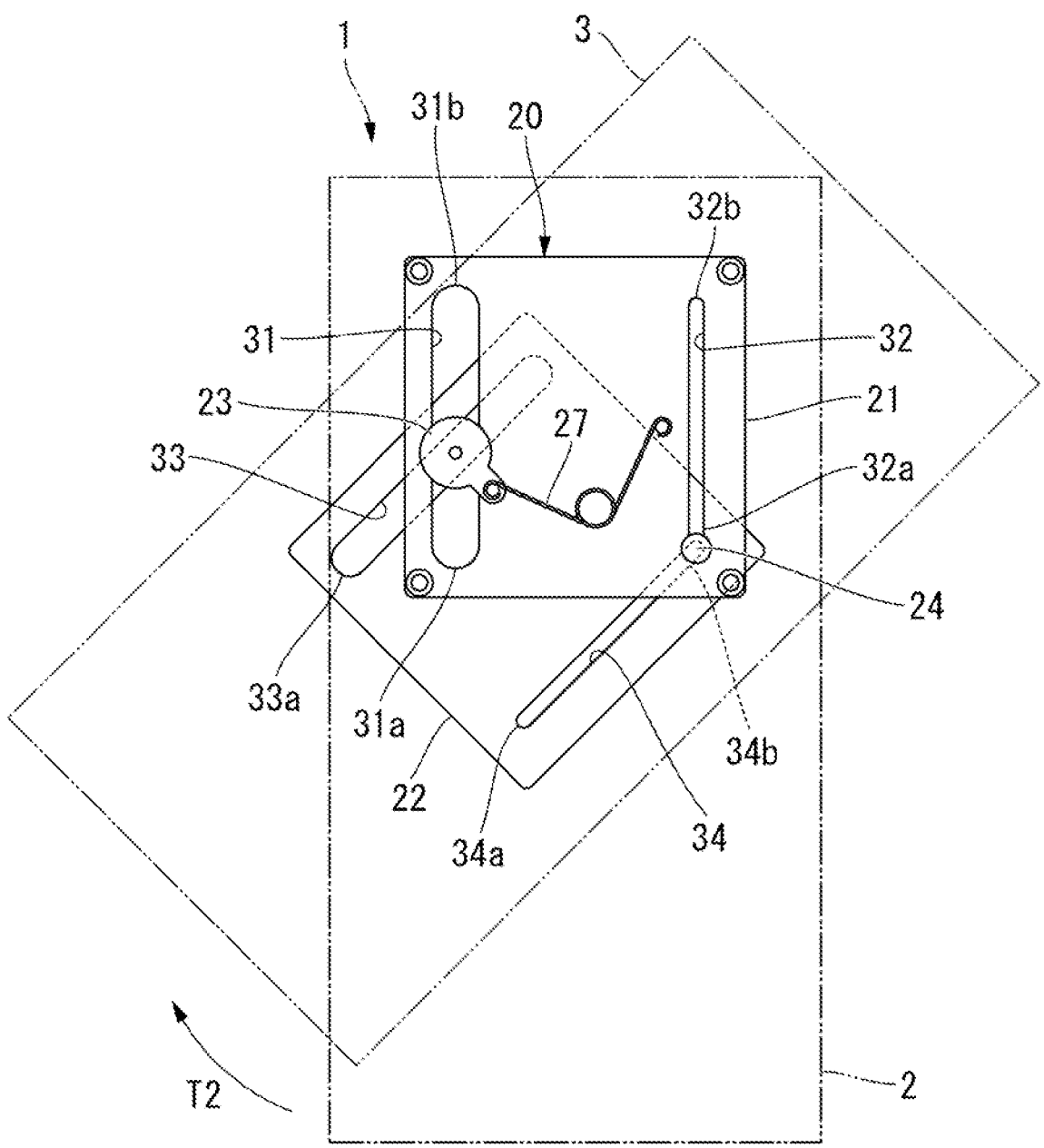
FIG. 19 is a bottom view of the slide mechanism of the first exemplary embodiment of the present invention in a state of being in the middle of rotating in the other direction side of the rotational direction.

From the state shown in FIG. 1, FIG. 10, and FIG. 11 where the first casing section 2 and the second casing section 3 are in the basic position P, the operator gives the second casing section 3 an operating force toward the one direction side T1 of the rotational direction, to thereby rotate the second casing section 3 on the first main surface 4 with respect to the first casing section 2. At this time, even if an attempt is made to move the first support shaft 23 about the second support shaft 24 in the tangential line direction on the one direction side T1 of the rotational direction, the first support shaft 23 is engaged with the one slit end 31a of the first slit 31 and the other slit end 33b of the third slit 33, and thereby movement thereof is restricted. On the other hand, if an attempt is made to move the second support shaft 24 about the first support shaft 23 in the tangential line direction on the one direction side T1 of the rotational direction, the second support shaft 24 relatively moves from the one slit end 32a of the second slit 32 toward the other slit end 32b, and from the other slit end 34b of the fourth slit 34 toward the one slit end 34a. Accordingly, if the operator gives the second casing section 3 an operating force toward the one direction side T1 of the rotational direction, as shown in FIG. 14 and FIG. 15, the second casing section 3 slide-rotates about the first support shaft 23 with respect to the first casing section 2 while causing the second support shaft 24 to slide-move within the second slit 32 and the fourth slit 34. As shown in FIG. 16 and FIG. 17, when the second support shaft 24 is butted against the other slit end 32b of the second slit 32 and the one slit end 34a of the fourth slit 34, it is engaged therewith, and rotation thereof is restricted. In the present exemplary embodiment, the lengths of the second slit 32 and the fourth slit 34 are set so that the second support shaft 24 engages with the slit ends 32b and 34a when it has rotated about the first support shaft 23 by 90 degrees. Thus, the second casing section 3 is brought to a state where it has rotated by 90 degrees with respect to the first casing section 2. Based on the positional relationship in the basic position P between the first casing section 2 and the second casing section 3, the first support shaft 23, and the one slit end 31a of the first slit 31 and the other slit end 33b of the third slit 33, the first casing section 2 and the second casing section 3 can be brought to a state of forming a substantially T shape, which is the second usage position R, as shown in FIG. 5, FIG. 16, and FIG. 17. Therefore, the first operation section 5 provided on the first casing section 2 is exposed again. Furthermore, from the basic position P, by changing the orientation of the display screen section 11 provided on the second casing section 3 without changing the center position thereof in the widthwise direction (direction along a short edge 4b of the first casing section 2), the second casing section 3 may be brought to a landscape-oriented state with respect to the first casing section 2. Accordingly, the portable terminal 1 can be brought to an optimum state for functions, such as television broadcasting viewing and referencing websites, to be used as a television receiver or personal computer while operating the first operation section 5.

Since the first support shaft 23 has the rotation restriction section 23c, the orientation thereof relative to the second slit member 22 is constant, and it rotates with respect to the first slit member 21 within the first slit 31. Therefore, while the rotation operation is being performed, the relative orientation between the first support shaft 23 and the first slit member 21 changes, and thereby the biasing force of the first spring member 27 also changes. Further, with this biasing force, a torque of a different orientation acts therebetween according to the above relative orientation. That is to say, while the rotation operation is being performed, until the second casing section 3 has come to the position of the state shown in FIG.

4, FIG. 14, and FIG. 15 with respect to the first casing section 2, that is, until the second support shaft 24, in the slide mechanism 20, has reached the center of the second slit 32 and the fourth slit 34, then due to the bias force of the first spring member 27, a torque acts between the support shaft 24 and the first slit member 21, which works to return to the original position and which tends to return to the basic position P shown in FIG. 10 and FIG. 11. Accordingly, with this torque, the second support shaft 24 moving within the second slit 32 and the fourth slit 34, is subjected to a force which tends to return it to the one slit end 32a of the second slit 32 and the other slit end 34b of the fourth slit 34. Meanwhile, when the second support shaft 24 has passed the center of the second slit 32 and the fourth slit 34, the biasing force of the first spring member 27 causes a torque, which tends to cause further rotation in the same direction, to act between the first support shaft 24 and the first slit section 21. Consequently, this torque causes a force to act on the second support shaft 24 toward the other slit end 32b of the second slit 32 and the one slit end 34a of the fourth slit 34. Thereby, in the state shown in FIG. 4, FIG. 14, and FIG. 15 and thereafter, the second support shaft 24 is assisted and moved by the biasing force of the first spring member 27, to the other slit end 32b of the second slit 32 and the one slit end 34a of the fourth slit 34. That is to say, the first spring member 27 functions as an auxiliary section for assisting the operation.

In the state of the second usage position R shown in FIG. 5, FIG. 16, and FIG. 17, the biasing force caused by the first spring member 27 and the second spring member 28 acts toward the one slit end 31a of the first slit 31 and the other slit end 33b of the third slit 33. That is to say, the first spring member 27 and the second spring member 28 function as retaining sections. Consequently, the first support shaft 23 is retained in the state of being pressed against and engaged with the one slit end 31a of the first slit 31 and the other slit end 33b of the third slit 33. Moreover, the second support shaft 24 is retained in the state of being pressed against and engaged with the other slit end 32b of the second slit 32 and the one slit end 34a of the fourth slit 34.

The operator gives the second casing section 3 an operating force to the other direction side T2, which is on the direction side opposite of the one direction side T1 of the rotational direction. From the state shown in FIG. 1, FIG. 10, and FIG. 11 where the first casing section 2 and the second casing section 3 are in the basic position P, this operating force causes the second casing section 3 to rotate on the first main surface 4 with respect to the first casing section 2. At this time, even if an attempt is made to move the second support shaft 24 about the first support shaft 23 in the tangential line direction on the other direction side T2 of the rotational direction, the second support shaft 24 is engaged with the one slit end 32a of the second slit 32 and the other slit end 34b of the fourth slit 34, and movement thereof is restricted. On the other hand, if an attempt is made to move the first support shaft 23 about the second support shaft 24 in the tangential line on the other direction side T2 of the rotational direction, the first support shaft 23 relatively moves from the one slit end 31a of the first slit 31 toward the other slit end 31b, and from the other slit end 33b of the third slit 33 to the one slit end 33a. Consequently, if the operator gives the second casing section 3 an operating force toward the other direction side T2 of the rotational direction, the second casing section 3 slide-rotates about the second support shaft 24 with respect to the first casing section 2 while causing the first support shaft 23 to slide-move within the first slit 31 and the third slit 33.

Figure 20:
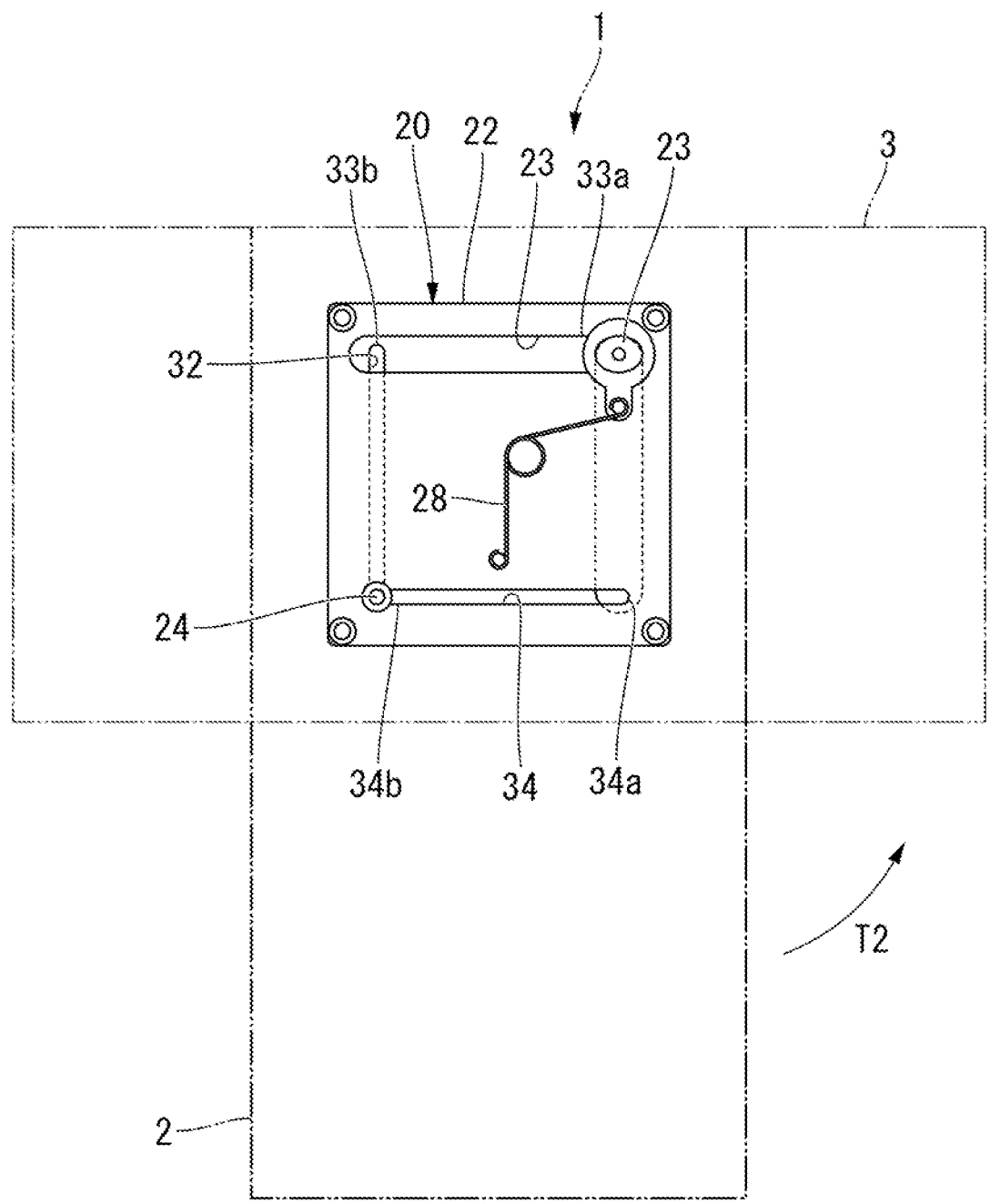
FIG. 20 is a top view of the slide mechanism of the first exemplary embodiment of the present invention in a state of having been rotated in the other direction side of the rotational direction and being in the second usage position.
Figure 21:
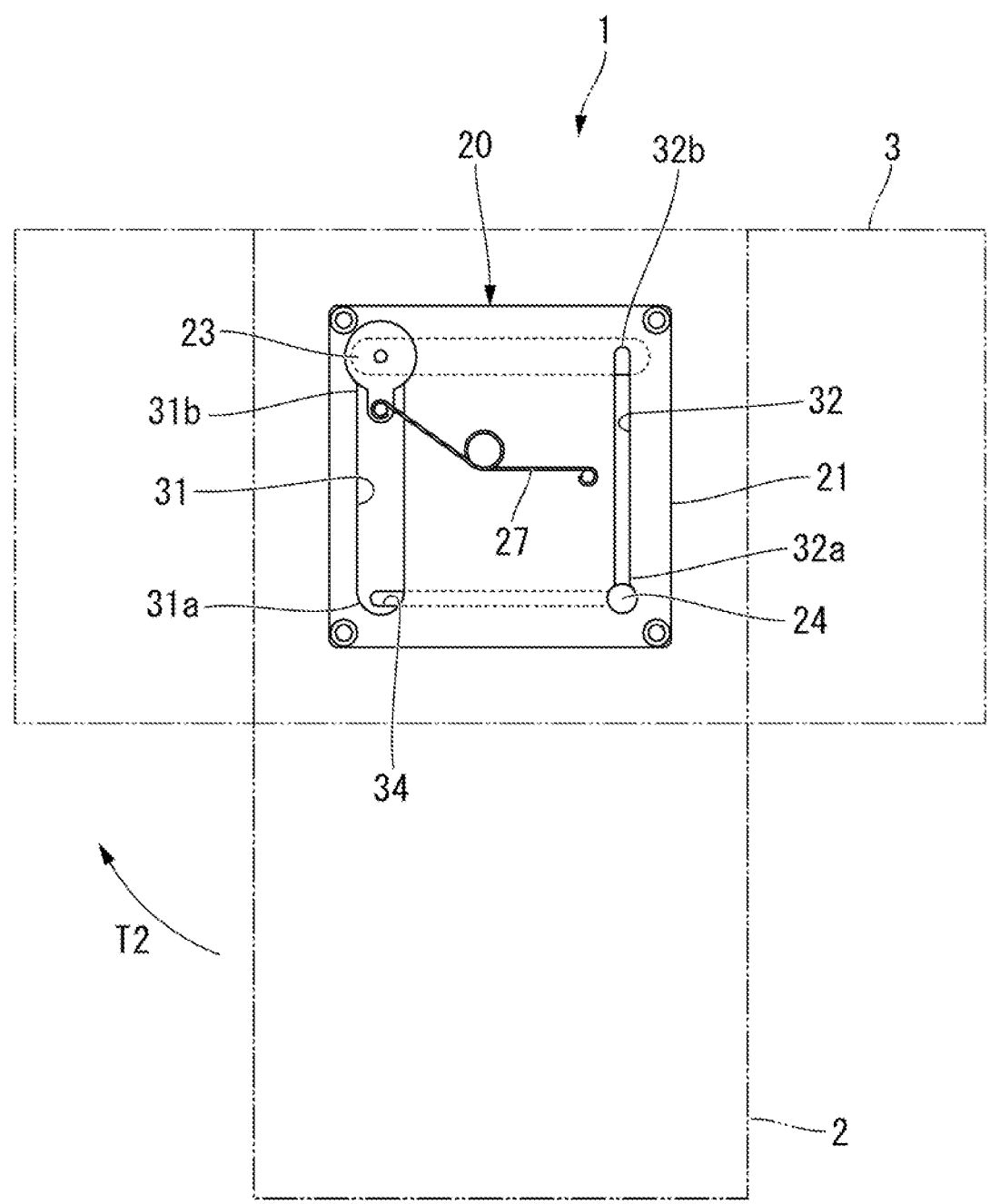
FIG. 21 is a bottom view of the slide mechanism of the first exemplary embodiment of the present invention in a state of having been rotated in the other direction side of the rotational direction and being in the second usage position.

As shown in FIG. 20 and FIG. 21, when the first support shaft 23 is butted against the other slit end 31b of the first slit 31 and the one slit end 33a of the third slit 33, it is engaged therewith, and rotation thereof is restricted. In the present exemplary embodiment, the lengths of the first slit 31 and the third slit 33 are set so that the first support shaft 23 engages with the slit ends 31b and 33a when it has rotated about the second support shaft 24 by 90 degrees. Thus, the second casing section 3 is brought to a state where it has rotated by 90 degrees with respect to the first casing section 2. Based on the positional relationship in the basic position P between the first casing section 2 and the second casing section 3, the second support shaft 24, and the one slit end 32a of the second slit 32 and the other slit end 34b of the fourth slit 34, the first casing section 2 and the second casing section 3 can be brought to a state of forming a substantially T shape, which is the second usage position R, as shown in FIG. 20 and FIG. 21. Therefore, the first operation section 5 provided on the first casing section 2 is exposed again. Furthermore, from the basic position P, by changing the orientation of the display screen section 11 provided on the second casing section 3 without changing the center position thereof in the widthwise direction (direction along the short edge 4b of the first casing section 2), the second casing section 3 may be brought to a landscape-oriented state with respect to the first casing section 2. Accordingly, the portable terminal 1 can be brought to an optimum state for functions, such as television broadcasting viewing and referencing websites, to be used as a television receiver or personal computer while operating the first operation section 5.

When the rotation is being performed, until the first support shaft 23 has reached the center, in the movement direction S, of the first slit 31 and the third slit 33, the biasing force of the first spring member 27 and the second spring member 28 causes a force to act on the first support shaft 23 so that it tends to return to its original position, that is, the one slit end 31a of the first slit 31 and the other slit end 33b of the third slit 33. On the other hand, when the first support shaft 23 has reached the center of the first slit 31 and the third slit 33, the biasing force of the first spring member 27 and the second spring member 28 causes a force to act on the first support shaft 23 toward the other slit end 31b of the first slit 31 and the one slit end 33a of the third slit 33. Consequently, from this point on, the first support shaft 23 is assisted and moved by the biasing force of the first spring member 27 and the second spring member 28 to the other slit end 31b of the first slit 31 and the one slit end 33a of the third slit 33. That is to say, the first spring member 27 and the second spring member 28 function as auxiliary sections for assisting the operation. In the state of the second usage position R shown in FIG. 20 and FIG. 21, the biasing force caused by the first spring member 27 and the second spring member 28 acts on the first support shaft 23 toward the other slit end 31b of the first slit 31 and the one slit end 33a of the third slit 33. That is to say, the first spring member 27 and the second spring member 28 function as retaining sections. Consequently, the first support shaft 23 is retained in the state of being pressed against the other slit end 31b of the first slit 31 and the one slit end 33a of the third slit 33. Furthermore, the second support shaft 24 is retained in the state of being pressed against the one slit end 32a of the second slit 32 and the other slit end 34b of the fourth slit 34.

As described above, according to the portable terminal 1 of the present exemplary embodiment, the first casing section 2 and the second casing section 3 can be brought from the basic position P shown in FIG. 1 to the first usage position Q shown in FIG. 3, and can be used in a state where they are arranged portrait-oriented together and the first operation section 5 is exposed. Moreover, it can be returned again from the state shown in FIG. 3 where the first casing section 2 and the second casing section 3 are in the first usage position Q, to the basic position P shown in FIG. 1. Furthermore, by rotating the first casing section 2 and the second casing section 3 by 90 degrees from the basic position P shown in FIG. 1 to the one direction side T1 of the rotational direction, the first casing section 2 and the second casing section 3 form a substantially T shape as being in the second usage position R shown in FIG. 5, and it is possible, with only a single operation, to shift to the open state where the display screen section 11 is serving as a landscape-oriented screen when seen from the user, and the first operation section 5 is positioned on the lower side of the center part of the display screen section 11 when seen from the user. Furthermore, also in the case where rotation is performed by 90 degrees to the other direction side T2, which is the opposite side to the one direction side T1 of the rotational direction, although the left-right orientation of the second casing section 2 differs from that in FIG. 5, the first casing section 2 and the second casing section 3 similarly form a substantially T shape as being in the second usage position R, and it is possible, with only a single operation, to shift to the open state where the display screen section 11 is serving as a landscape-oriented screen when seen from the user, and the first operation section 5 is positioned on the lower side of the center part of the display screen section 11 when seen from the user. Moreover, since the slide mechanism 20 is provided with the first spring member 27 and the second spring member 28, they can serve as retaining sections to retain the state of the respective positions. Moreover, when relatively moving the second casing section 3 with respect to the first casing section 2 by giving an operating force caused by the first spring member 27 and the second spring member 28, they can serve as auxiliary sections to exert an assistive force, and it is thereby possible to improve the level of operability. The spring members may operate only as retaining sections or only as auxiliary sections in some cases, depending on the type and arrangement thereof. However, this type of configuration may also be employed.

In the above description, the first slit 31, the second slit 32, the third slit 33, and the fourth slit 34 are such that the slit lengths thereof are equal, and the distance between the first slit 31 and the second slit 32, and the distance between the third slit 33 and the fourth slit 34 are set approximately equal to the slit length. However, it is not limited to this. By changing the length of each of these slits and position of each slit end, the positions, at which the first support shaft 23 and the second support shaft 24 are engaged and movements thereof are restricted at each slit end, become different. Consequently, the amount of sliding from the basic position P in the movement direction S, and the angle of each rotation to the one direction side T1 of the rotational direction and the other direction side T2, can be changed. Moreover, in the above description, the movement direction S for shifting from the basic position P to the first usage position Q is set to the direction along the long edges 4a and 8a of the first casing section 2 and the second casing section 3 in the basic position P. However, it is not limited to this. For example, it may be set to the direction along the short edges 4b and 8b, and the orientations of the first slit 31, the second slit 32, the third slit 33, and the fourth slit 34 may be set according to this. Furthermore, the movement direction S is not limited to a linear direction, and it may be a direction along a certain type of line shape such as an arc-shaped curved line shape.

Moreover, in the present exemplary embodiment, the basic position P is described as a position where the first casing section 2 and the second casing section 3 are overlapped on each other with no displacement therebetween. However, it is not limited to this. That is to say, for convenience of design or component arrangement, it is not always necessary to align the long edge direction center line and the short edge direction center line of the first casing section 2 and the second casing section 3 for example. Alternatively, the configuration may be such that in the basic position P, the long edge directions of the first casing section 2 and the second casing section 3 are angled from each other by a predetermined angle such as 30°, 45°, 60°, 120°, 135°, and 150°, and from this state, it is slide-moved in a predetermined movement direction S, or it may be slide-rotated in a predetermined rotational direction.

In the above exemplary embodiment, the first spring member 27 and the second spring member 28 are respectively configured with a torsion coil spring. However, it is not limited to this, and various types of biasing device may be applied.

Moreover, in the above exemplary embodiment, only the first support shaft 23 is biased by the first spring member 27 and the second spring member 28. However, the second support shaft 24 may be similarly biased instead of the first support shaft 23, or the first support shaft 23 and the second support shaft 24 may be both biased.

Furthermore, in the above exemplary embodiment, there are used the first spring member 27 and the second spring member 28 in order to retain the positional relationship between the first casing section 2 and the second casing section 3. However, it is not limited to this, and may be substituted with mechanisms which perform retaining in a concave-convex engagement manner such as a click-stop mechanism, as long as they are capable of retaining the first support shaft 23 and the second support shaft 24 at each slit end of the first slit 31, the second slit 32, the third slit 33, and the fourth slit 34. Moreover, these click-stop mechanisms may be provided between the first casing section 2 and the second casing section 3.

Moreover, in the above exemplary embodiment, the first casing section 2 and the second casing section 3 are of the same flat rectangular solid shape, however, it is not limited to this. Various types of shapes may be applied thereto, and they may be of different shapes and sizes. Furthermore, in the above exemplary embodiment, the slide mechanism 20 is such that the first slit member 21 has the first slit 31 and the second slit 32 formed therein, and the second slit member 22 has the third slit 33 and the fourth slit 34 formed therein. However, it is not limited to this. These respective slits may also be configured with separate members, or these respective slits may be formed directly in the first casing section 2 and the second casing section 3. Furthermore, in the above exemplary embodiment, a portable terminal having a first casing section and second casing section is described as an example of an application of the slide mechanism 20. However, it is not limited to this. The exemplary embodiment of the present invention may be effectively applied to various types of portable terminals such as a laptop computer, an electronic dictionary, a PDA (personal data assistant), and so forth, as long as it is a portable terminal in which respective casings are slidably and rotatably joined with each other using this slide mechanism.

In the above description, there has been described the point that it is possible to set from the basic position P to the second usage position R by slide-rotating the second casing section 3 with respect to the first casing section 2. In addition to this, in the above configuration, it can be set to the second usage position R also from the first usage position Q and the third usage position Q'. That is to say, for example, if the second casing section 3 is rotated from the first usage position Q shown in FIG. 12 and FIG. 13 to the one direction side T1 of the rotational direction, it rotates about the second support shaft 24 while the first support shaft 23 relatively moves within the first slit 31 and the third slit 33, and it can be set to the second usage position R shown in FIG. 16 and FIG. 17. On the other hand, if the second casing section 3 is rotated from the first usage position Q shown in FIG. 12 and FIG. 13 to the other direction side T2 of the rotational direction, it rotates about the first support shaft 23 while the second support shaft 24 relatively moves within the second slit 32 and the fourth slit 34, and it can be brought to the similar second usage position R, although the left-right orientation thereof differs from that of the second casing section 2 in the state shown in FIG. 16 and FIG. 17. These can be similarly achieved when being brought from the third usage position Q'.

Second Exemplary Embodiment

Next, a second exemplary embodiment of the present invention is described. FIG. 22 to FIG. 49 show the second exemplary embodiment of the present invention. In this exemplary embodiment, the common members used in the aforementioned exemplary embodiment are given the same reference symbols, and descriptions thereof are omitted.

Figure 22:
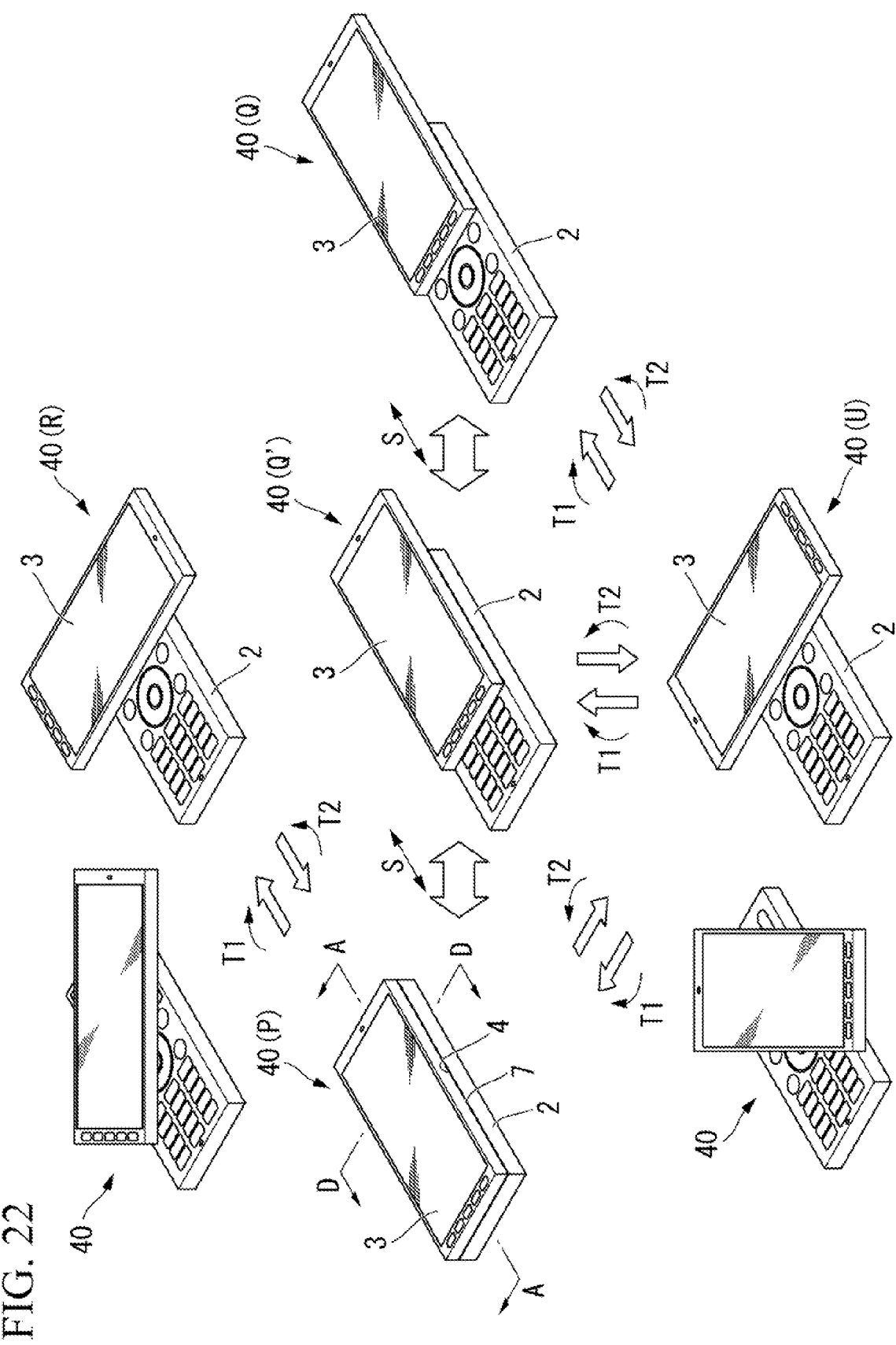
FIG. 22 is an explanatory diagram for describing the state of the portable terminal of the first exemplary embodiment of the present invention in each usage position.
Figure 23:
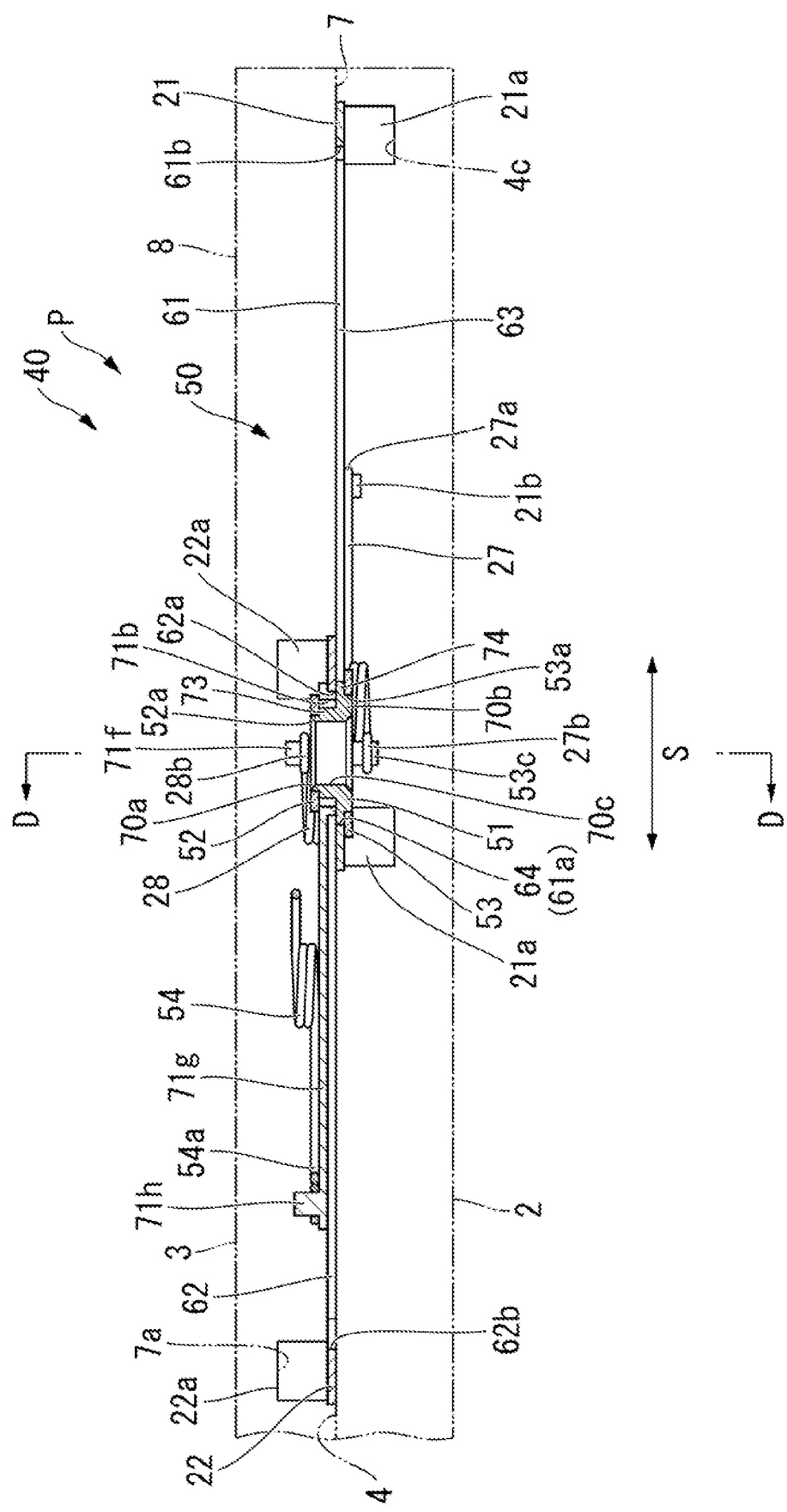
FIG. 23 is a cross-sectional view taken along the section line C-C in FIG. 22.
Figure 24:
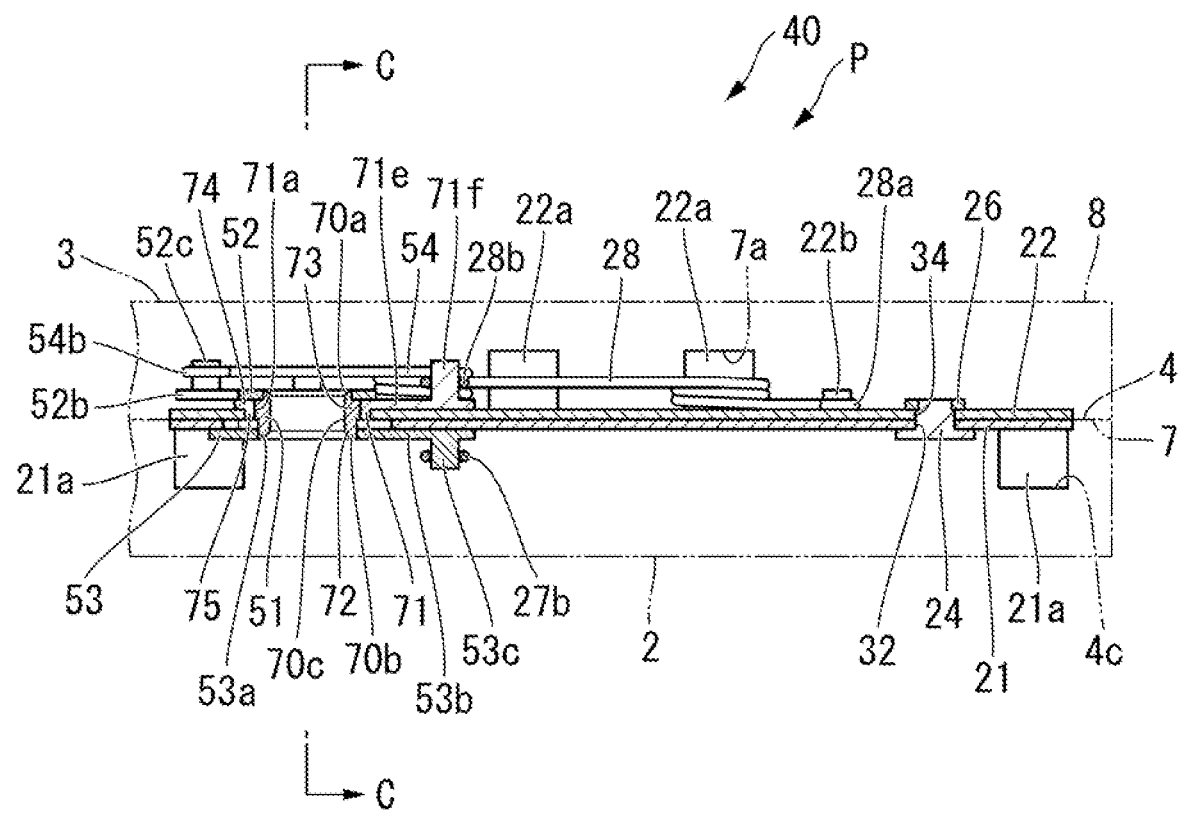
FIG. 24 is a cross-sectional view taken along the section line D-D in FIG. 22.
Figure 25:
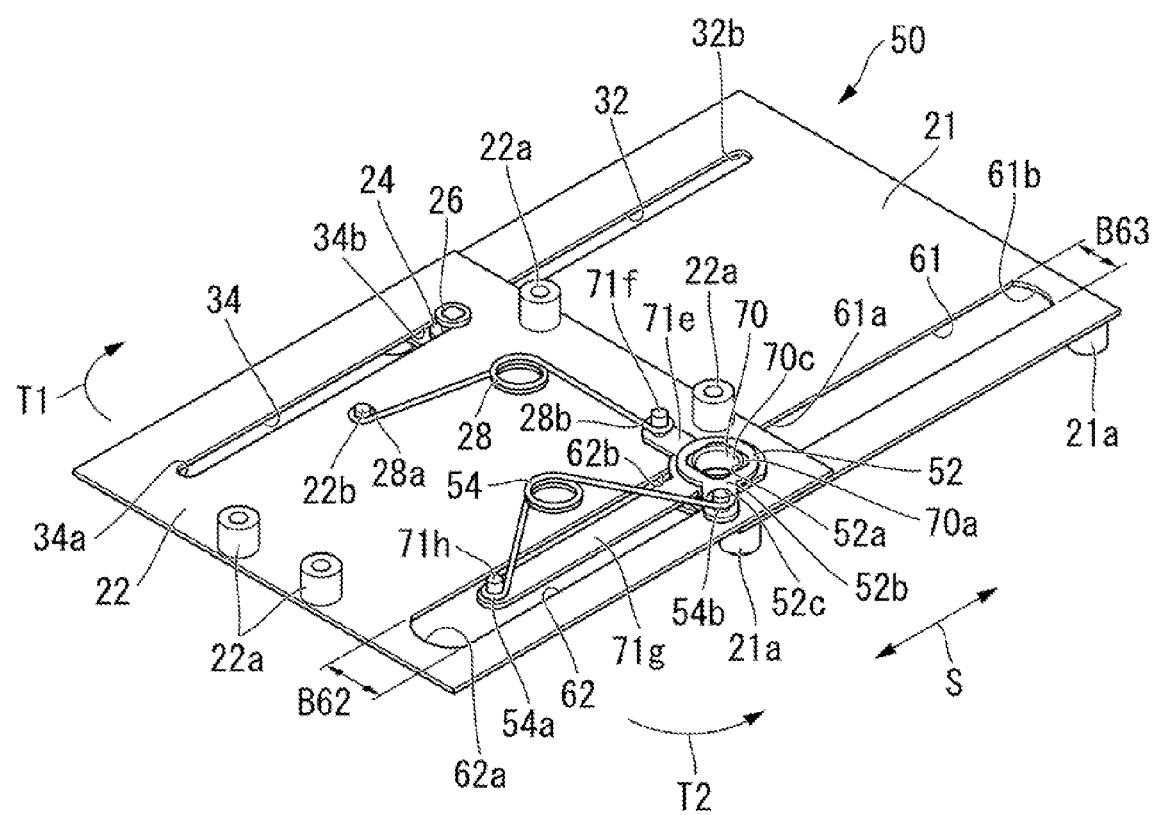
FIG. 25 is a perspective view of a slide mechanism of a second exemplary embodiment of the present invention in a state of being in the basic position.
Figure 26:
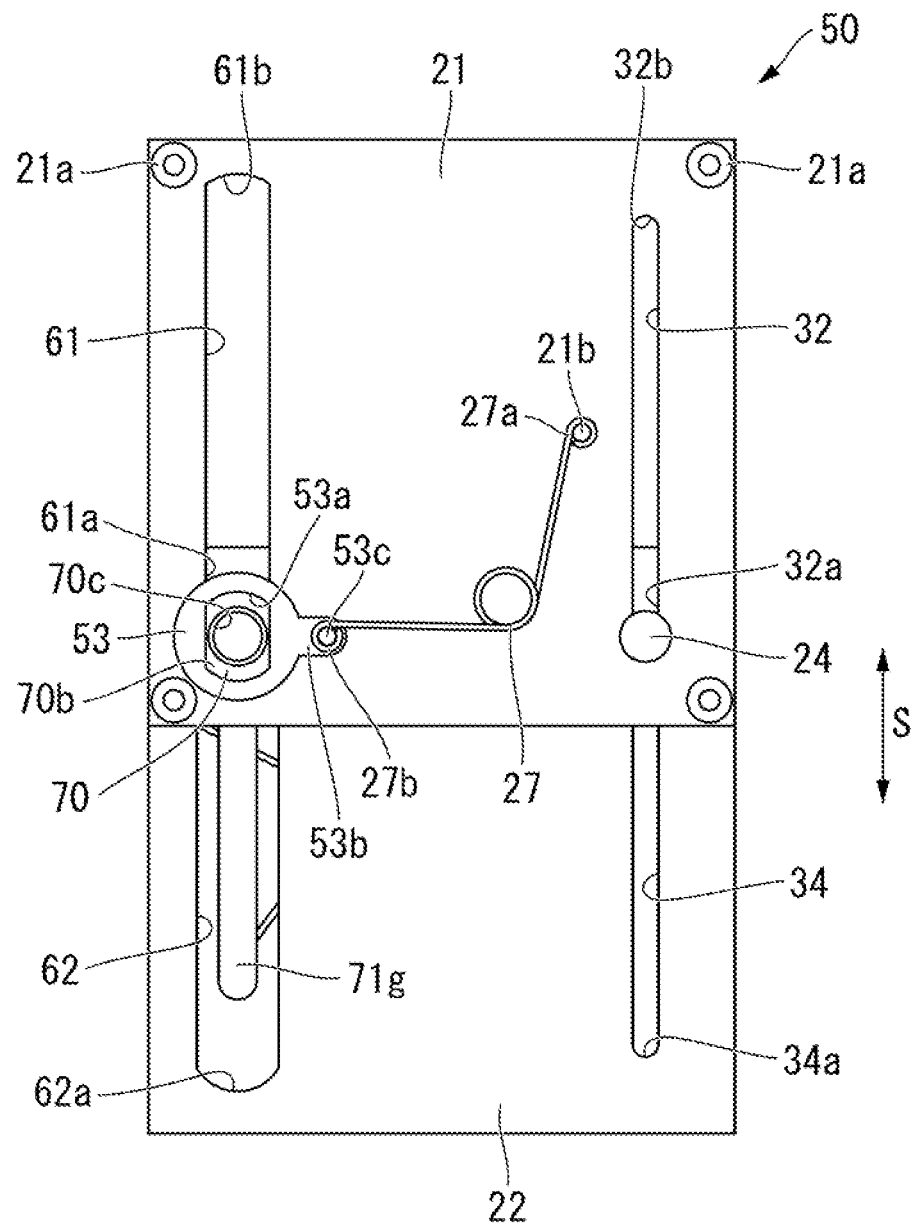
FIG. 26 is a bottom view of the slide mechanism of the second exemplary embodiment of the present invention in a state of being in the basic position.
Figure 27:
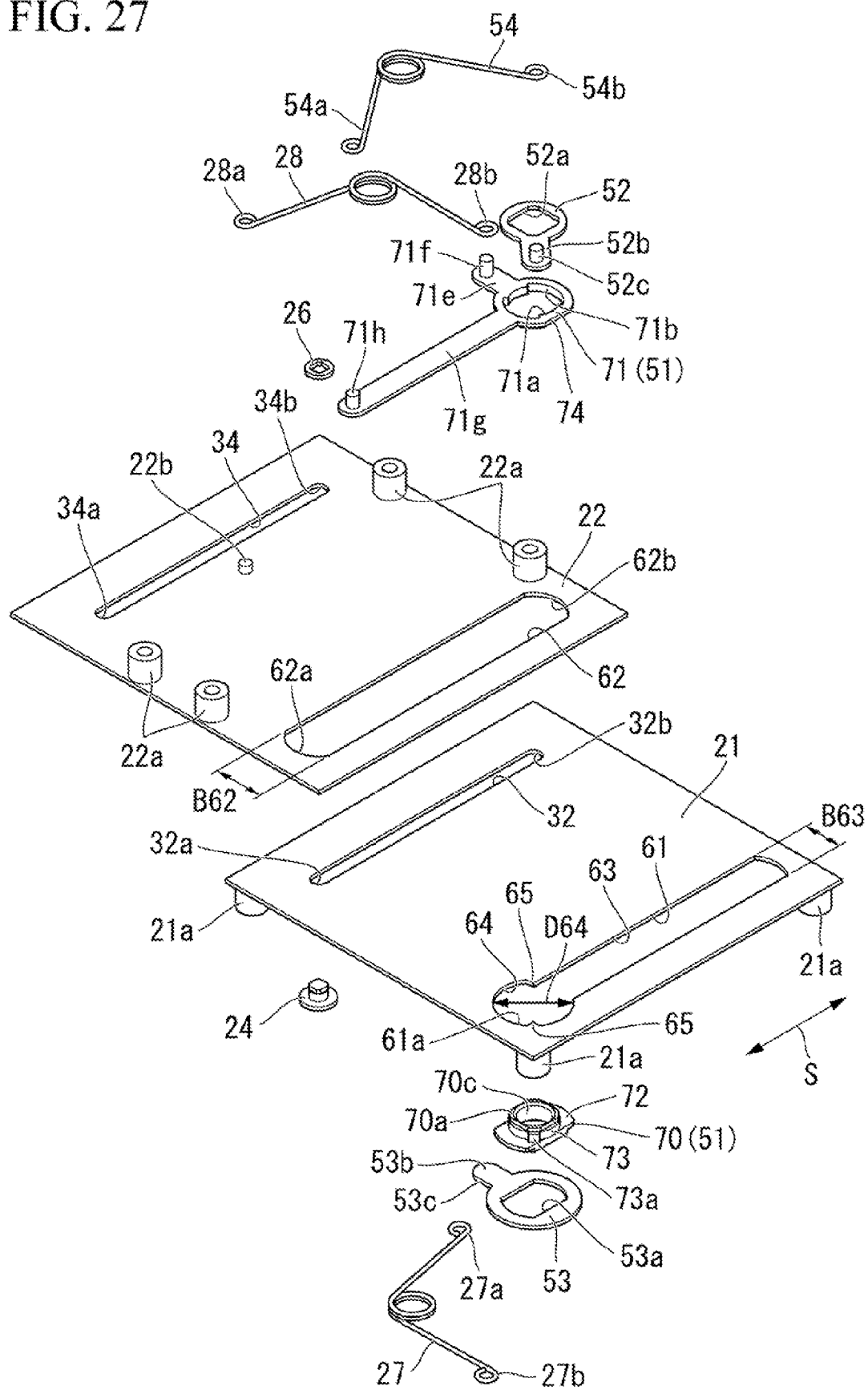
FIG. 27 is an exploded perspective view of the slide mechanism of the second exemplary embodiment of the present invention.

As shown in FIG. 22, basically, a portable terminal 40 of this exemplary embodiment is of a configuration the same as that of the first exemplary embodiment. The portable terminal 40 includes the first casing section 2, the second casing section 3, and a slide mechanism 50. The first casing section 2 and the second casing section 3 are arranged facing each other. The slide mechanism 50 is provided between the first casing section 2 and the second casing section 3, and the second casing section 3 is relatively slide-moved with respect to the first casing section 2. The portable terminal 40 can be slide-moved in the movement direction S and can be set, from the basic position P in the first exemplary embodiment shown in FIG. 22 where the first main surface 4 and the slide surface 7 are overlapped on each other with no displacement therebetween, to the third usage position Q', which is the intermediate position, and it can be further slide-moved to and set to the first usage position Q. Moreover, as with the first exemplary embodiment, by relatively slide-rotating the second casing section 3 to the one direction T1 side of the rotational direction with respect to the first casing section 2, it can be set to the second usage position R where the entirety thereof form a substantially T shape in which the directions along the long edges 4a and 8a thereof are orthogonal to each other. Furthermore, by relatively slide-rotating the second casing section 3 to the other direction T2 side of the rotational direction with respect to the first casing section 2, it can be set to a fourth usage position U where the entirety thereof forms a substantially T shape, so that the position of the second operating section 9 is on the side opposite to that in the second usage position R. In the present exemplary embodiment, these two states, in which rotations are performed in different directions and the entirety thereof respectively forms a substantially T shape, are differentiated as the second usage position R and the fourth usage position U. However, the shape of the entirety thereof at the time when rotated from the basic position P to each direction by 90 degrees, is similar to that in the first exemplary embodiment.

Similarly, from the third usage position Q' and the first usage position Q, it is possible to relatively slide-rotate the second casing section 3 with respect to the first casing section 2. However, in the present exemplary embodiment, in the third usage position Q' and the first usage position Q, the slide mechanism 50 restricts relative slide-rotation of the second casing section 3 with respect to the first casing section 2 to the other direction T2 side of the rotational direction. Consequently, from the third usage position Q' and the first usage position Q, it can be set to the fourth usage position U, but it cannot be set to the second usage position R.

Next, details of the slide mechanism 50 are described.

As shown in FIG. 23 to FIG. 27, the slide mechanism 50 of this exemplary embodiment includes a first slit member 21, a second slit member 22, a first support shaft 51, a second support shaft 24, a first engagement member 52, a second engagement member 26, a third engagement member 53, a first spring member 27, a second spring member 28, and a third spring member 54. The configuration with a second slit 32 of the first slit member 21 and a fourth slit 34 of the second slit member 22, the second support shaft 24 inserted through the second slit 32 and the fourth slit 34 and the second engagement member 26 attached on the second support shaft 24, is similar to that in the first exemplary embodiment, and description thereof is therefore omitted. The configuration of the first slit member 21 and the second slit member 22 is basically similar to that in the first exemplary embodiment, however, the configuration of a first slit 61 and a third slit 62 corresponding thereto differs from that in the first exemplary embodiment.

That is to say, as shown in FIG. 23 to FIG. 27, the first slit 61 and the third slit 62 are communicated through slit ends 61a and 62b thereof in a state where the first casing section 2 and the second casing section 3 are in the basic position P. Furthermore, the first slit 61 and the third slit 62 respectively extend from the slit ends 61a and 62b toward mutually opposite sides in the direction along the long edges 4a and 8a of the first casing section 2 and the second casing section 3, which is the movement direction S. The first slit 61 in the present exemplary embodiment has a slide section 63 and a wide width section 64. The slide section 63 extends in the direction along the long edge 4a of the first casing section 2, which is the movement direction S in the basic position P state. The wide width section 64 is formed in a substantially circular shape with a wider width at the one slit end 61a communicating with the third slit 62 in the basic position P state. A width B62 of the third slit 62 is set greater than a width B63 of the slide section 63 of the first slit 61, according to the relationship with each configuration of the first support shaft 51 shown below.

Figure 28:
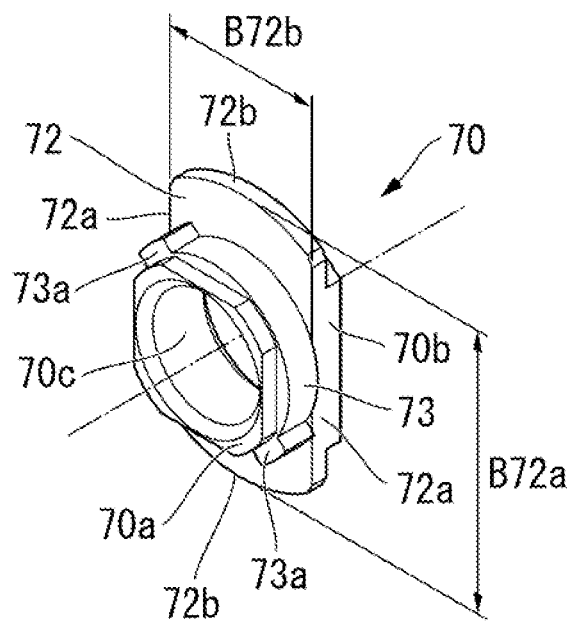
FIG. 28 is a perspective view of a support shaft main body of a first support shaft in the slide mechanism of the second exemplary embodiment of the present invention.
Figure 29:
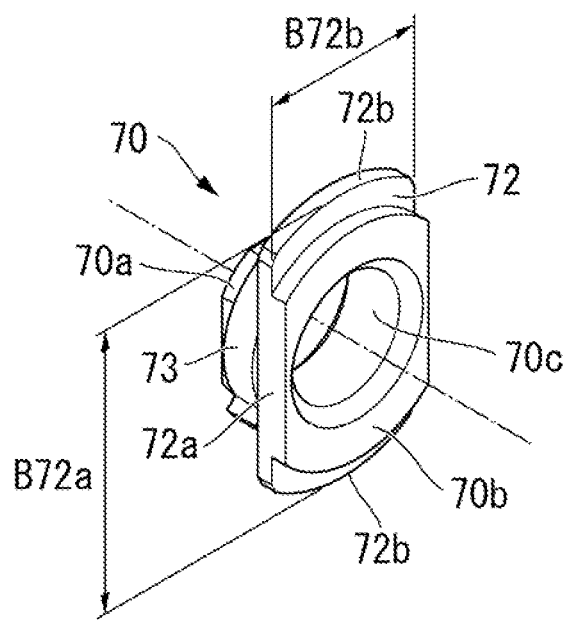
FIG. 29 is a perspective view of the support shaft main body of the first support shaft in the slide mechanism of the second exemplary embodiment of the present invention.
Figure 42A:
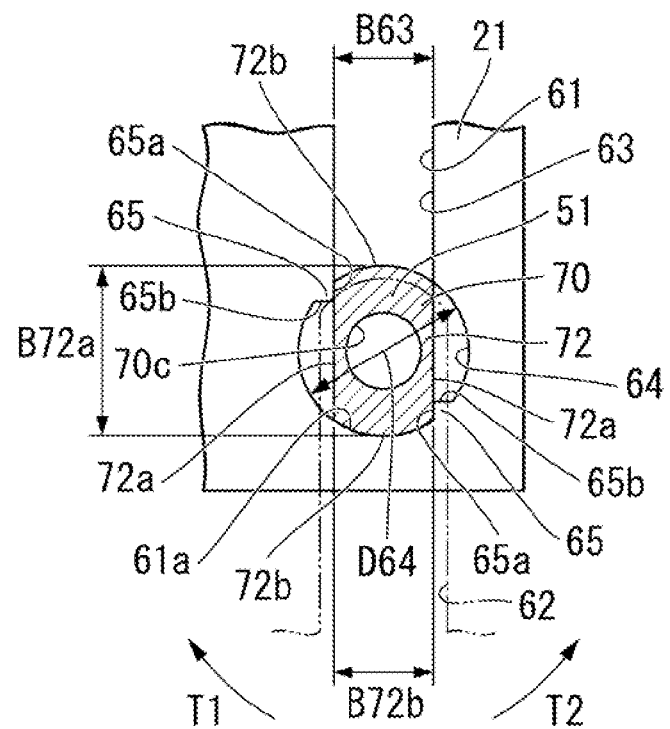
FIG. 42A is a cross-sectional view taken at the position of the first slit and seen from the underside, showing details of the first support shaft of the slide mechanism of the second exemplary embodiment of the present invention in a state of being in the basic position.
Figure 42B:
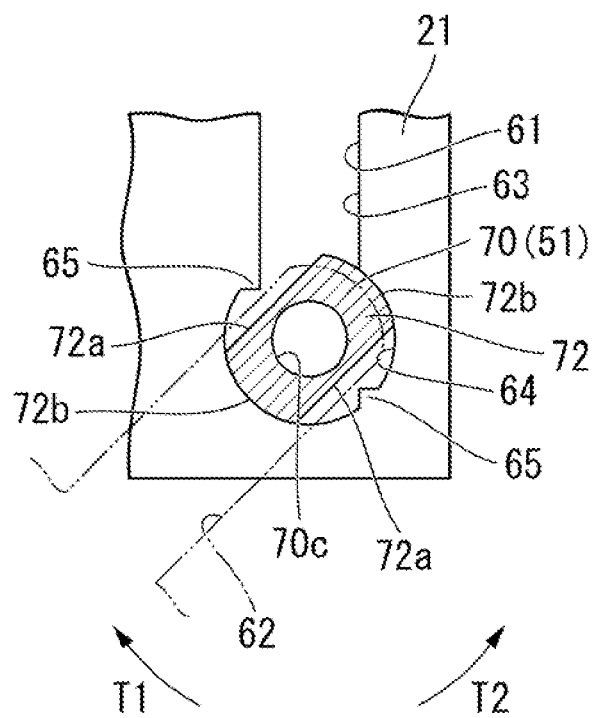
FIG. 42B is a cross-sectional view taken at the position of the first slit and seen from the underside, showing details of the first support shaft of the slide mechanism of the second exemplary embodiment of the present invention in a state of being in the middle of shifting from the basic position to the second usage position.

As shown in FIG. 28 and FIG. 29, the first support shaft 51 has a support shaft main body member 70 and a support shaft auxiliary member 71. The support shaft main body member 70 is inserted through the first slit 61 and the third slit 62. The support shaft auxiliary member 71 is attached on the support shaft main body member 70 and is inserted through the third slit 62. The support shaft main body member 70 has a first shaft section 72 arranged within the first slit 61, and a second shaft section 73 arranged within the third slit 62. As shown in FIG. 42A the first shaft section 72 is formed in a roughly rectangular plate shape when seen in the axial front view. The first shaft section 72 is provided such that in the state of basic position P, the direction along a long edge 72a thereof aligns with the direction along the long edge 4a of the first casing section 2, which is the movement direction S from the basic position P. Moreover, a short edge 72b of the first shaft section 72 is formed in an arc shape so as to correspond to the circular shape of the wide width section 64 of the first slit 61. The diameter of the short edge 72b, that is a width B72a thereof in the direction along the long edge 72a, is set approximately equal to a diameter D64 of the wide width section 64. Consequently, the first shaft section 72 itself is of a configuration capable of rotating about its axis within the wide width section 64 in the first slit member 21. On the other hand, a width B72b in the direction along the short edge 72b is set approximately equal to a width B63 of the slide section 63 of the first slit 61. Consequently, the first shaft section 72 can slide-move only in the direction along the slide section 63 as rotation about its axis is restricted within the slide section 63, and it constitutes a rotation restriction section which restricts its rotation with respect to the first slit 61.

On the other hand, in the wide width section 64, there are provided stopper sections 65 which restrict rotation of this first shaft section 72. The stopper sections 65 are each formed in a triangular shape having a right angle between two edges 65*a* and 65*b* thereof, projecting inward from the wide width section 64, and they are provided being a pair point-symmetrical with each other. In the state of the basic position P, the support shaft main body member 70 is capable of relatively rotating to the one direction side T1 of the rotational direction with respect to the first slit 61, and one edge 65*a* of each stopper section 65 comes in contact therewith, thereby restricting its rotation to the other direction side T2. As described above, since the width B63 of the slide section 63 and the width B72*b* of the first shaft section 72 in the direction along the short edge 72*b* are set approximately equal, in this state, the support shaft main body member 70 is capable of moving along the slide section 63 while its rotation is restricted and its relative orientation is maintained constant. When the support shaft main body member 70 relatively rotates by 90 degrees to the other direction T2 of the rotational direction from the basic position P state, through the state shown in FIG. 42B, the first shaft section 72 comes in contact with the other edge 65*b* of the stopper section 65. As a result, the support shaft main body member 70 is restricted from rotating further in this rotation position. As described later, a state shown in FIG. 42 corresponds to the second usage position R. When the first shaft section 72 rotates within the wide width section 64, the direction of the short edge 72*b* having the narrowest width does not match with the widthwise direction of the slide section 63, which is approximately equal to the width B72*b* of the short edge 72*b*. Accordingly, the support shaft main body member 70 is restricted from moving to the slide section 63 side along the movement direction S, and only its rotation is allowed.

As shown in FIG. 28 and FIG. 29, in the support shaft main body member 70, the second shaft section 73 is of a substantially columnar shape which is concentric with the first shaft section 72, that is, the center axial line thereof passes through the centroid of the rectangular shape of the first shaft section 72, and it is provided projecting from one surface of the first shaft section 72. On the outer circumferential surface of the second shaft section 73 there are formed engagement protuberances 73*a* which respectively project in the radial direction thereof, that is, in a direction orthogonal to the axis. In the present exemplary embodiment, the engagement protuberances 73*a* are provided as a pair opposing each other and in different directions approximately 45 degrees angled from the direction along the long edge 72*a* of the first shaft section 72.

In the support shaft main body member 70, on the other surface on the opposite side to the one surface having the second shaft section 73 of the first shaft section 72 projecting therefrom, and on the end section of the second shaft section 73, there are formed a first fitted section 70*a* and a second fitted section 70*b* each having a non-circular cross-sectional shape. As described later, the first engagement member 52 and the third engagement member 53 respectively engage with the first fitted section 70*a* and the second fitted section 70*b*. In the support shaft main body member 70, there is formed a through hole 70*c* which passes through the first shaft section 72, the second shaft section 73, the first fitted section 70*a*, and the second fitted section 70*b*. As with the first exemplary embodiment, in the through hole 70*c*, there can be arranged a conductive wire which electrically connects the internal constituents of the first casing section 2 with the internal constituents of the second casing section 3 side.

Figure 30:
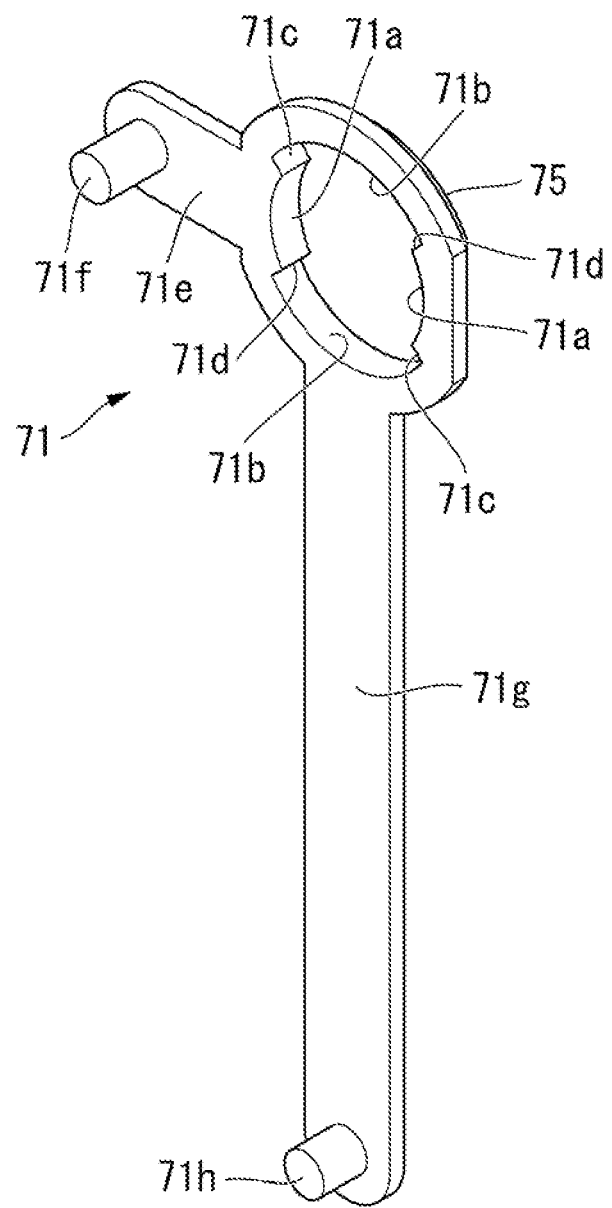
FIG. 30 is a perspective view of a support shaft auxiliary member of the first support shaft in the slide mechanism of the second exemplary embodiment of the present invention.
Figure 31:
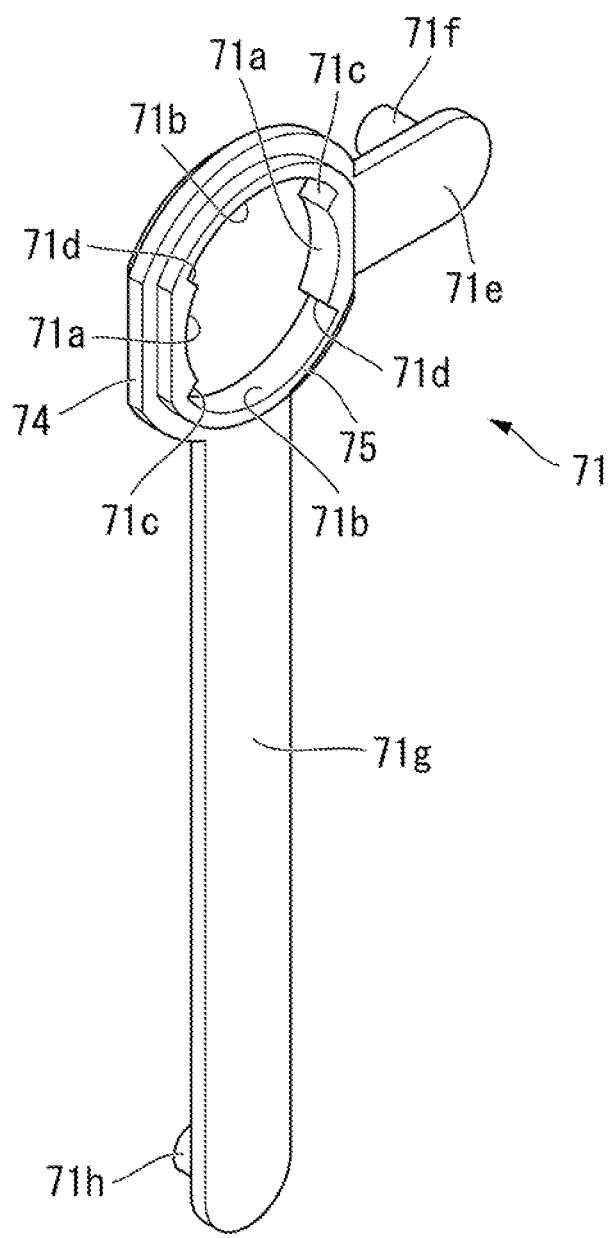
FIG. 31 is a perspective view of the support shaft auxiliary member of the first support shaft in the slide mechanism of the second exemplary embodiment of the present invention.

As shown in FIG. 30 and FIG. 31, the support shaft auxiliary member 71 has a flange section 74 and an insertion section 75. The flange section 74 has an outer diameter greater than the width B62 of the third slit 62. The insertion section 75 is provided projecting from the flange section 74, and is inserted into the third slit 62. The support shaft auxiliary member 71 is such that the insertion section 75 is inserted into the third slit 62 from the side opposite to the side where the first flit member 21 is overlapped on the second slit member 22, and the flange section 74 engages with the second slit member 22. The insertion section 75 is such that the outer circumferential surface thereof is configured with two flat surfaces having a distance therebetween set approximately equal to the width B62 of the third slit 62, and two curved surfaces having curvature radii corresponding to both of the slit ends 62*a* and 62*b* of the third slit 62. Accordingly, the support shaft auxiliary member 71 is capable of slide-moving in the direction along the third slit 62 while restricting mutual rotation and sliding the above two flat surfaces, within the third slit 62. In the support shaft auxiliary member 71, there is formed a fitting-insertion hole 71*a*, into which the second shaft section 73 of the support shaft main member 70 is inserted. The fitting insertion hole 71*a* is set approximately equal to the outer diameter of the second shaft section 73. The second shaft section 73 is inserted into the fitting insertion hole 71*a* so as to be able to rotate about its axis inside the fitting insertion hole 71*a*. Consequently, the support shaft main body member 70 and the support shaft auxiliary member 71 are capable of integrally slide-moving along the first slit 61 or the third slit 62 while being capable of rotating relatively about their axes.

Figure 49A:
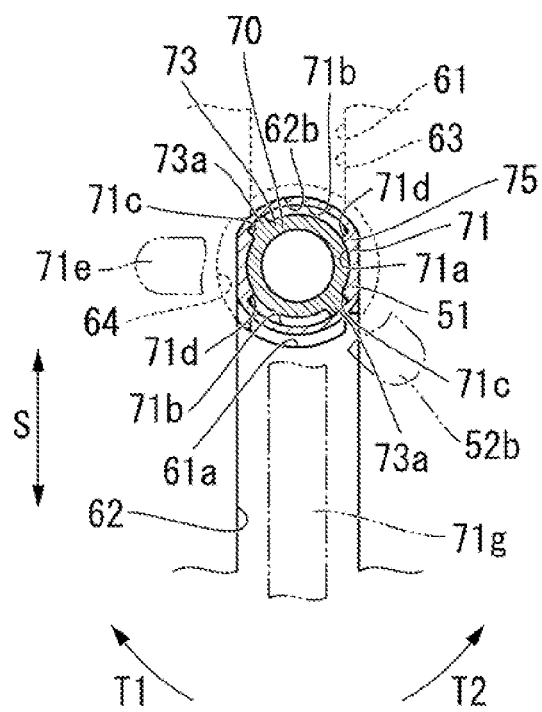
FIG. 49A is a cross-sectional view taken at the position of the third slit and seen from the underside, showing details of the first support shaft of the slide mechanism of the second exemplary embodiment of the present invention in a state of being in the basic position.
Figure 49B:
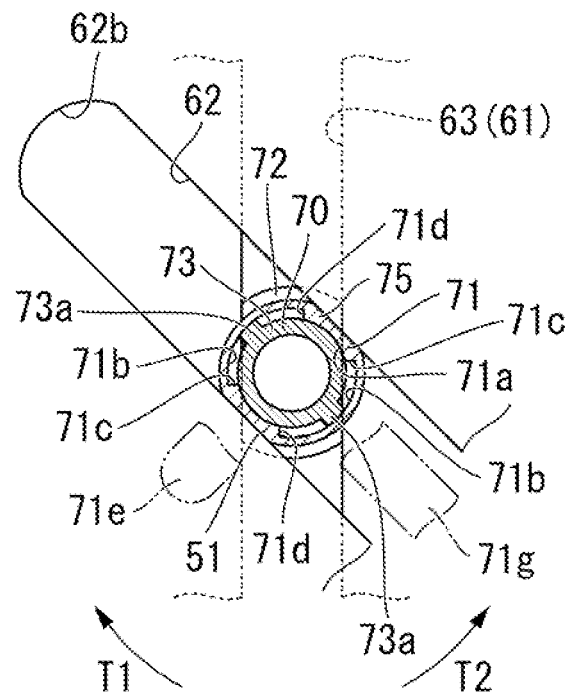
FIG. 49B is a cross-sectional view taken at the position of the third slit and seen from the underside, showing details of the first support shaft of the slide mechanism of the second exemplary embodiment of the present invention in a state of being in the middle of shifting from the basic position to the fourth usage position.
Figure 49C:
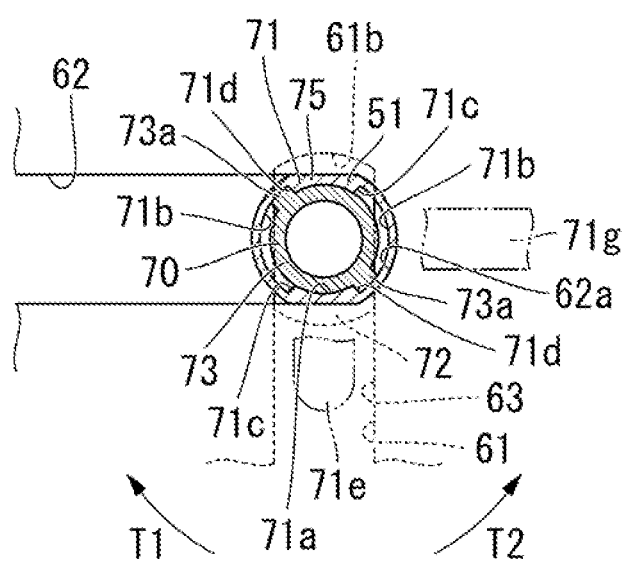
FIG. 49C is a cross-sectional view taken at the position of the third slit and seen from the underside, showing details of the first support shaft of the slide mechanism of the second exemplary embodiment of the present invention in a state of being in the fourth usage position.
Figure 50:
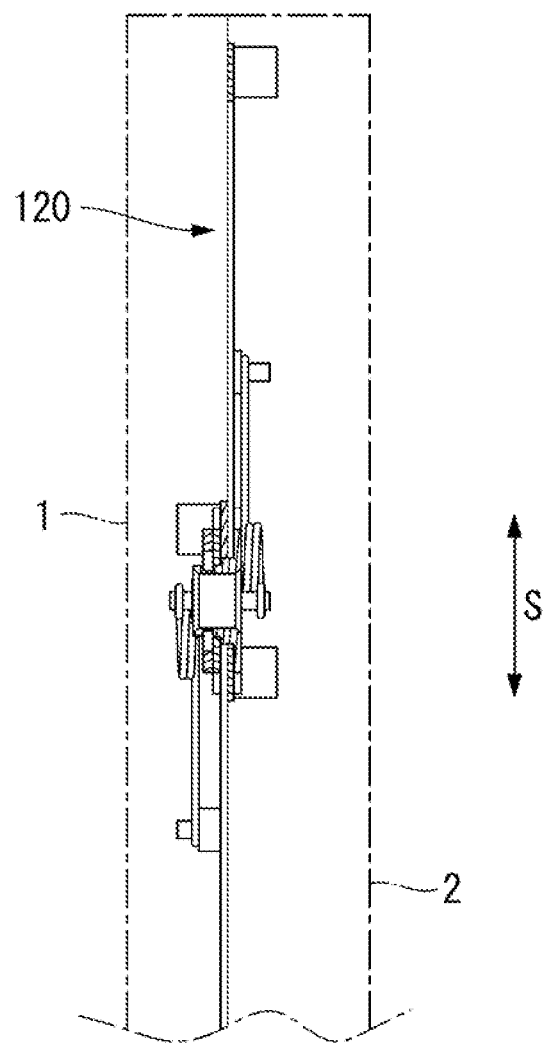
FIG. 50 is a cross-sectional view of a portable terminal of a third exemplary embodiment of the present invention in a state of being in the basic position, taken along the section line A-A in FIG. 1.
Figure 51:
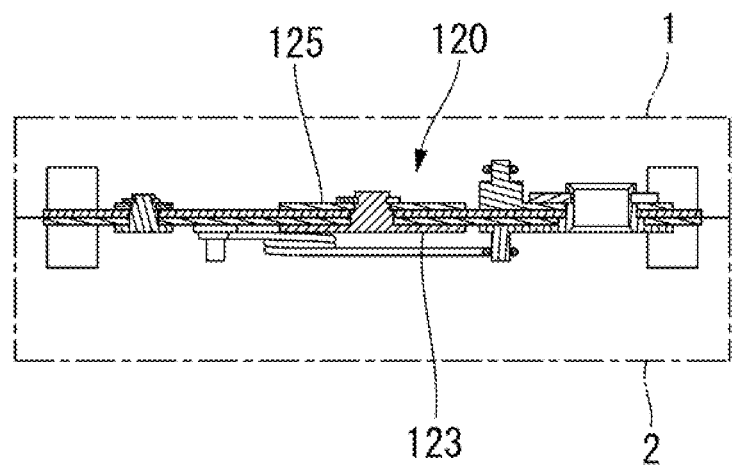
FIG. 51 is a cross-sectional view of the portable terminal of the third exemplary embodiment of the present invention in a state of being in the basic position, taken along the section line B-B in FIG. 1.
Figure 52:
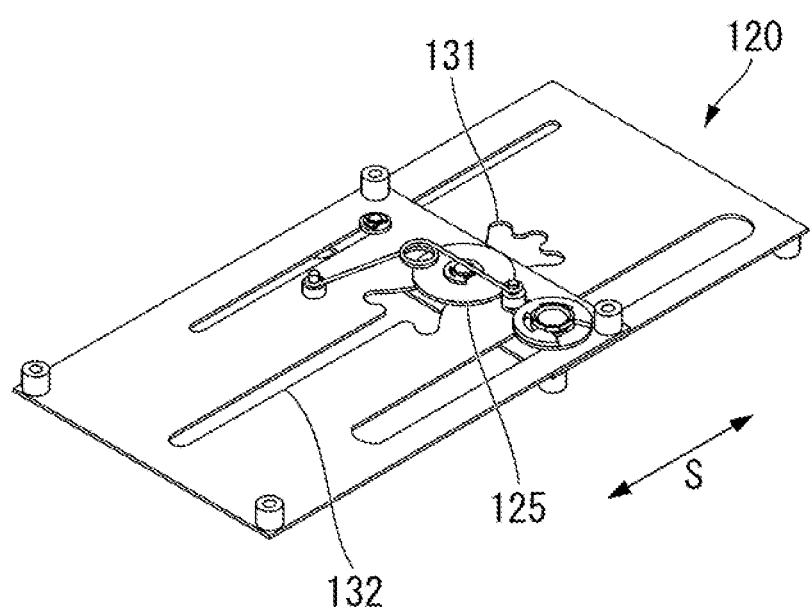
FIG. 52 is a perspective view of a slide mechanism of the third exemplary embodiment of the present invention in a state of being in the basic position.
Figure 53:
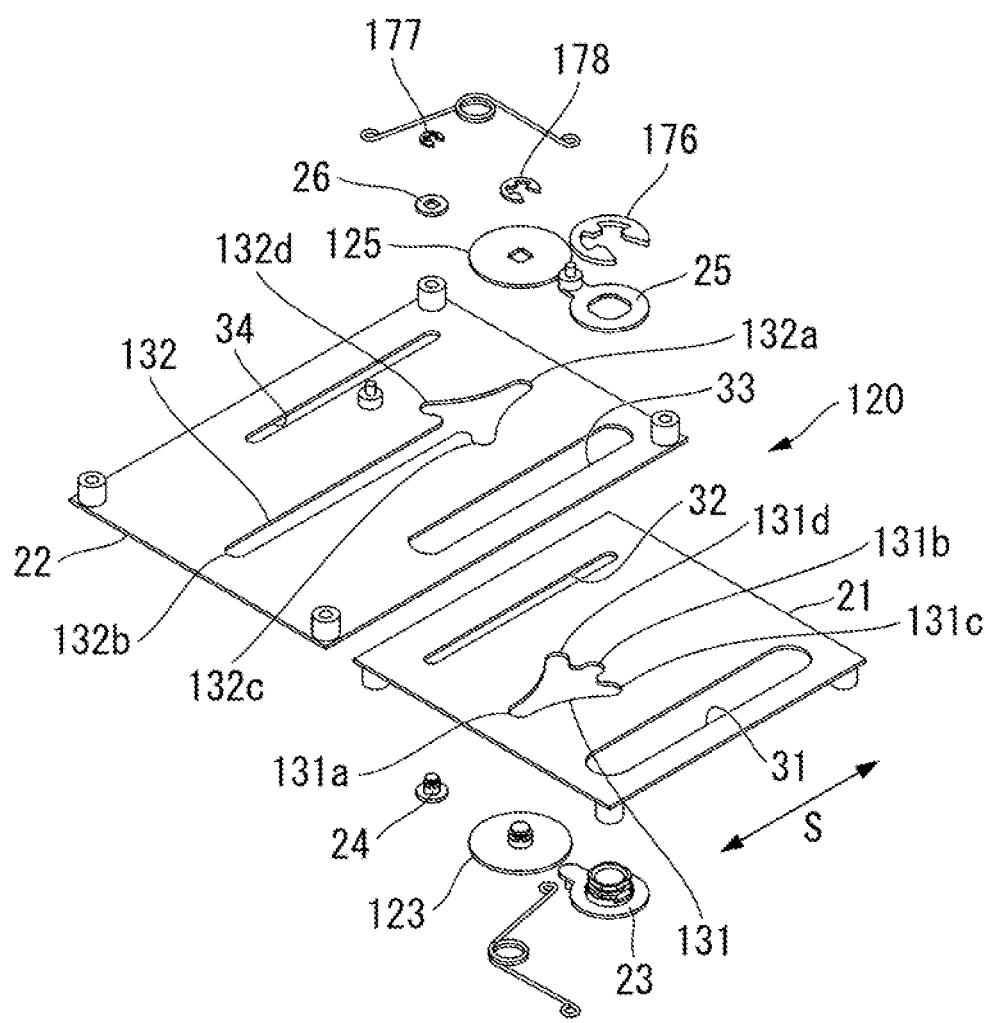
FIG. 53 is an exploded perspective view of the slide mechanism of the third exemplary embodiment of the present invention.
Figure 54:
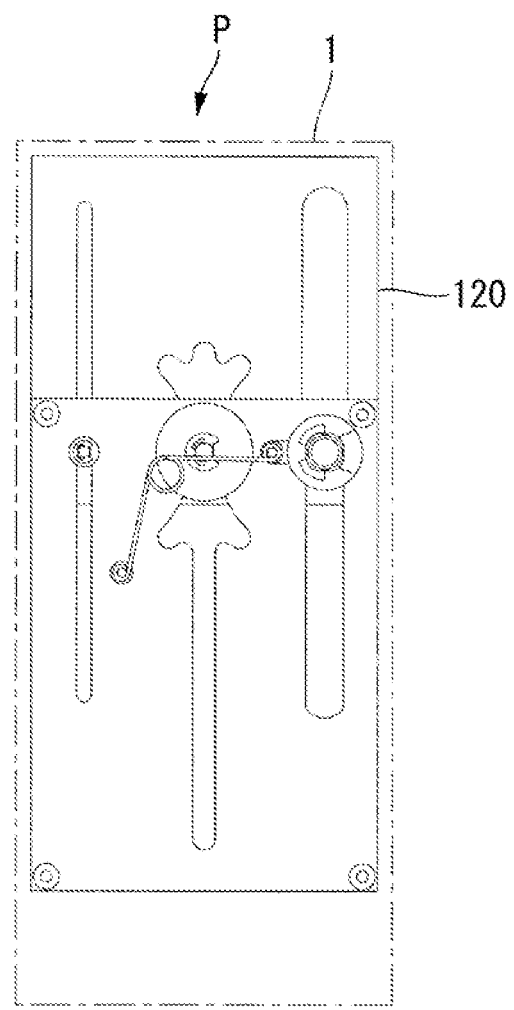
FIG. 54 is a top view of the slide mechanism of the third exemplary embodiment of the present invention in a state of being in the basic position.
Figure 55:
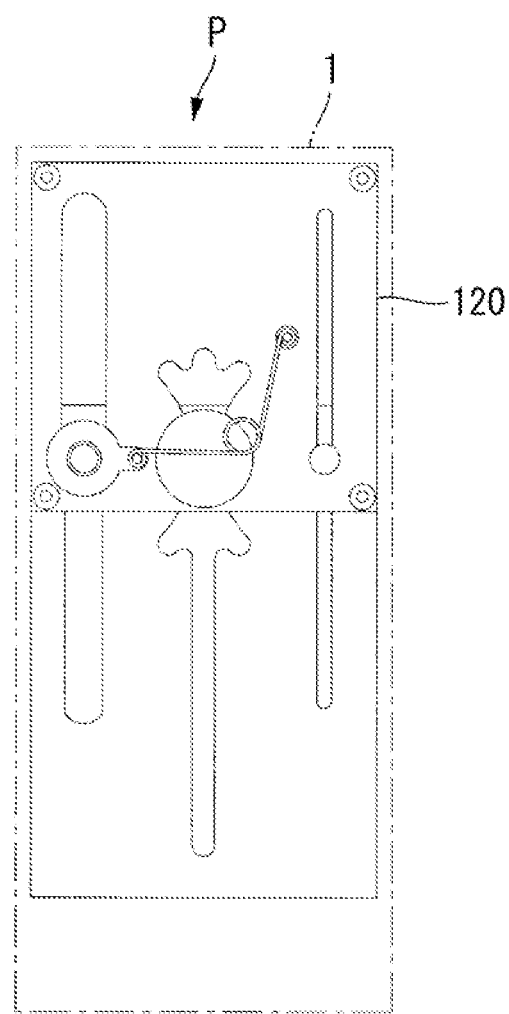
FIG. 55 is a bottom view of the slide mechanism of the third exemplary embodiment of the present invention in a state of being in the basic position.
Figure 56:
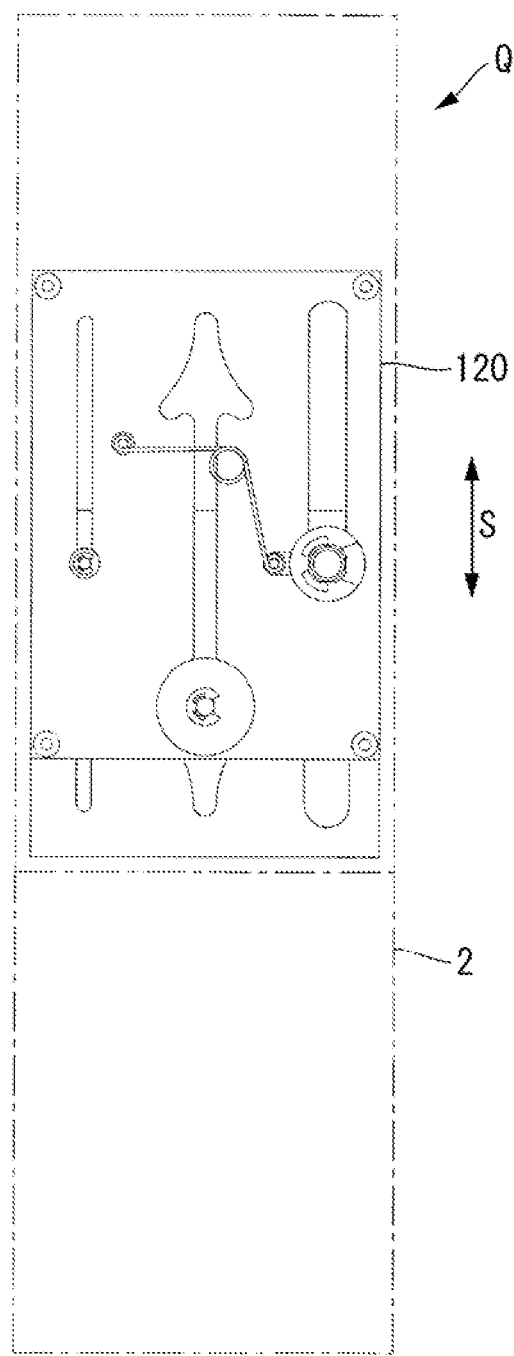
FIG. 56 is a top view of the slide mechanism of the third exemplary embodiment of the present invention in a state of being in the first usage position.
Figure 57:
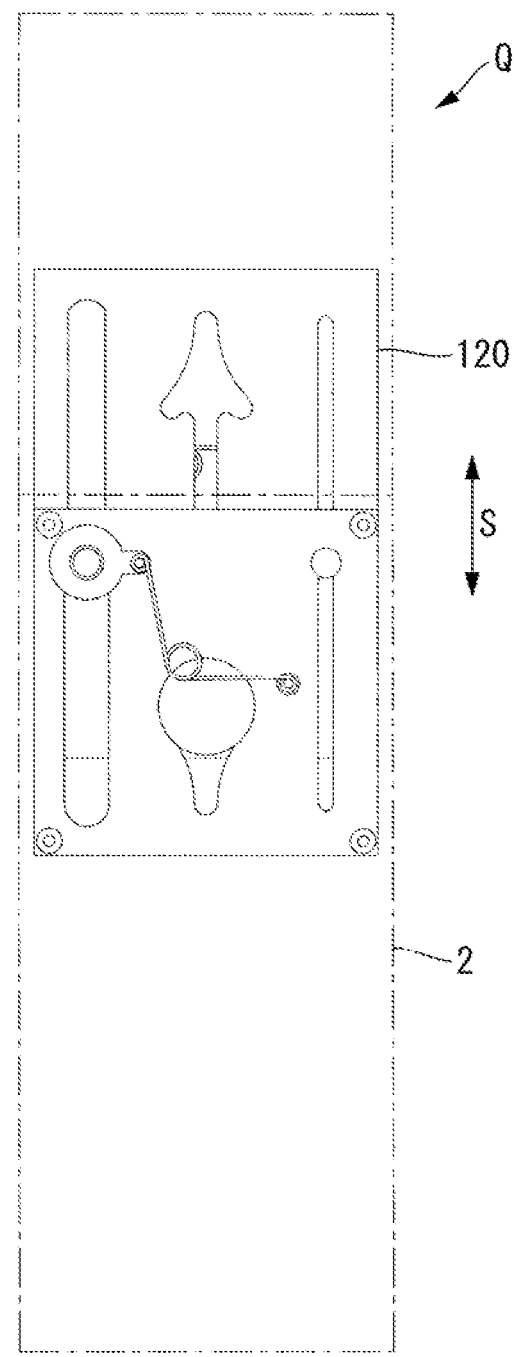
FIG. 57 is a bottom view of the slide mechanism of the third exemplary embodiment of the present invention in a state of being in the first usage position.

As shown in FIG. 49A, on the outer circumferential side of the fitting insertion hole 71*a*, there are formed guide holes 71*b*, each of which communicates with the fitting insertion hole 71*a* and into which the engagement protuberance 73*a* provided on the second shaft section 73 is inserted so as to be able to move back and forth. The guide holes 71*b* are provided in a pair, corresponding to the engagement protuberances 73*a*. Each guide hole 71*b* is formed so that each of the engagement protuberances 73*a* comes in contact with and engages with one end section 71*c* of the guide hole 71*b*, in a range of approximately 90 degrees around the circumferential direction along the outer circumference of the fitting insertion hole 71*a*, and also in the state of basic position P. Consequently, the support shaft auxiliary member 71 can be relatively rotated with respect to the support shaft main body member 70 by approximately 90 degrees from the state of the basic position P toward the other direction side T2 of the rotational direction, until, from the state shown in FIG. 49B, each of the engagement protuberances 73*a* has come in contact with and has engaged with the other end section 71*d* on the opposite side of the one end section 71*c* of the guide hole 71*b* as shown in FIG. 49C. As described later, the state shown in FIG. 49C corresponds to the fourth usage position U.

As shown in FIG. 23 to FIG. 27, the first engagement member 52 is of a circular plate shape having an outer diameter greater than the fitting insertion hole 71*a* and the guide hole 71*b* of the support shaft auxiliary member 71. In the center part of the first engagement member 52, there is formed a through hole 52*a* corresponding to the outer shape of the first fitted section 70*a*. This first engagement member 52 engages with the first fitted section 70*a* which projects from the second shaft section 73 of the support shaft main body member 70 inserted into the third slit 62. The third engagement member 53 is of a circular plate shape having an outer diameter greater than the width B63 of the slide section 63 of the first slit 61. In the center part of the third engagement member 53, there is formed a through hole 53a corresponding to the outer shape of the second fitted section 70b. This first engagement member 52 engages with the second fitted section 70b which projects from the first shaft section 72 of the support shaft main body member 70 inserted into the first slit 61. As described above, the first engagement member 52 and the second engagement member 53 are fitted respectively on the first fitted section 70a and the second fitted section 70b of the support shaft main body member 70. Consequently, the support shaft main body member 70 and the support shaft auxiliary member 71 are sandwiched by the first engagement member 52 and the third engaged member 53 and are integrally joined, while being arranged within the first slit 61 and the third slit 62. Furthermore, the support shaft main body member 70 and the support shaft auxiliary member 71 slide-move as described above, and they can be slide-rotated.

The first spring member 27 and the second spring member 28 respectively function as a retaining section which retains the positional relationship between the first slit member 21 and the second slit member 22. Furthermore, when the first slit member 21 and the second slit member 22 are slid, the first spring member 27 and the second spring member 28 respectively function as an auxiliary section which assists the movement operation and rotation operation thereof. As the first spring member 27, a torsion coil spring is used for example. The first spring member 27 is such that one end 27a thereof is fixed on the first slit member 21, and other end 27b thereof is fixed on the first support shaft 51. More specifically, as with the first exemplary embodiment, the one end 27a of the first spring member 27 is wound on a first supporting protuberance 21b provided on the first slit member 21, and is attached thereon so as to be able to rotate about the first supporting protuberance 21b. The third engagement member 53 is fixed on the first support shaft 51. On this third engagement member 53, there is formed an overhang section 53b toward the first supporting protuberance 21b in a direction orthogonal to the direction along the first slit 61. On the tip end side of this overhang section 53b, there is provided a substantially columnar second supporting protuberance 53c. The other end 27b of the first spring member 27 is wound on the second supporting protuberance 53c, and is attached thereon so as to be able to rotate about the second supporting protuberance 53c. The first spring member 27 is attached on the first supporting protuberance 21b and the second supporting protuberance 53c with the distance between the one end 27a and the other end 27b reduced. Thereby, the first supporting protuberance 21b and the second supporting section 53c are biased by the first spring member 27 so as to always increase the distance therebetween. Accordingly, as with the first exemplary embodiment, in the case where the first support shaft 51 is positioned to the one slit end 61a side from the center position of the first slit 61 along the movement direction S, it is biased toward the one slit end 61a side along the first slit 61. On the other hand, in the case where the first support shaft 51 is positioned on the other slit end 61b side, it is biased toward the other slit end 61b side.

As the second spring member 28, a torsion coil spring is used for example. The second spring member 28 is such that one end 28a thereof is fixed on the second slit member 22, and the other end 28b thereof is fixed on the first engagement member 52 fixed on the first support shaft 51. More specifically, as with the first exemplary embodiment, the one end 28a of the second spring member 28 is wound on a third supporting protuberance 22b provided on the second slit member 22, and is attached thereon so as to be able to rotate about the third supporting protuberance 22b. On the support shaft auxiliary member 71 of the first support shaft 51, there is formed an overhang section 71e toward the third supporting protuberance 22b in a direction orthogonal to the direction along the third slit 62. On the tip end side of this overhang section 71e, there is provided a substantially columnar fourth supporting protuberance 71f. The other end 28b of the second spring member 28 is wound on the fourth supporting protuberance 71f, and is attached thereon so as to be able to rotate about the fourth supporting protuberance 71f. The second spring member 28 is attached on the third supporting protuberance 22b and the fourth supporting protuberance 71f with the distance between the one end 28a and the other end 28b reduced. Thereby, the third supporting protuberance 22b and the fourth supporting section 71f are biased by the second spring member 28 so as to always increase the distance therebetween. Accordingly, as with the first exemplary embodiment, in the case where the first support shaft 51 is positioned to the one slit end 62b side from the center position of the third slit 62 along the movement direction, it is biased toward the one slit end 62b side along the third slit 62. On the other hand, in the case where the first support shaft 51 is positioned on the other slit end 62a side on the opposite side, it is biased toward the other slit end 62a side. That is to say, the first support shaft 51 is biased by the second spring member 28 towards either one of the slit ends 62b and 62a, depending on the position thereof within the third slit 62.

In the first support shaft 51, the third spring member 54 functions as a retaining section which retains the relative positional relationship about the axis between the support shaft main body member 70 and the support shaft auxiliary member 71. Furthermore, when the support shaft auxiliary member 71 is relatively rotated about its axis with respect to the support shaft 70, the third spring member 54 functions as an auxiliary section which assists its rotation operation. As the third spring member 54, a torsion coil spring is used for example. The third spring member 54 is such that one end 54a thereof is fixed on the support shaft auxiliary member 71, and the other end 54b thereof is fixed on the support shaft main body member 70. More specifically, in the first support shaft 51, on the support shaft auxiliary member 71, there is formed another overhang section 71g along the third slit 62. On the tip end side of this other overhang section 71g, there is provided a substantially columnar fifth supporting protuberance 71h. Meanwhile, an overhang section 52b is formed also on the first engagement member 52 fixed on the first support shaft 51. On the tip end side of this overhang section 52b, there is provided a substantially columnar sixth supporting protuberance 52c. The overhang section 52b of the first engagement member 52 overhangs in a direction which is angled by approximately 45 degrees from the overhanging direction of the other overhang section 71g of the support shaft auxiliary member 71 in the state of the basic position P. The support shaft main body member 70 and the third engagement member 53 rotate relatively about their axes with respect to the support shaft auxiliary member 71, within an approximately 90 degree range restricted by the above engagement protuberances 73a and the guide holes 71b. This rotation enables the overhang section 52b of the first engagement member 52, through the state of being overlapped with the other overhang section 71g of the support shaft auxiliary member 71, to overhang in a direction which is angled by approximately 45 degrees from the direction of the other overhang section 71g of the support shaft auxiliary member 71 overhanging to the opposite side. The one end 54a of the third spring member 54 is wound on the fifth supporting protuberance 71h, and is attached thereon so as to be able to rotate about the fifth supporting protuberance 71h. The other end 54b of the third spring member 54 is wound on the sixth supporting protuberance 52c, and is attached thereon so as to be able to rotate about the sixth supporting protuberance 52c. The third spring member 54 is attached on the fifth supporting protuberance 71h and the sixth supporting protuberance 52c with the distance between the one end 54a and the other end 54b reduced. Thereby, the fifth supporting protuberance 71h and the sixth supporting section 52c are biased by the third spring member 54 so as to always increase the distance therebetween. Consequently, in the first support shaft 51, the support shaft main body member 70 is biased toward either the one direction T1 side of the rotational direction about its axis or the other direction T2 side, according to the relative positional relationship about its axis with respect to the support shaft auxiliary member 71.

Next, operation of the portable terminal 40 and the slide mechanism 50 of this exemplary embodiment is described, based on FIG. 32 to FIG. 49. FIG. 32 to FIG. 35, FIG. 38 to FIG. 41, and FIG. 44 to FIG. 47 are schematic diagrams illustrating the positional relationship in the respective configurations of the first casing section 2, the second casing section 3, and the slide mechanism 50 in respective states, and these diagrams illustrate only minimal configurations required for description. The operation which takes place from the basic position P, through the third usage position Q', to the first usage position Q, is similar to that in the first exemplary embodiment, and the description thereof is therefore omitted.

Figure 36A:
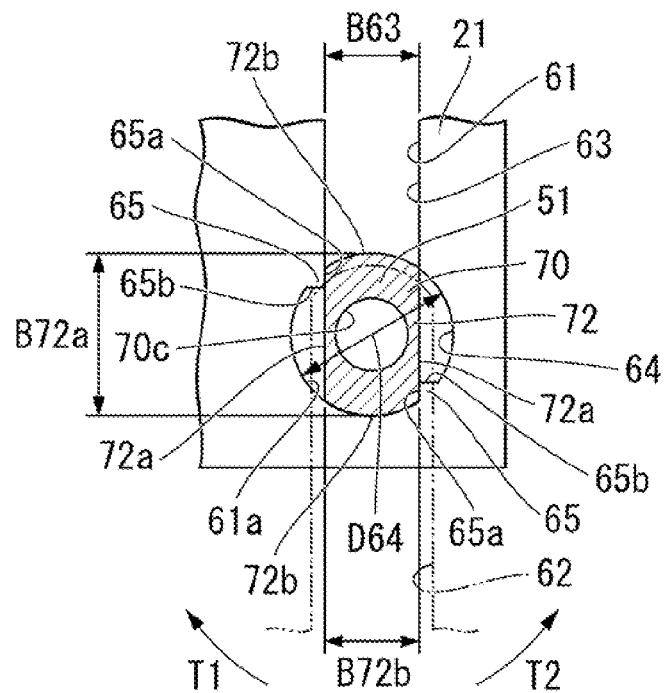
FIG. 36A is a cross-sectional view taken at the position of a first slit and seen from the underside, showing details of the first support shaft of the slide mechanism of the second exemplary embodiment of the present invention in a state of being in the basic position.
Figure 37A:
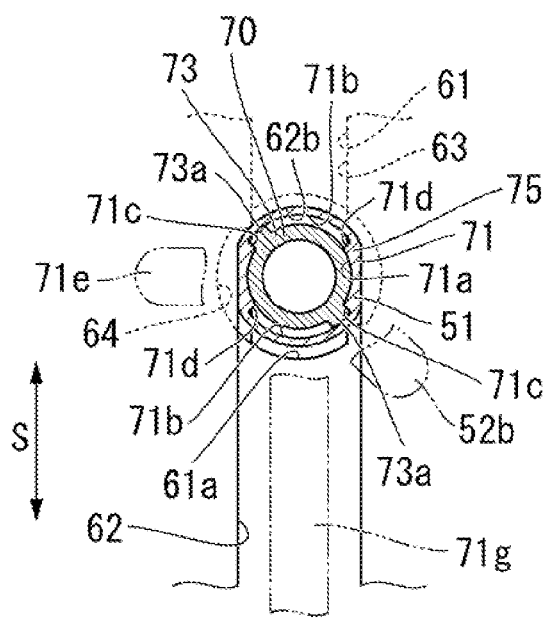
FIG. 37A is a cross-sectional view taken at the position of a third slit and seen from the underside, showing details of the first support shaft of the slide mechanism of the second exemplary embodiment of the present invention in a state of being in the basic position.
Figure 37A:

FIG. 32 and FIG. 33, and FIG. 36A and FIG. 37A show a state where the first casing section 2 and the second casing section 3 are in the basic position P. In this state, in the slide mechanism 50, as shown in FIG. 36A, the first support shaft 51 is positioned within the wide width section 64 that is the one slit end 61a of the first slit 61, while the first support shaft 72 of the support shaft main body member 70 is such that the direction along the long edge 72a aligns with the moving direction S, in which the slide section 63 extends. Furthermore, as shown in FIG. 37A, the second shaft section 73 of the support shaft main body member 70 and the insertion section 75 of the support shaft auxiliary member 71 are positioned at the other slit end 62b of the third slit 62. Moreover, the second support shaft 24 is positioned at the one slit end 32a of the second slit 32 of the first slit member 21, and it is positioned at the other slit end 34b of the fourth slit 34 of the second slit member 22.

Figure 36B:
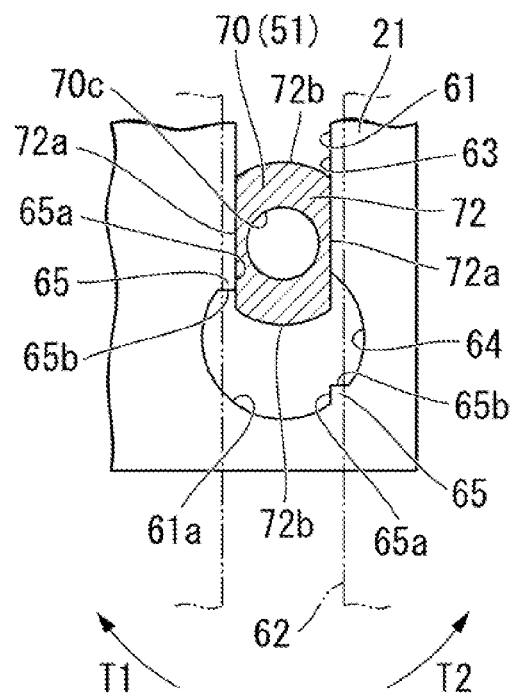
FIG. 36B is a cross-sectional view taken at the position of the first slit and seen from the underside, showing details of the first support shaft of the slide mechanism of the second exemplary embodiment of the present invention in a state of being in the middle of shifting from the basic position to the first usage position.
Figure 36C:
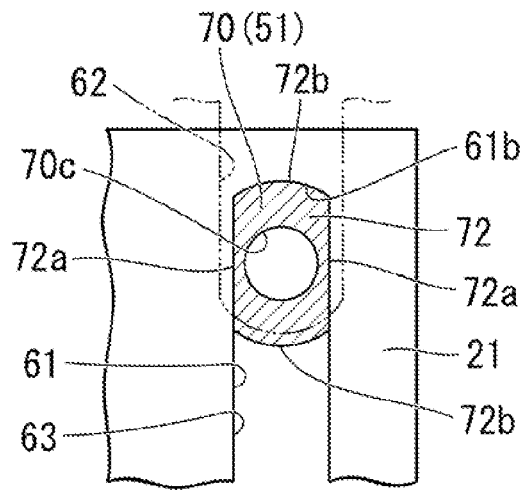
FIG. 36C is a cross-sectional view taken at the position of the first slit and seen from the underside, showing details of the first support shaft of the slide mechanism of the second exemplary embodiment of the present invention in a state of being in the first usage position.
Figure 36C:
Figure 37B:
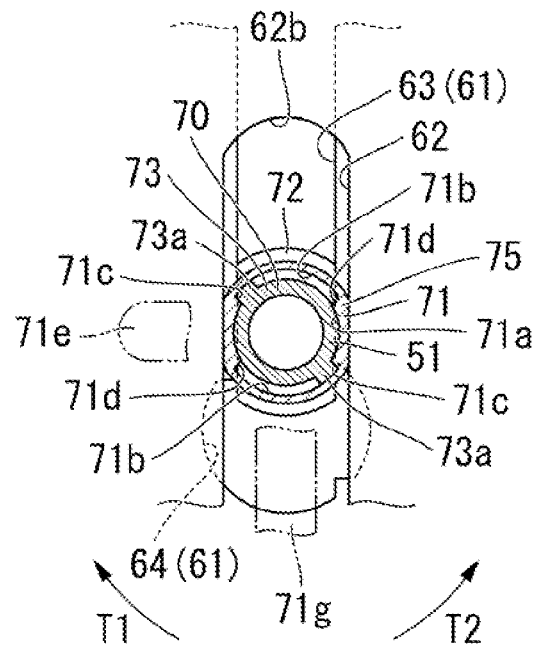
FIG. 37B is a cross-sectional view taken at the position of the third slit and seen from the underside, showing details of the first support shaft of the slide mechanism of the second exemplary embodiment of the present invention in a state of being in the middle of shifting from the basic position to the first usage position.
Figure 37C:
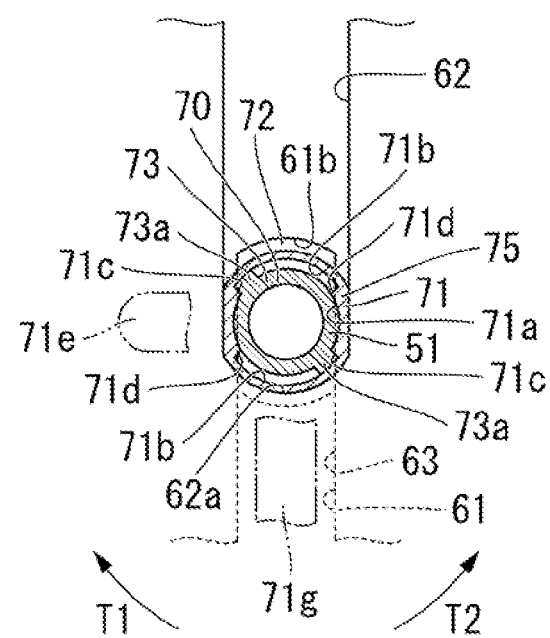
FIG. 37C is a cross-sectional view taken at the position of the third slit and seen from the underside, showing details of the first support shaft of the slide mechanism of the second exemplary embodiment of the present invention in a state of being in the first usage position.

First, there is described a case where the operator, from the state of the basic position P, gives a force to operate the second casing section 3 toward one side in the movement direction S with respect to the first casing section 2. Consequently, as shown in FIG. 36B, in the first support shaft 51, the first shaft section 72 of the support shaft main body member 70 becomes able to move in the movement direction S from the wide width section 64 of the first slit 61 to the slide section 63. As shown in FIG. 36C, this first shaft section 72 is able to move until it has come in contact with the other slit end 61b of the first slit 61. Moreover, as shown in FIG. 37B and FIG. 37C, in the first support shaft 51, the second shaft section 73 of the support shaft main body member 70 and the insertion section 75 of the support shaft auxiliary member 71 are able to move from the other slit end 62b of the third slit 62 to the one slit end 62a. Similarly, the second support shaft 24 can move within the second slit 32 and the fourth slit 34 in the movement direction S. Consequently, as with the first exemplary embodiment, the second casing section 3 is able to move with respect to the first casing section 2 along the movement direction S, which is the direction along the long edges 4a and 8a thereof, and the first casing section 2 and the second casing section 3 can be brought, through the third usage position Q', to the first usage position Q shown in FIG. 34 and FIG. 35, and in FIG. 36C and FIG. 37C. The function of the first spring member 27 and the second spring member 28 is similar to that in the first exemplary embodiment from the basic position P through the third usage position Q' to the first usage position Q, and the description thereof is therefore omitted.

In the first support shaft 51, the third spring member 54 always biases the support shaft auxiliary member 71 with respect to the support shaft main body member 70 toward the one direction side T1 of the rotational direction (in other words, it biases the support shaft member 70 with respect to the support shaft auxiliary member 71 toward the other direction side T2 of the rotational direction). Accordingly, while the support shaft auxiliary member 71 is able to relatively slide-rotate with respect to the support shaft main body member 70 to the other direction side T2 of the rotational direction, it is able, with the third spring member 54 serving as a retaining section, to integrally slide-move to the third usage position Q' and the first usage position Q while the state of the basic position P is retained.

Figure 32:
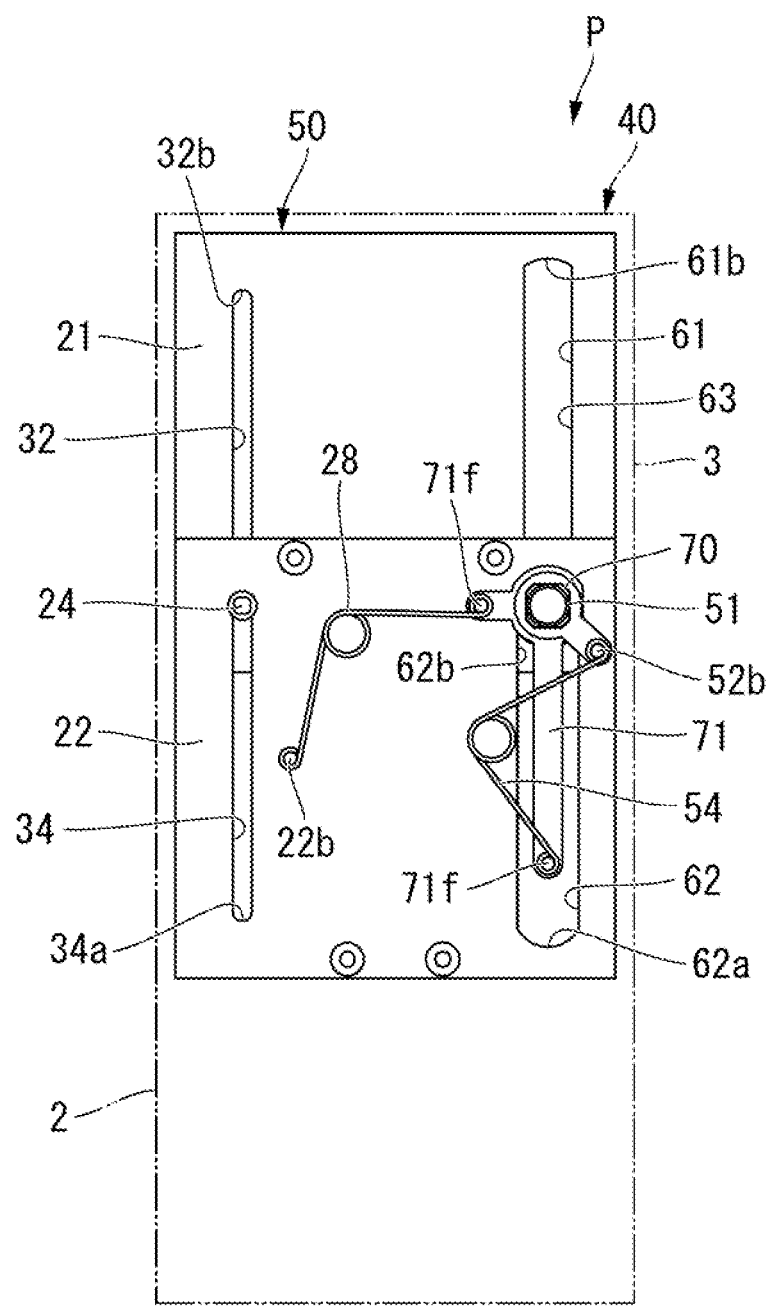
FIG. 32 is a top view of the slide mechanism of the second exemplary embodiment of the present invention in a state of being in the basic position.
Figure 33:
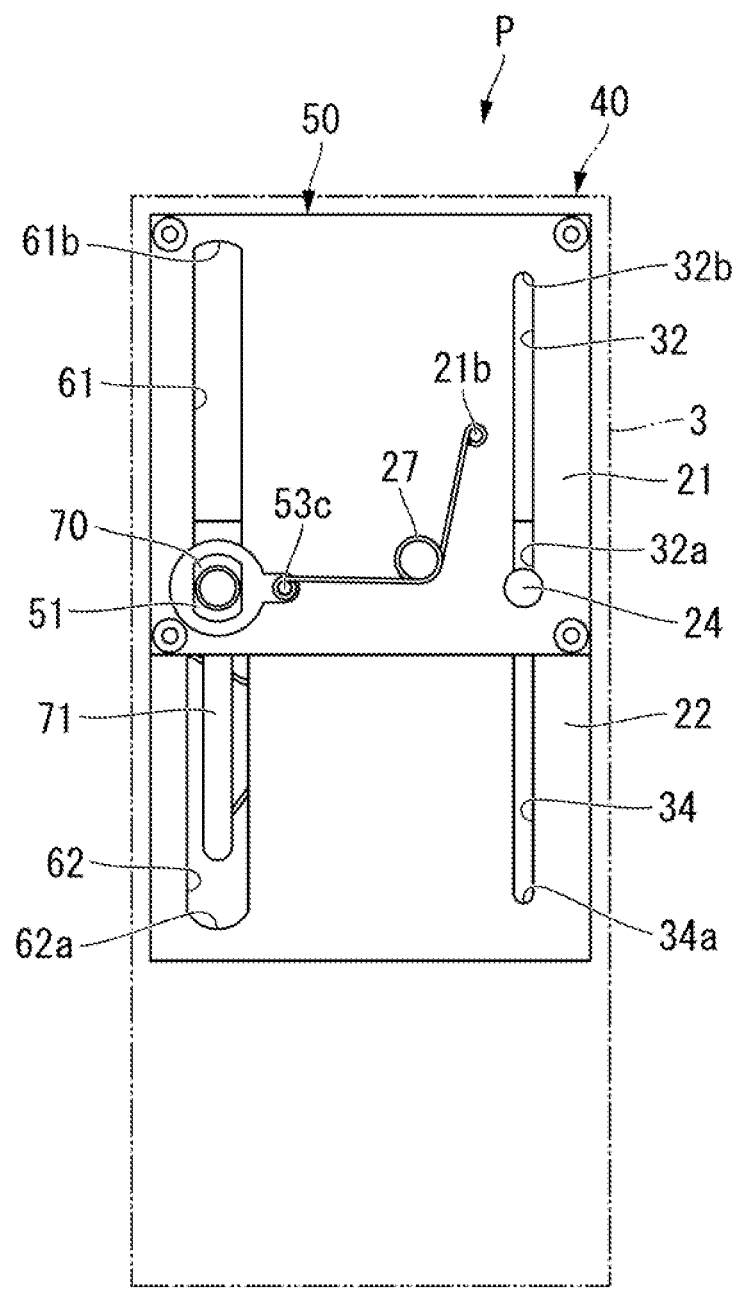
FIG. 33 is a bottom view of the slide mechanism of the second exemplary embodiment of the present invention in a state of being in the basic position.
Figure 38:
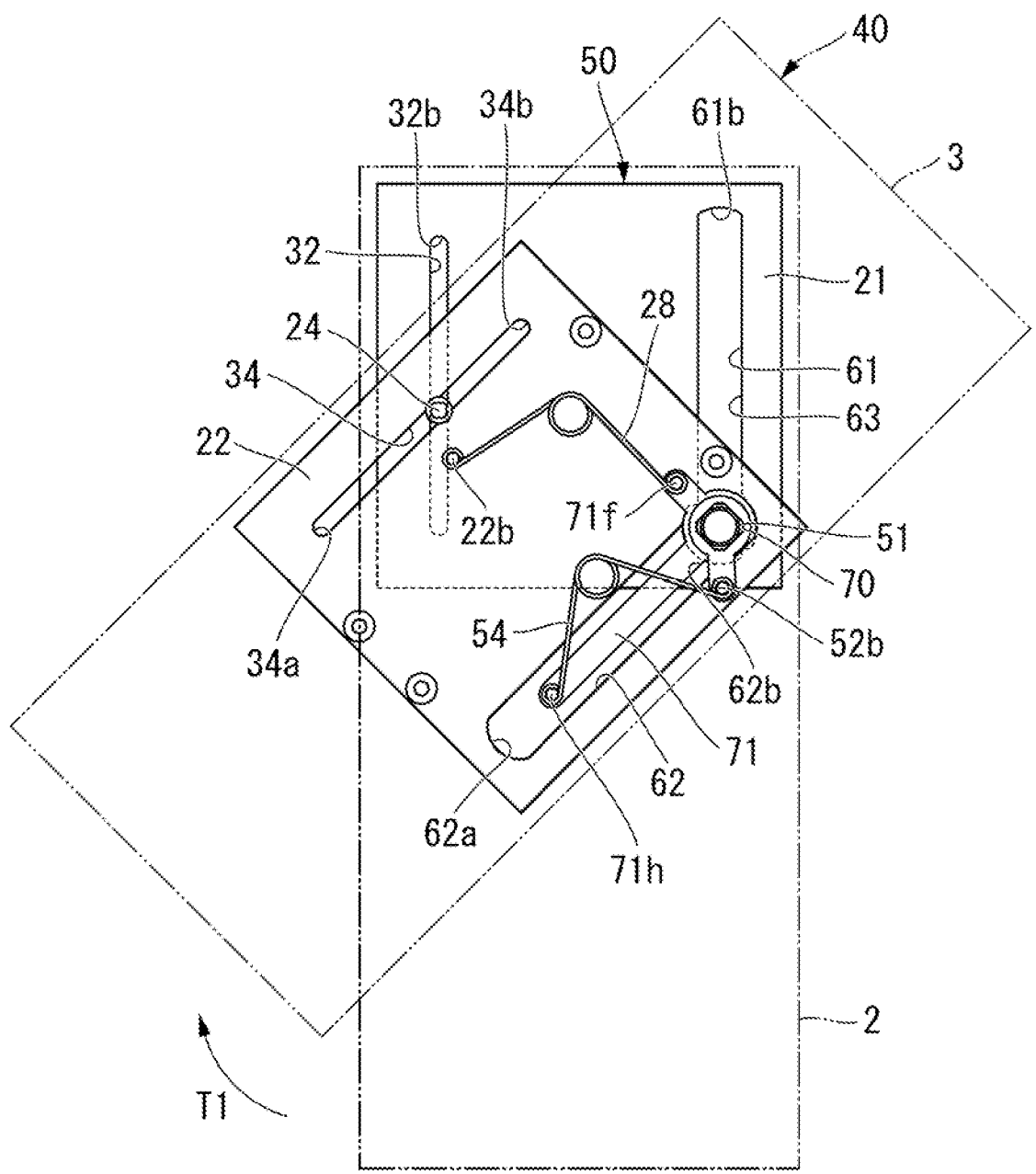
FIG. 38 is a top view of the slide mechanism of the second exemplary embodiment of the present invention in a state of being in the middle of rotating in one direction side of the rotational direction.
Figure 39:
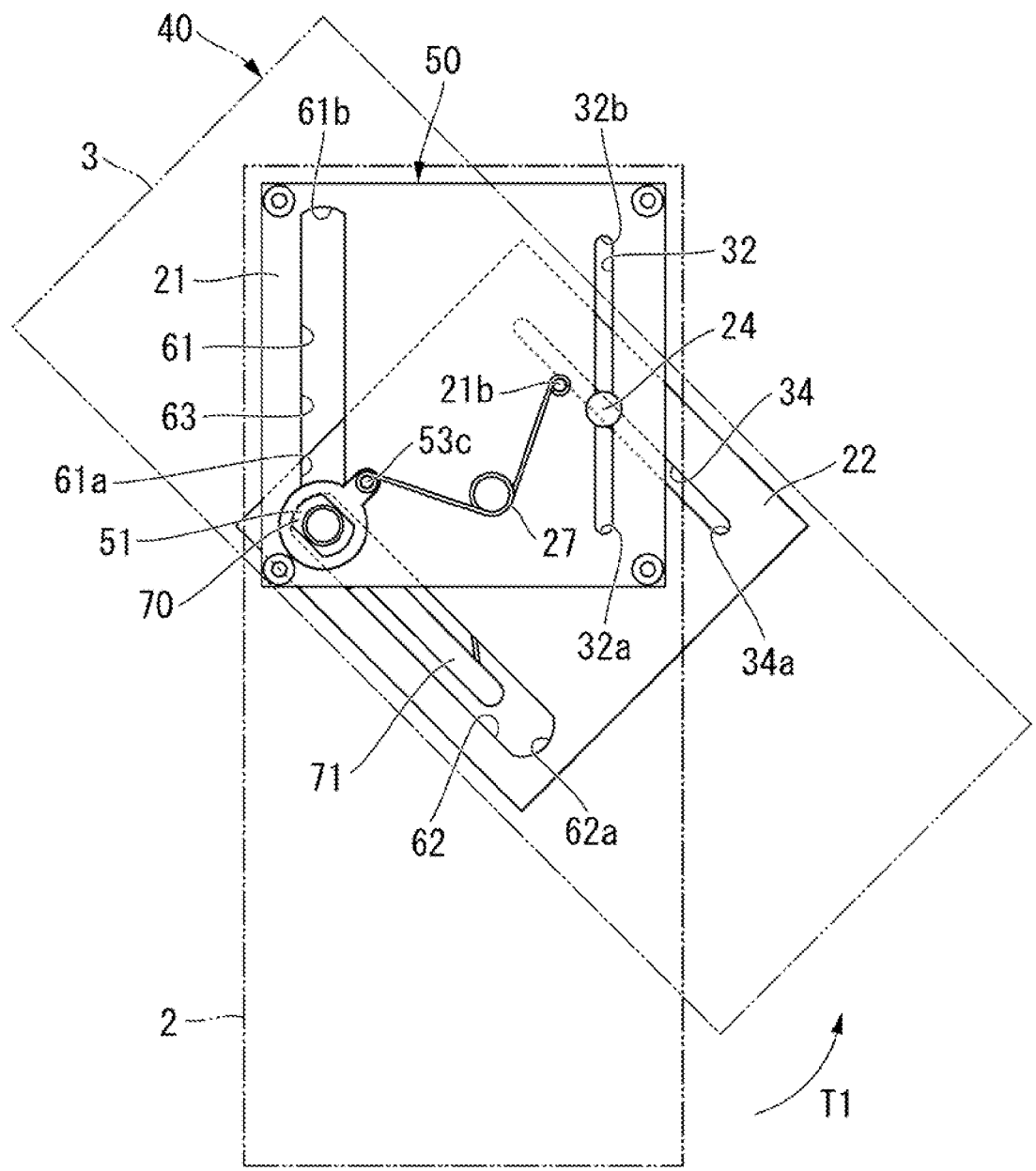
FIG. 39 is a bottom view of the slide mechanism of the second exemplary embodiment of the present invention in a state of being in the middle of rotating in the one direction side of the rotational direction.
Figure 43A:
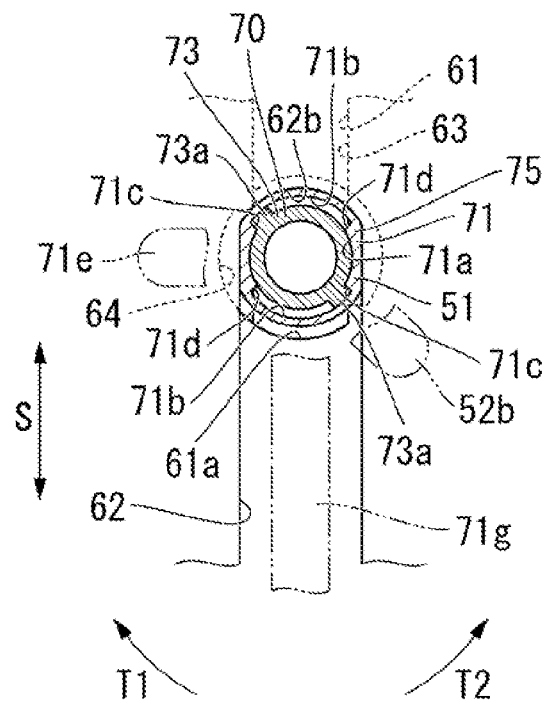
FIG. 43A is a cross-sectional view taken at the position of a third slit and seen from the underside, showing details of the first support shaft of the slide mechanism of the second exemplary embodiment of the present invention in a state of being in the basic position.
Figure 43B:
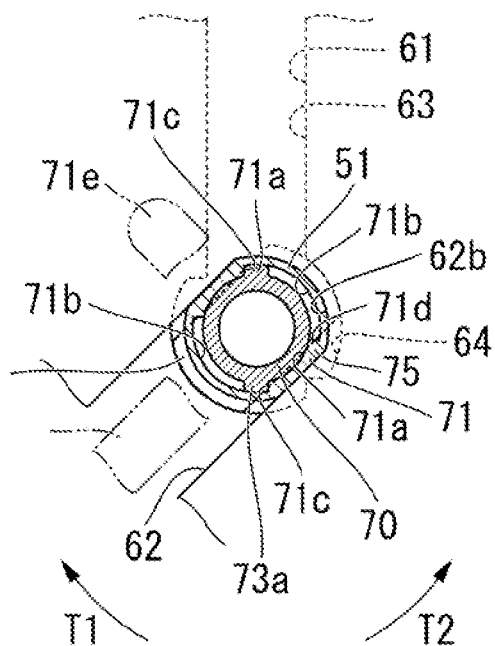
FIG. 43B is a cross-sectional view taken at the position of the third slit and seen from the underside, showing details of the first support shaft of the slide mechanism of the second exemplary embodiment of the present invention in a state of being in the middle of shifting from the basic position to the second usage position.
Figure 43C:
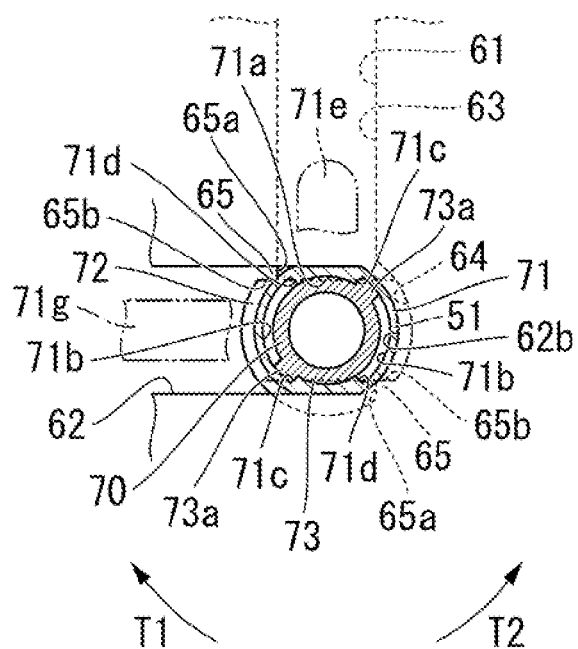
FIG. 43C is a cross-sectional view taken at the position of the third slit and seen from the underside, showing details of the first support shaft of the slide mechanism of the second exemplary embodiment of the present invention in a state of being in the second usage position.

From the state shown in FIG. 32 and FIG. 33 where the first casing section 2 and the second casing section 3 are in the basic position P, the operator gives the second casing section 3 an operating force toward the one direction side T1 of the rotational direction, to thereby rotate the second casing section 3 on the first main surface 4 with respect to the first casing section 2. At this time, as shown in FIG. 43A, in the first support shaft 51, the insertion section 75 of the support shaft auxiliary member 71 is restricted from relatively rotating with respect to the third slit 62 of the second slit member 22. Consequently, as shown in FIG. 43B, the support shaft auxiliary member 71, together with the second slit member 22 fixed on the second casing section 3, rotates to the one direction side T1 of the rotational direction. Moreover, as shown in FIG. 43A, the second shaft section 73 of the support shaft main body member 70 is such that the engagement protuberances 73a are in contact with the one end sections 71c of the guide holes 71b. Accordingly, the support shaft main body member 70 is restricted from rotating to the other direction T2 side of the rotational direction with respect to the insertion section 75 of the support shaft auxiliary member 71. Thereby, as shown in FIG. 43B, the support shaft main body member 70, together with the support shaft auxiliary member 71, rotates to the one direction T1 side of the rotational direction. Furthermore, as shown in FIG. 42A, the first shaft section 72 of the support shaft main body member 70 is able to rotate to the one direction side T1 of the rotational direction within the wide width section 64 of the first slit 61. Therefore, as shown in FIG. 38 and FIG. 39, the second slit member 22, and the support shaft main body member 70 and the support shaft auxiliary member 71 of the first support shaft 51, integrally slide-rotate about the first support shaft 51 with respect to the first casing section 2, while slide-moving the second support shaft 24 within the second slit 32 and the fourth slit 34.

Figure 40:
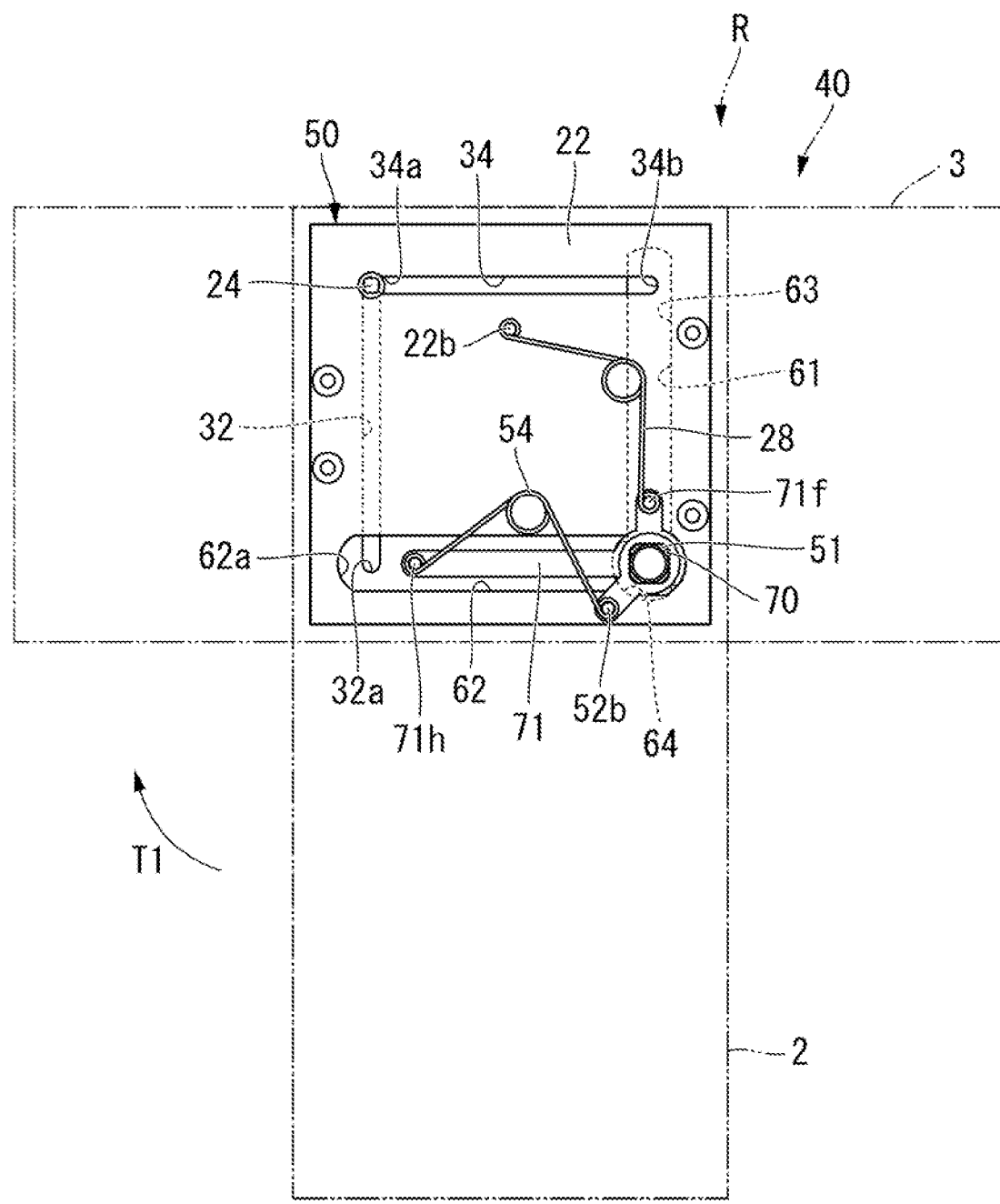
FIG. 40 is a top view of the slide mechanism of the second exemplary embodiment of the present invention in a state of having been rotated in the one direction side of the rotational direction and being in the second usage position.
Figure 41:
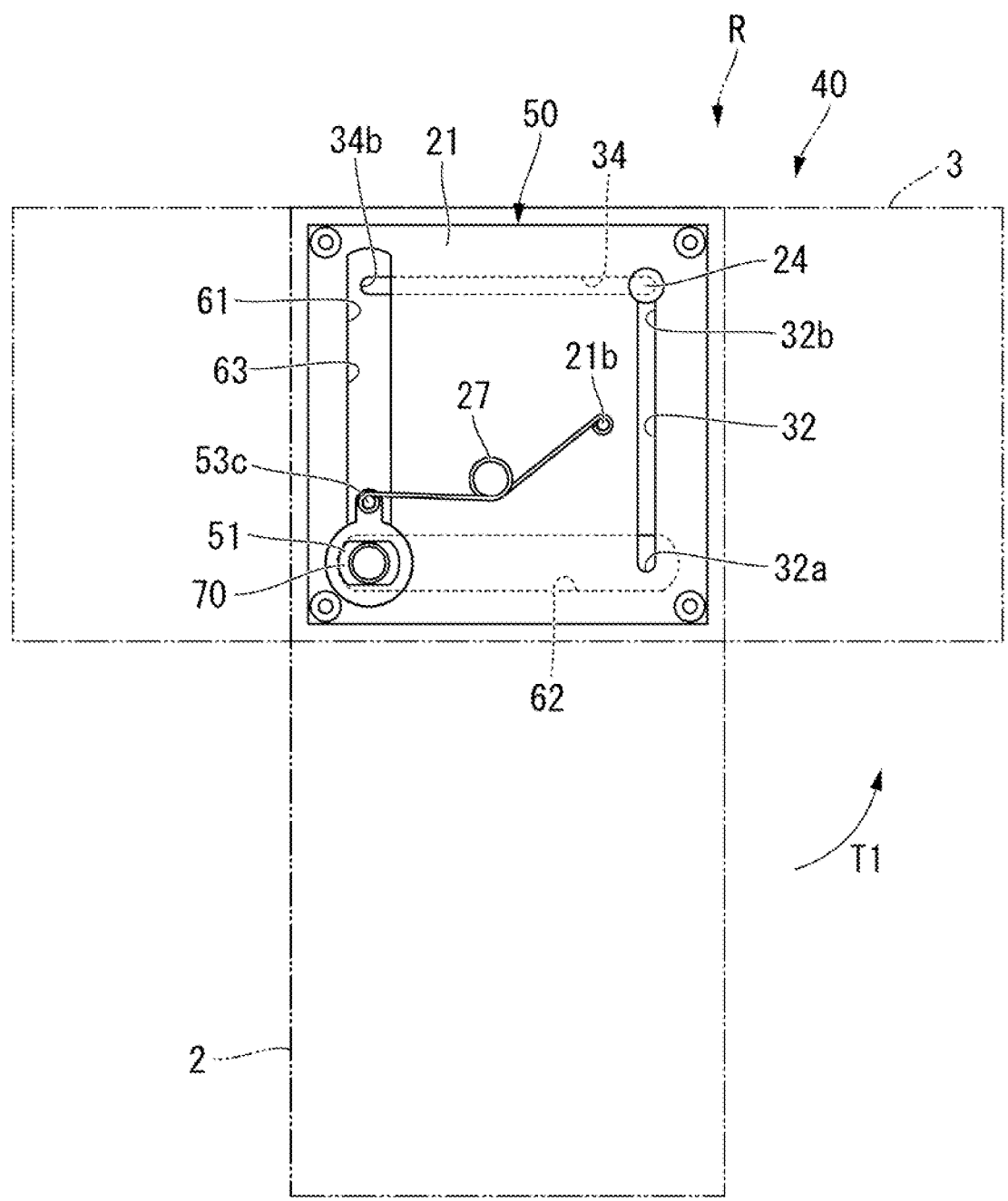
FIG. 41 is a bottom view of the slide mechanism of the second exemplary embodiment of the present invention in a state of having been rotated in the one direction side of the rotational direction and being in the second usage position.
Figure 42C:
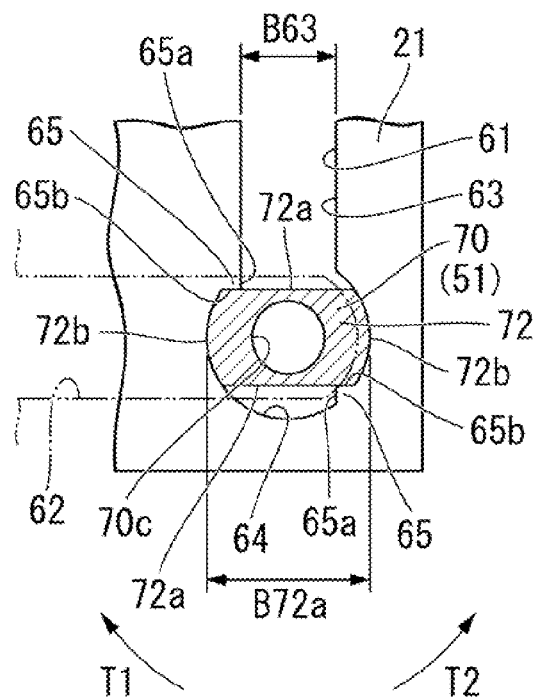
FIG. 42C is a cross-sectional view taken at the position of the first slit and seen from the underside, showing details of the first support shaft of the slide mechanism of the second exemplary embodiment of the present invention in a state of being in the second usage position.

Moreover, as shown in FIG. 40 and FIG. 41, as with the first exemplary embodiment, when the second casing section 3 has rotated by 90 degrees with respect to the first casing section 2, its rotation is restricted as the second support shaft 24 comes in contact with the other slit end 32b of the second slit 32 and the one slit end 34a of the fourth slit 34. Furthermore, in the present exemplary embodiment, in the first support shaft 51, when the first shaft section 71 of the support shaft main body member 70 has rotated within the wide width section 64 of the first slit 61 by 90 degrees as shown in FIG. 42C from the state shown in FIG. 42A and through the state shown in FIG. 42B, the long edge 72a of the first shaft section 72 comes in contact with the other edge 65b, and accordingly, rotation is restricted also by the stopper section 65. In the state where the 90 degree rotation has been performed with respect to the first casing section 2 from the basic position P as described above, the first casing section 2 and the second casing section 3 can be brought to the second usage position R where they form a substantially T shape. The function of the first spring member 27 and the second spring member 28 is similar to that in the first exemplary embodiment from the basic position P to the second usage position R, and the description thereof is therefore omitted. The third spring member 54 is such that from the basic position P to the second usage position R, the relative position about their axes between the support shaft main body member 70 and the support shaft auxiliary member 71 is constant in the first support shaft 51. Therefore, the third spring member 54 similarly functions as a retaining section which retains the relative positional relationship about their axes between the support shaft main body member 70 and the support shaft auxiliary member 71.

Figure 44:
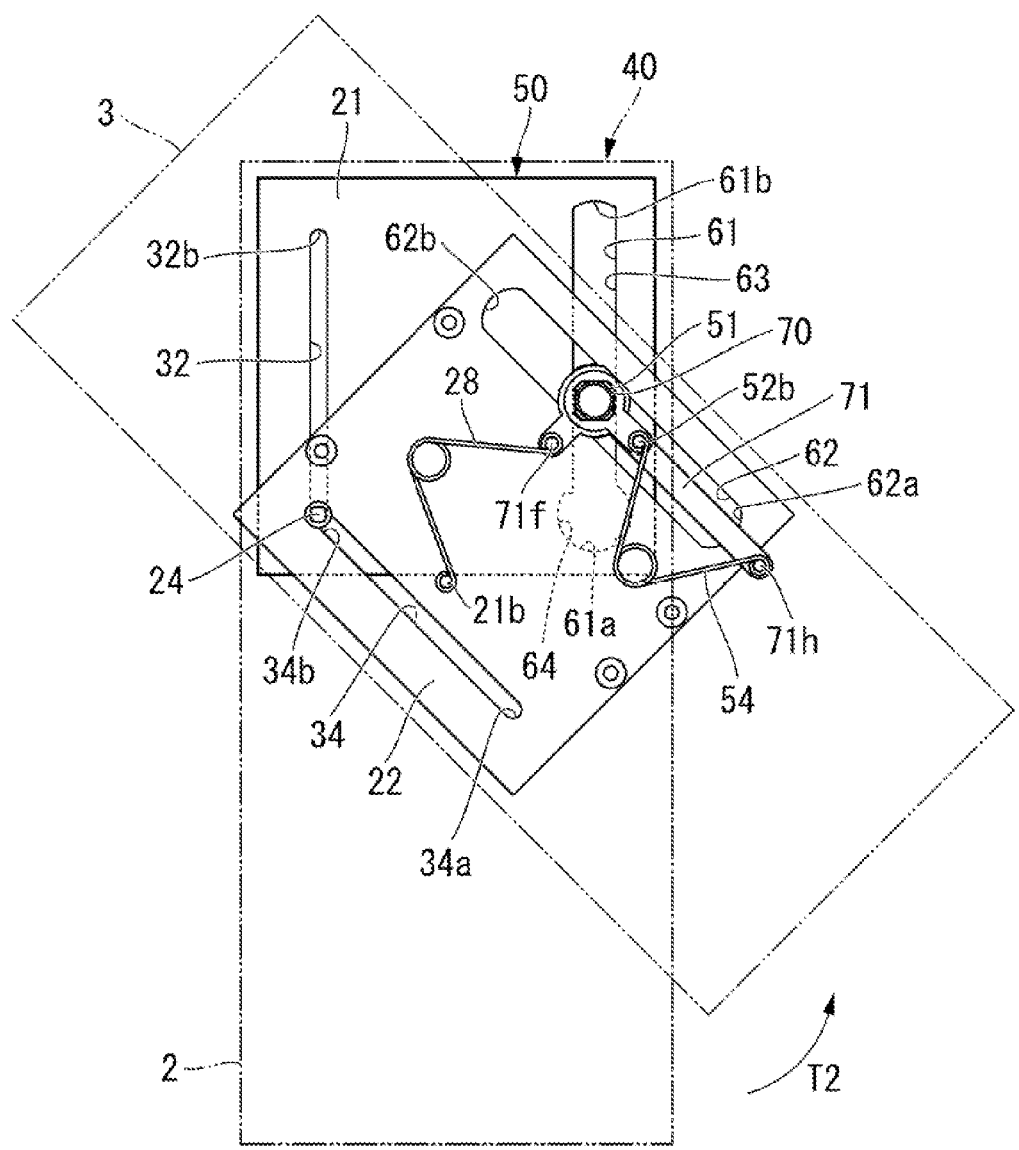
FIG. 44 is a top view of the slide mechanism of the second exemplary embodiment of the present invention in a state of being in the middle of rotating in the other direction side of the rotational direction.
Figure 45:
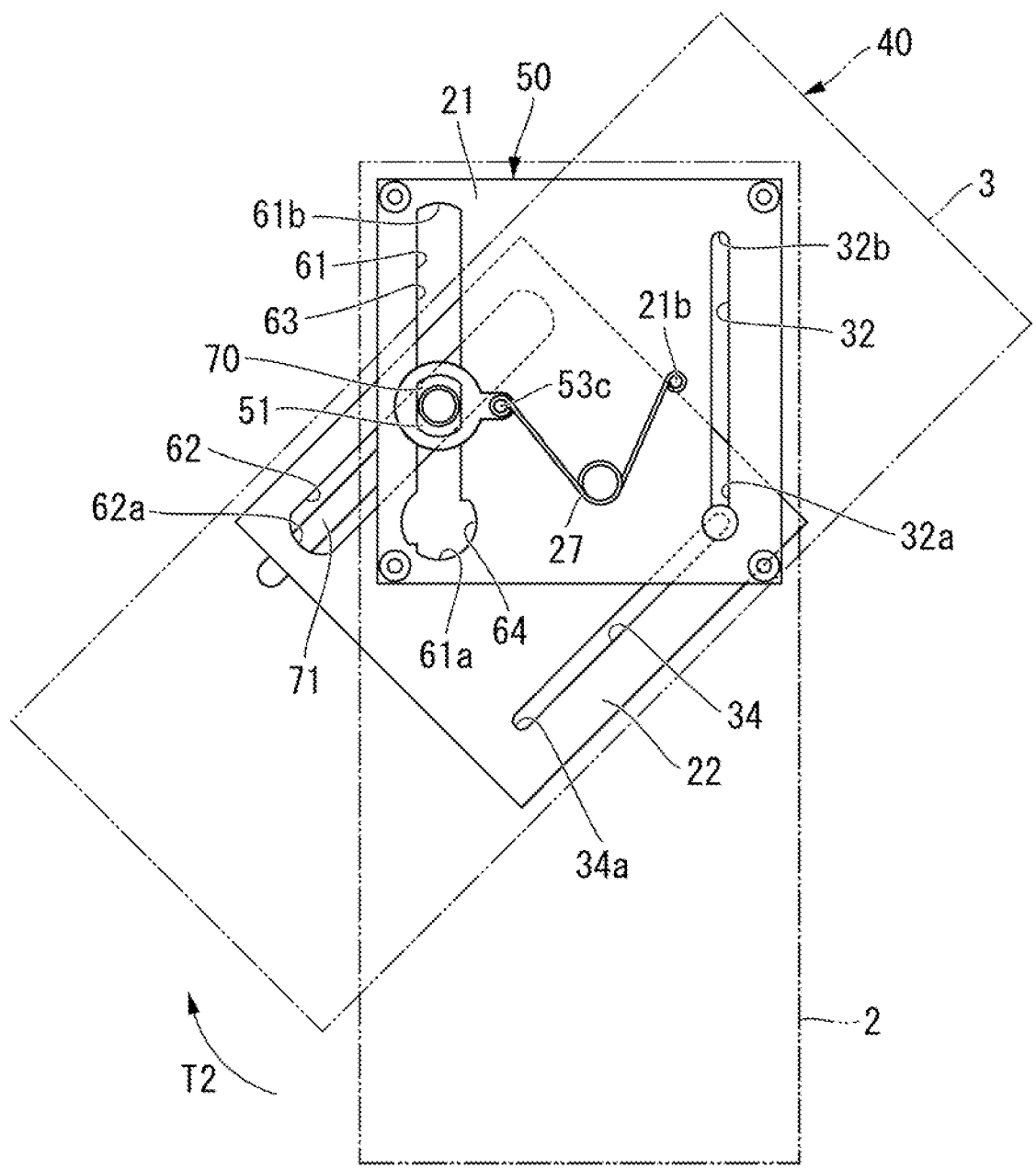
FIG. 45 is a bottom view of the slide mechanism of the second exemplary embodiment of the present invention in a state of being in the middle of rotating in the other direction side of the rotational direction.
Figure 48A:
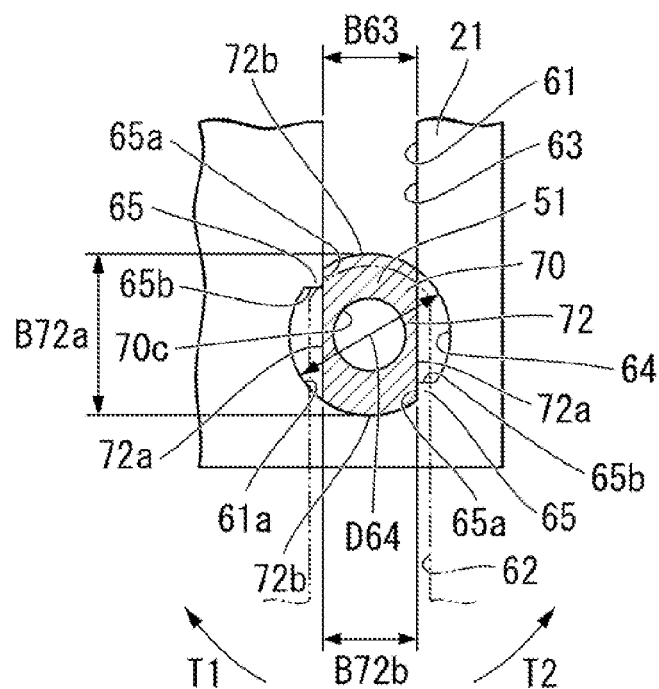
FIG. 48A is a cross-sectional view taken at the position of the first slit and seen from the underside, showing details of the first support shaft of the slide mechanism of the second exemplary embodiment of the present invention in a state of being in the basic position.
Figure 48B:
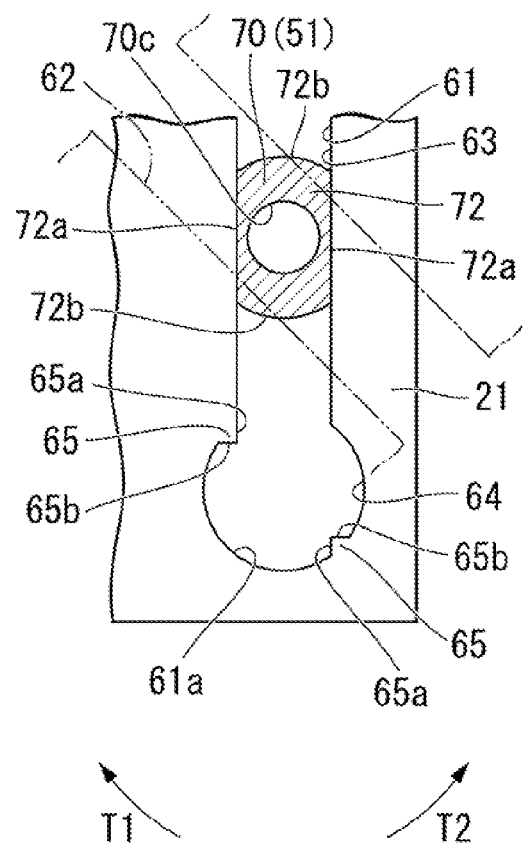
FIG. 48B is a cross-sectional view taken at the position of the first slit and seen from the underside, showing details of the first support shaft of the slide mechanism of the second exemplary embodiment of the present invention in a state of being in the middle of shifting from the basic position to the fourth usage position.

Next, there is described a case where, from the state shown in FIG. 32 and FIG. 33 where the first casing section 2 and the second casing section 3 are in the basic position P, the operator gives the second casing section 3 an operating force toward the other direction side T2 of the rotational direction, to thereby rotate the second casing section 3 on the first main surface 4 with respect to the first casing section 2. At this time, as shown in FIG. 49A (in the state similar to that of FIG. 43A), in the first support shaft 51, the insertion section 75 of the support shaft auxiliary member 71 is restricted from relatively rotating with respect to the third slit 62 of the second slit member 22. Consequently, as shown in FIG. 49B, the support shaft auxiliary member 71, together with the second slit member 22 fixed on the second casing section 3, rotates to the other direction side T2 of the rotational direction. Moreover, as shown in FIG. 49A, the second shaft section 73 of the support shaft main body member 70 is such that the engagement protuberances 73a are arranged within the guide holes 71b. Consequently, the second shaft section 73 relatively rotates to the one direction T1 side of the rotational direction with respect to the insertion section 75 of the support shaft auxiliary member 71, until it has been brought to a state of being in contact with the other end section 71d as shown in FIG. 49C, from the state of being in contact with the one end section 71c of the guide hole 71b and through the state shown in FIG. 49B. Furthermore, as shown in FIG. 48A (in the state similar to that of FIG. 42A), the first shaft section 72 of the support shaft main body member 70 is able to slide-move within the first slit 61 in the direction along the slide section 63. Consequently, as shown in FIG. 44 and FIG. 45, the second casing section 3 is slide-rotated with respect to the first casing section 2, while, in the first support shaft 51, the support shaft auxiliary member 71 is slide-moved within the third slit 62 about the second support shaft 24, and the support shaft main body member 70 is relatively rotated about its axis with respect to the support shaft auxiliary member 72 and is slide-moved within the first slit 61 at the same time with the relative position about its axis being constant with respect to the first slit 61.

Figure 46:
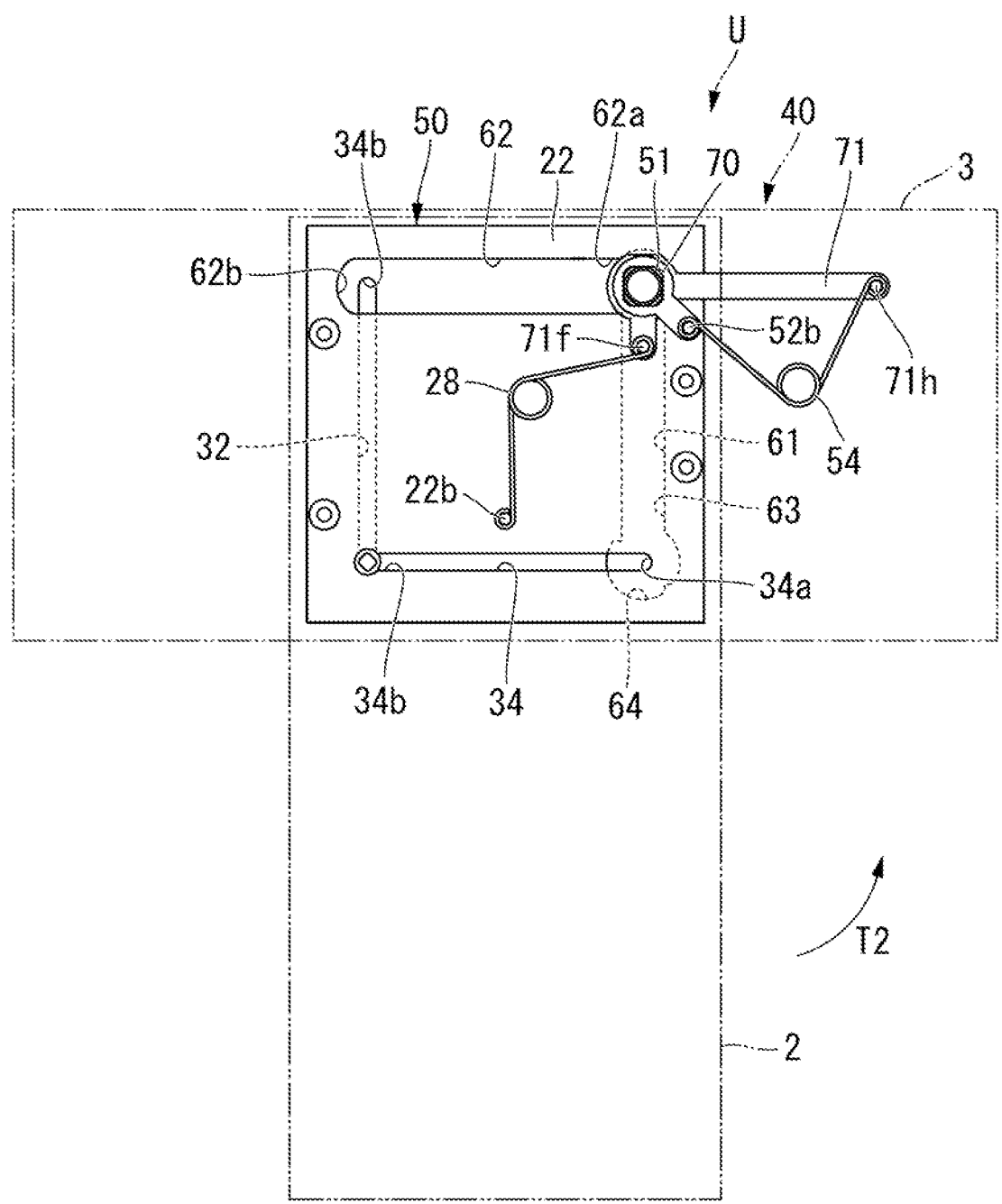
FIG. 46 is a top view of the slide mechanism of the second exemplary embodiment of the present invention in a state of having been rotated in the other direction side of the rotational direction and being in a fourth usage position.
Figure 47:
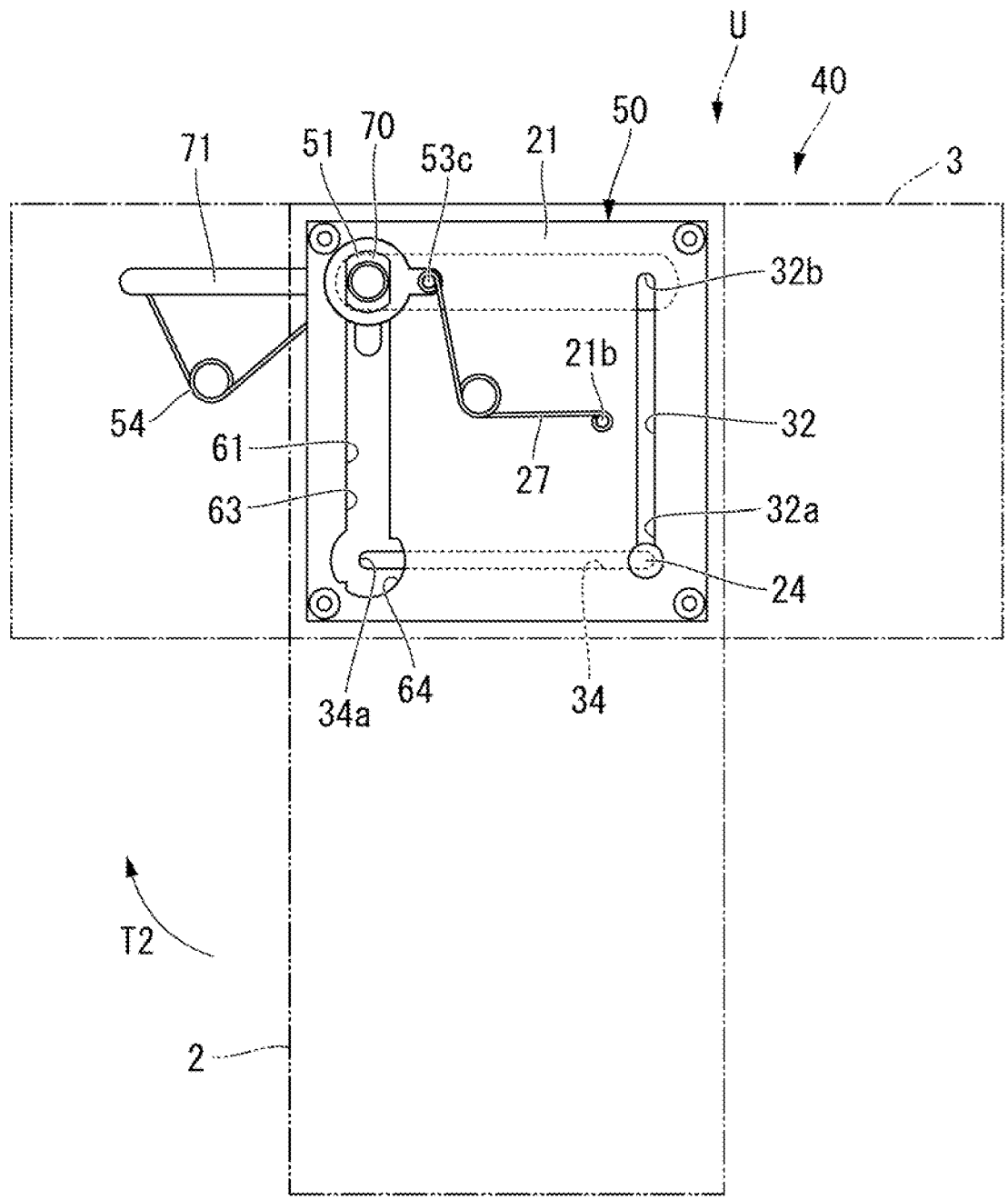
FIG. 47 is a bottom view of the slide mechanism of the second exemplary embodiment of the present invention in a state of having been rotated in the other direction side of the rotational direction and being in the fourth usage position.
Figure 48C:
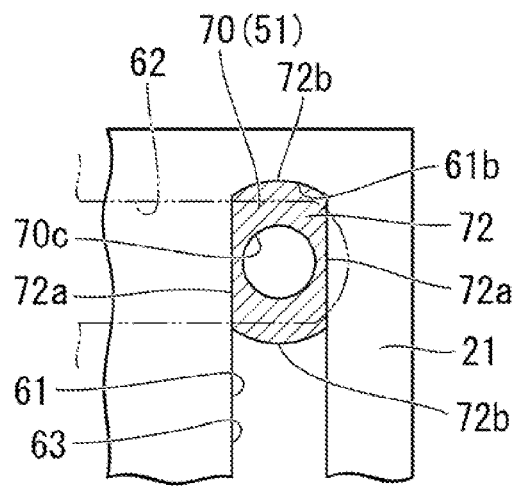
FIG. 48C is a cross-sectional view taken at the position of the first slit and seen from the underside, showing details of the first support shaft of the slide mechanism of the second exemplary embodiment of the present invention in a state of being in the fourth usage position.

As shown in FIG. 46 and FIG. 47, as with the first exemplary embodiment, when the second casing section 3 has rotated by 90 degrees with respect to the first casing section 2, the first support shaft 51 is restricted, at the other slit end 61b of the first slit 61 and the one slit end 62a of the third slit 34, from rotating. Furthermore, in the present exemplary embodiment, in the first support shaft 51, the support shaft auxiliary member 71 relatively rotates by 90 degrees with respect to the support shaft main body member 70 as shown in FIG. 48C, from the state shown in FIG. 48A and through the state shown in FIG. 48B. In this state, the engagement protuberances 73a of the support shaft main body member 70 come in contact with the other end section 71d of the guide holes 71b of the support shaft auxiliary member 71. Consequently, rotation is restricted also by the engagement protuberances 73a and the guide holes 71b.

In the state where the 90 degree rotation has been performed with respect to the first casing section 2 from the basic position P as described above, the first casing section 2 and the second casing section 3 can be brought to the fourth usage position U where they form a substantially T shape. The function of the first spring member 27 and the second spring member 28 is similar to that in the first exemplary embodiment from the basic position P to the fourth usage position U, and the description thereof is therefore omitted.

The third spring member 54 is such that in the first support shaft 51, the direction of biasing the support shaft auxiliary member 71 about its axis with respect to the support shaft main body member 70 changes, according to the relative position about their axes between the support shaft main body member 70 and the support shaft auxiliary member 71. That is to say, in the state of the basic position P, it functions as a retaining section to retain the relative positional relationship about its axis between the support shaft main body member 70 and the support shaft auxiliary member 71 as described above. As mentioned above, when the second casing section 3 is slide-rotated to the other direction side T2 of the rotational direction with respect to the first casing section 2, in the first support shaft 51, the support shaft auxiliary member 71 relatively rotates about its axis with respect to the support shaft main body member 70. As a result, the relative position between the fifth supporting protuberance 71h and the sixth supporting protuberance 52c, which respectively fix the third spring member 54 at both of the ends 54a and 54b, also changes. When a further slide-rotation is performed from the state where the second casing section 3 has slide-moved by 45 degrees with respect to the first casing section 2 as shown in FIG. 44, the relative positional relationship about its axis between the fifth supporting protuberance 71h and the sixth supporting protuberance 52c is switched. As a result, the direction about the axis biased by the third spring member 54 is switched. Consequently, the biasing force of the third spring member 54 acts so that the support shaft auxiliary member 71 rotates about its axis further with respect to the support shaft main body member 70. Therefore, the third spring member 54 functions as an auxiliary section for assisting the operation. In the fourth usage position U, the biasing force of the third spring member 54 acts so that the other end section 71d of the guide hole 71b of the support shaft auxiliary member 71 and the engagement protuberance 73a of the support shaft main body member 70 press against each other. Therefore, the third spring member 54 functions as a retaining section for retaining the state of the fourth usage position U.

Next, there is described a case where from the first usage state Q, an operating force is given to slide-rotate the second casing section 3 with respect to the first casing section 2. First, in the state of the first usage position Q shown in FIG. 34 and FIG. 35, an operating force is given so that the second casing section 3 slide-rotates to the one direction side T1 of the rotational direction with respect to the first casing section 2. At this time, as shown in FIG. 36C, in the first support shaft 51, the first shaft section 72 of the support shaft main body member 70 is arranged within the slide section 63 of the first slit 61 of the first slit member 21, and it is therefore restricted from rotating. Moreover, as shown in FIG. 37C, the insertion section 75 of the support shaft auxiliary member 71 is arranged within the third slide section 62 of the second slit member 22, and it is therefore restricted from rotating. Furthermore, since the engagement protuberance 73a is in contact with the one end section 71c of the guide hole 71b, the insertion section 75 of the support shaft auxiliary member 71 is restricted from rotating to the one direction side T1 of the rotational direction with respect to the second shaft section 73 of the support shaft main body member 70. Consequently, the second slit member 22 fixed on the second casing section 3 is unable to rotate about the first support shaft 51 toward the one direction side T1 of the rotational direction with respect to the first slit member 21 fixed on the first casing section 2. Since the first support shaft 51 is engaged with the other slit end 61b of the first slit 61 and with the one slit end 62a of the third slit 62, rotation about the second support shaft 24 while slide-moving the first support shaft 51 is also impossible. As described above, in the state of the first usage position Q, the second casing section 3 is restricted from rotating to the one direction side T1 of the rotational direction with respect to the first casing section 2.

Figure 34:
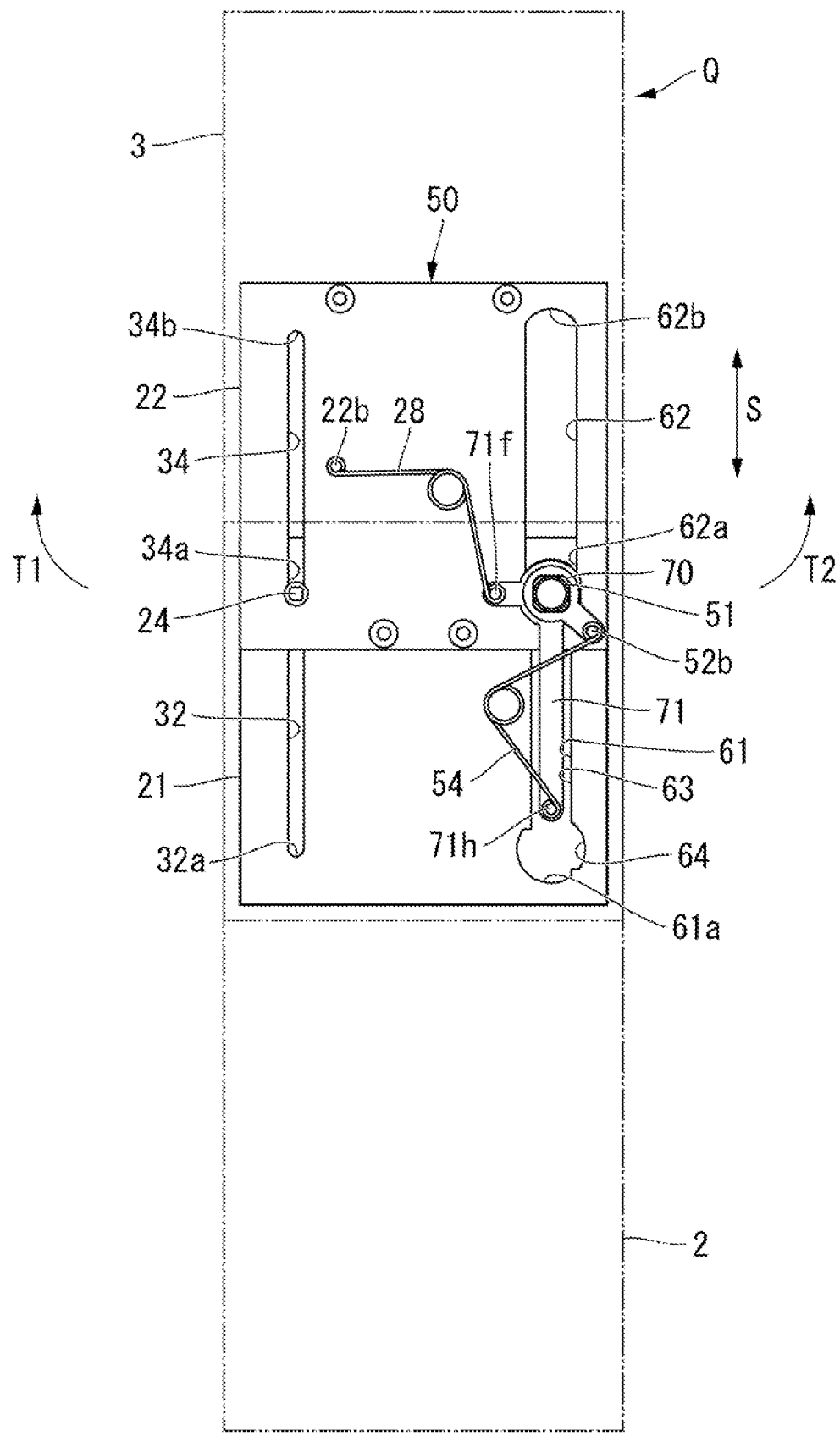
FIG. 34 is a top view of the slide mechanism of the second exemplary embodiment of the present invention in a state of being in the first usage position.
Figure 35:
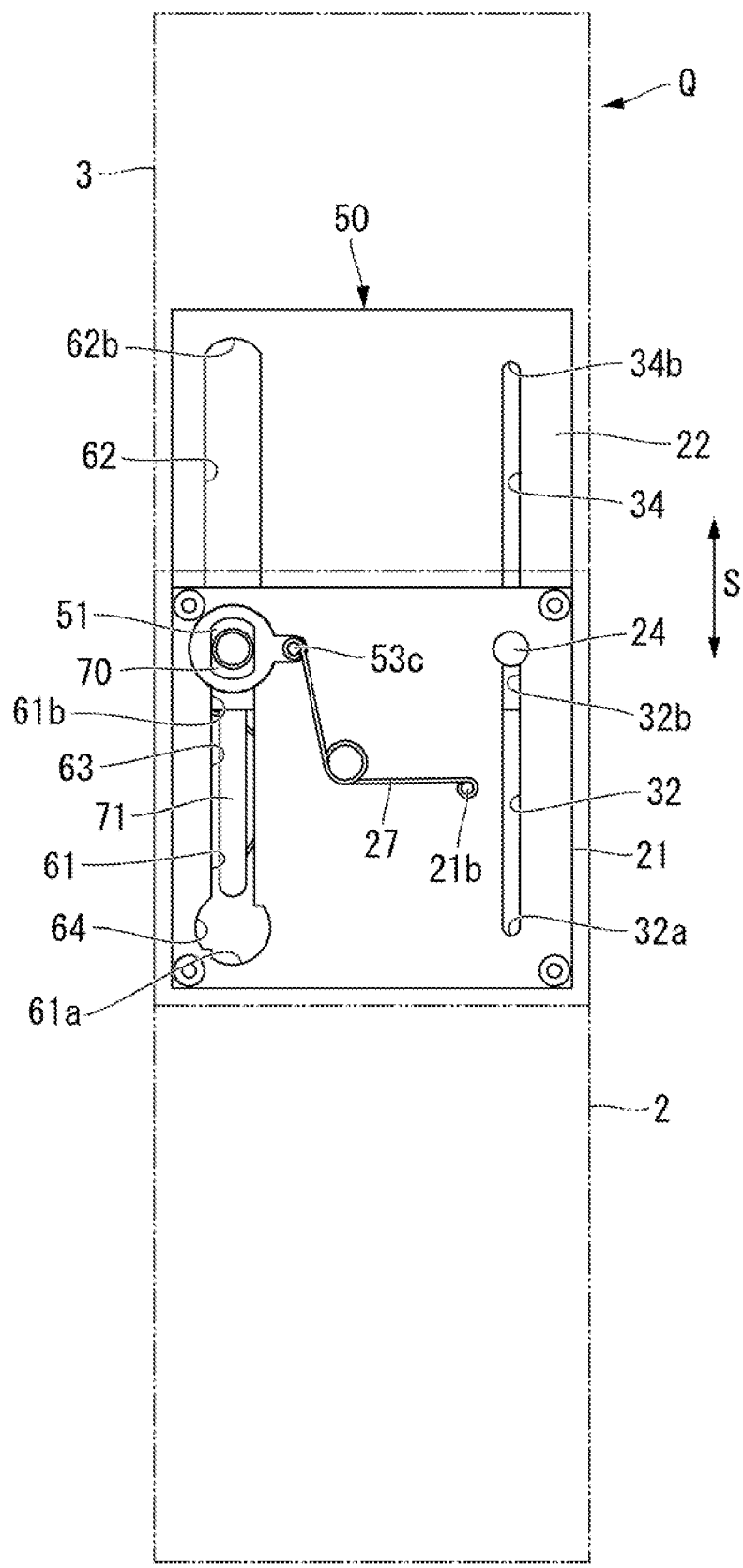
FIG. 35 is a bottom view of the slide mechanism of the second exemplary embodiment of the present invention in a state of being in the first usage position.

On the other hand, in the state of the first usage position Q shown in FIG. 34 and FIG. 35, an operating force is given so that the second casing section 3 slide-rotates to the other direction side T2 of the rotational direction with respect to the first casing section 2. At this time, even if an attempt is made to move the first support shaft 51 about the second support shaft 24 in the tangential line direction of the other direction side T2 of the rotational direction, the first support shaft 51 is engaged with the other slit end 61b of the first slit 61 and the one slit end 62a of the third slit 62, and movement thereof is restricted. On the other hand, if an attempt is made to move the second support shaft 24 about the first support shaft 51 in the tangential line direction on the other direction side T2 of the rotational direction, the second support shaft 24 can relatively move from the other slit end 32b of the second slit 32 toward the one slit end 32a, and from the one slit end 34a of the fourth slit 34 to the other slit end 34a.

In the first support shaft 51, the support shaft main body member 70 is restricted from rotating by the first slit 61 of the first slit member 21 as shown in FIG. 36C. Moreover, the support shaft auxiliary member 71 is restricted from rotating by the second slit 62 of the second slit member 22 as shown in FIG. 37C. Meanwhile, the support shaft auxiliary member 71 is able to relatively rotate only by 90 degrees to the other direction side T2 of the rotational direction with respect to the support shaft main body member 70, from the state where the engagement protuberance 73a is in contact with the one end section 71c of the guide hole 71b, to the state where it is in contact with the other end section 71d. Consequently, the second slit member 22 and the support shaft auxiliary member 71 of the first support shaft 51 rotate with respect to the first slit member 21 and the support shaft main body member 70 of the first support shaft 51, and it is thereby possible to rotate the second casing section 3 about the first support shaft 51 to the other direction side T2 of the rotational direction with respect to the first casing section 2. Thus, it can be brought to the fourth usage position U shown in FIG. 46 and FIG. 47. Moreover, by performing an operation opposite of that in the above description, it is also possible to return from the fourth usage position U to the first usage position Q.

As described above, according to the portable terminal 40 of the second exemplary embodiment, as shown in FIG. 22, the first casing section 2 and the second casing section 3 can be set from the basic position P to the third usage position Q', the first usage position Q, the second usage position R, and the fourth usage position U respectively, as with the first exemplary embodiment. Moreover, it is also possible to perform slide-rotation from the first usage position Q to the fourth usage position U. Meanwhile, slide-rotation to the second usage position R toward the opposite side is restricted by the engagement protuberances 73a and the guide holes 71b. Thereby, it is possible to prevent erroneous operations such as unintendedly rotating the second casing section 3 to the opposite side to the required rotational direction with respect to the first casing section 2, and consequently bringing it to the second usage position R when the fourth usage position U was intended. As a result, it is possible to further improve total usability while maintaining a balance between convenience and erroneous operations. There has been described a case of performing slide-rotation from the first usage position Q in the above description, however, slide-rotation from the third usage position Q' is performed in a similar manner. That is to say, while slide-rotation toward the one direction side T1 of the rotational direction from the third usage position Q' to the second usage position R is restricted, slide-rotation to the other direction side T2 of the rotational direction can be performed to bring the configuration to the fourth usage position U.

In the present exemplary embodiment, while it is possible to bring the configuration to the fourth usage position U from the state of either the first usage position Q or the third usage position Q', bringing it to the second usage position R therefrom is restricted. However, it is not limited to this. Based on the relative positional relationship with the engagement protuberances 73a and the guide holes 71b, while bringing the configuration to the fourth usage position U is restricted, it can be made possible to bring it to the second usage position R.

Moreover, the second support shaft is also of a two-member configuration including a support shaft main body member and a support shaft auxiliary member, and it may be provided with an engagement protuberance and guide hole. With this type of configuration, in the state of the first usage position Q and the third usage position Q', slide-rotation is restricted to neither the one direction side T1 of the rotational direction nor the other direction side T2. As a result, only slide movement in the movement direction S is allowed, and it can be made possible to bring the configuration to the second usage position R and the fourth usage position U only by slide-rotation from the basic position P.

Third Exemplary Embodiment

Next, a third exemplary embodiment of the present invention is described. A portable communication terminal of the third exemplary embodiment differs from the portable communication terminal of the first exemplary embodiment in that there is further provided an auxiliary shaft 123. With this configuration, the portable communication terminal of the third exemplary embodiment enables more secure connection between the first casing section 2 and the second casing section 3 when shifting from the basic position P to the first usage position Q, and it enables improvement in the level of so-called backlash prevention and forward-force-down strength (the level of strength which a portable communication terminal can withstand when the terminal receives external force from above while it is laid facing down in the state of the first usage position Q).

FIG. 50 to FIG. 68C show the third exemplary embodiment of the present invention. In this exemplary embodiment, the common members used in the aforementioned exemplary embodiment are given the same reference symbols, and descriptions thereof are omitted.

There follows corresponding relationships between the diagrams used in the description of the third exemplary embodiment of the present invention, and the diagrams used in the description of the first exemplary embodiment. FIG. 50 to FIG. 57 correspond to FIG. 6 to FIG. 13. FIG. 59 to FIG. 62 correspond to FIG. 14 to FIG. 17. FIG. 64 to FIG. 67 correspond to FIG. 18 to FIG. 21. FIG. 58A to FIG. 58C, FIG. 63A to FIG. 63C, and FIG. 68A to FIG. 68C show details of an auxiliary shaft 123 provided in a portable communication terminal 1 of the third exemplary embodiment.

The configuration of the portable communication terminal 1 according to the third exemplary embodiment is basically similar to that of the portable communication terminal 1 of the first exemplary embodiment. Therefore, descriptions of FIG. 50 to FIG. 57, FIG. 59 to FIG. 62, and FIG. 64 to FIG. 67 are omitted.

As shown in FIG. 50 to FIG. 53 a slide mechanism 120 of this exemplary embodiment includes an auxiliary shaft 123, which is rotatably retained, and a third engagement member 125, in addition to the configuration of the slide mechanism 20 of the first exemplary embodiment.

In the first slit member 21 of the slide mechanism 120, there is provided a fifth slit 131 formed so as to pass through to both sides thereof. The fifth slit 131 has a first slit end 131a, a second slit end 131b, a third slit end 131c, and a fourth slit end 131d. The fifth slit 131 is configured with a first slit portion, a second slit portion, and a third slit portion. The first slit portion of the fifth slit 131 is formed by a space which connects the first slit end 131a and the second slit end 131b. The second slit portion of the fifth slit 131 is formed by a space which connects the first slit end 131a and the third slit end 131c. The third slit portion of the fifth slit 131 is formed by a space which connects the first slit end 131a and the fourth slit end 131d. The first slit portion in the fifth slit 131 is parallel to the first slit 31 and the second slit 32.

The first slit portion of the fifth slit 131 serves as a movement path of the auxiliary shaft 123 in the case of shifting from the basic position P to the first usage position Q. The second slit portion of the fifth slit 131 serves as a movement path of the auxiliary shaft 123 in the case of shifting from the basic position P to the second usage position R while taking the first support shaft 23 as the center of rotation. The third slit portion of the fifth slit 131 serves as a movement path of the auxiliary shaft 123 in the case of shifting from the basic position P to the third usage position U while taking the second support shaft 24 as the center of rotation.

In the slit member 22 of the slide mechanism 120, there is provided a sixth slit 132 formed so as to pass through to both sides thereof. The sixth slit 132 has a first slit end 132a, a second slit end 132b, a third slit end 132c, and a fourth slit end 132d. The sixth slit 132 is configured with a first slit portion, a second slit portion, and a third slit portion. The first slit portion of the sixth slit 132 is formed by a space which connects the first slit end 132a and the second slit end 132b. The second slit portion of the sixth slit 132 is formed by a space which connects the first slit end 132a and the third slit end 132c. The third slit portion of the sixth slit 132 is formed by a space which connects the first slit end 132a and the fourth slit end 132d. The first slit portion in the sixth slit 132 is parallel to the third slit 33 and the fourth slit 34.

The first slit portion of the sixth slit 132 serves as a movement path of the auxiliary shaft 123 in the case of shifting from the basic position P to the first usage position Q. The second slit portion of the sixth slit 132 serves as a movement path of the auxiliary shaft 123 in the case of shifting from the basic position P to the second usage position R while taking the first support shaft 23 as the center of rotation. The third slit portion of the sixth slit 132 serves as a movement path of the auxiliary shaft 123 in the case of shifting from the basic position P to the third usage position U while taking the second support shaft 24 as the center of rotation.

In the first exemplary embodiment, the first engagement member 25 and the second engagement member 26 are fitted respectively as a single component on the first support shaft 23 and the second support shaft 24. In the third exemplary embodiment, as a means for obtaining a similar effect, the first engagement member 25 and the second engagement member 26 are respectively fitted on the first support shaft 23 and the second support shaft 24 with an E type retaining ring 176 and an E type retaining ring 177.

Similarly, the third engagement member 125 is fitted with an E type retaining ring 178 on the auxiliary shaft 123 inserted into the fifth slit 131 and the sixth slit 132.

As for the operations of the portable terminal I and the slide mechanism 120 of the third exemplary embodiment, there are described only points which differ from the first exemplary embodiment.

Figure 58A:
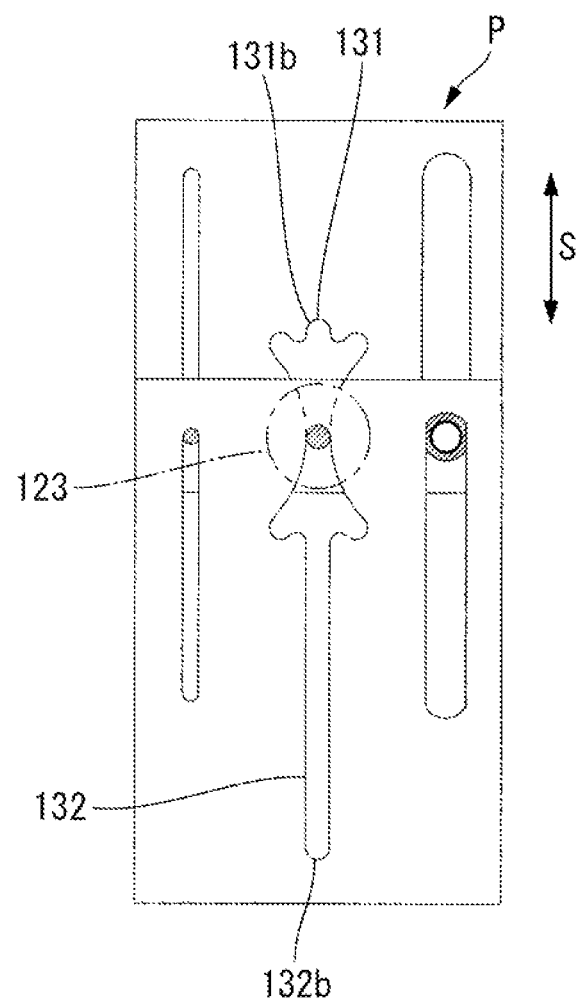
FIG. 58A is a cross-sectional view taken on the upper surface of a second slit member and seen from the underside, showing details of an auxiliary shaft of the slide mechanism of the third exemplary embodiment of the present invention in a state of being in the basic position.
Figure 58B:
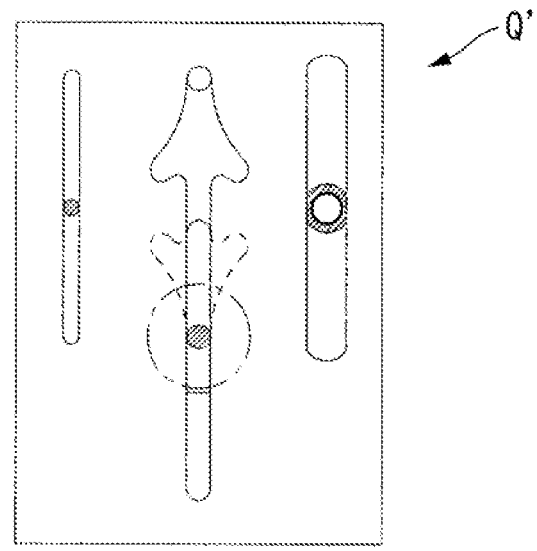
FIG. 58B is a cross-sectional view taken on the upper surface of the second slit member and seen from the underside, showing details of the auxiliary shaft of the slide mechanism of the third exemplary embodiment of the present invention in a state of being in the middle of shifting from the basic position to the first usage position.
Figure 58C:
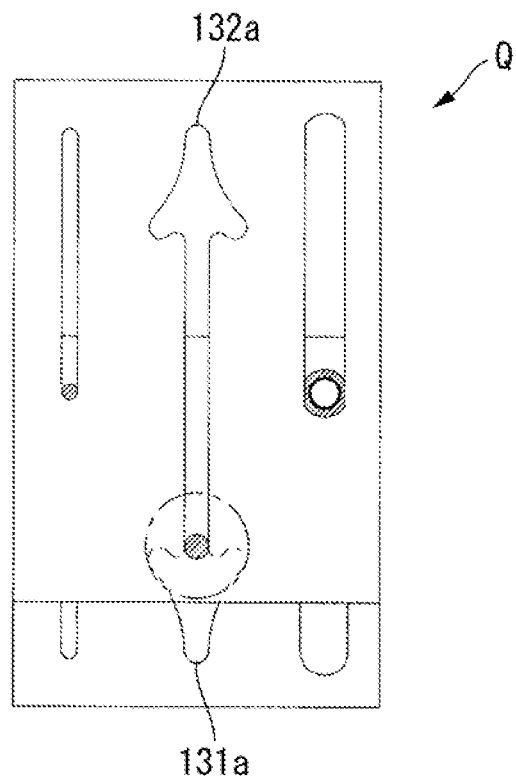
FIG. 58C is a cross-sectional view taken on the upper surface of a second slit member and seen from the underside, showing details of an auxiliary shaft of the slide mechanism of the third exemplary embodiment of the present invention in a state of being in the first usage position.
Figure 59:
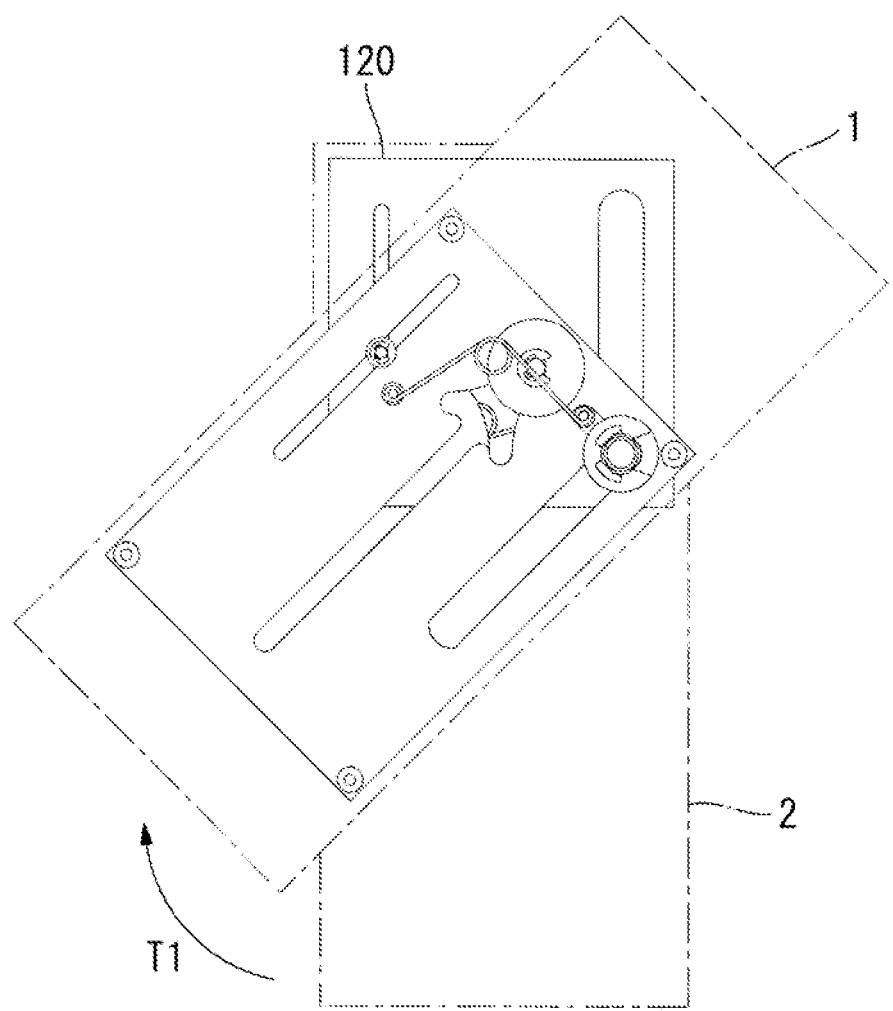
FIG. 59 is a top view of the slide mechanism of the third exemplary embodiment of the present invention in a state of being in the middle of rotating in the one direction side of the rotational direction.
Figure 60:
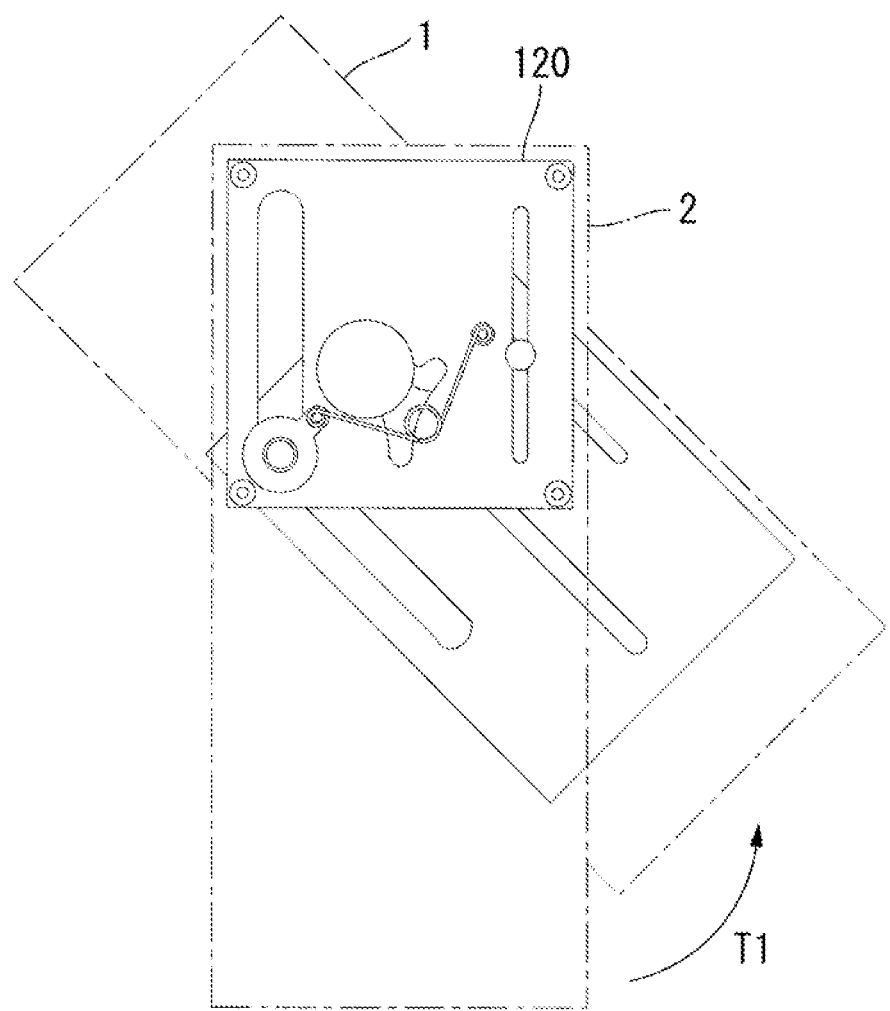
FIG. 60 is a bottom view of the slide mechanism of the third exemplary embodiment of the present invention in a state of being in the middle of rotating in the one direction side of the rotational direction.
Figure 61:
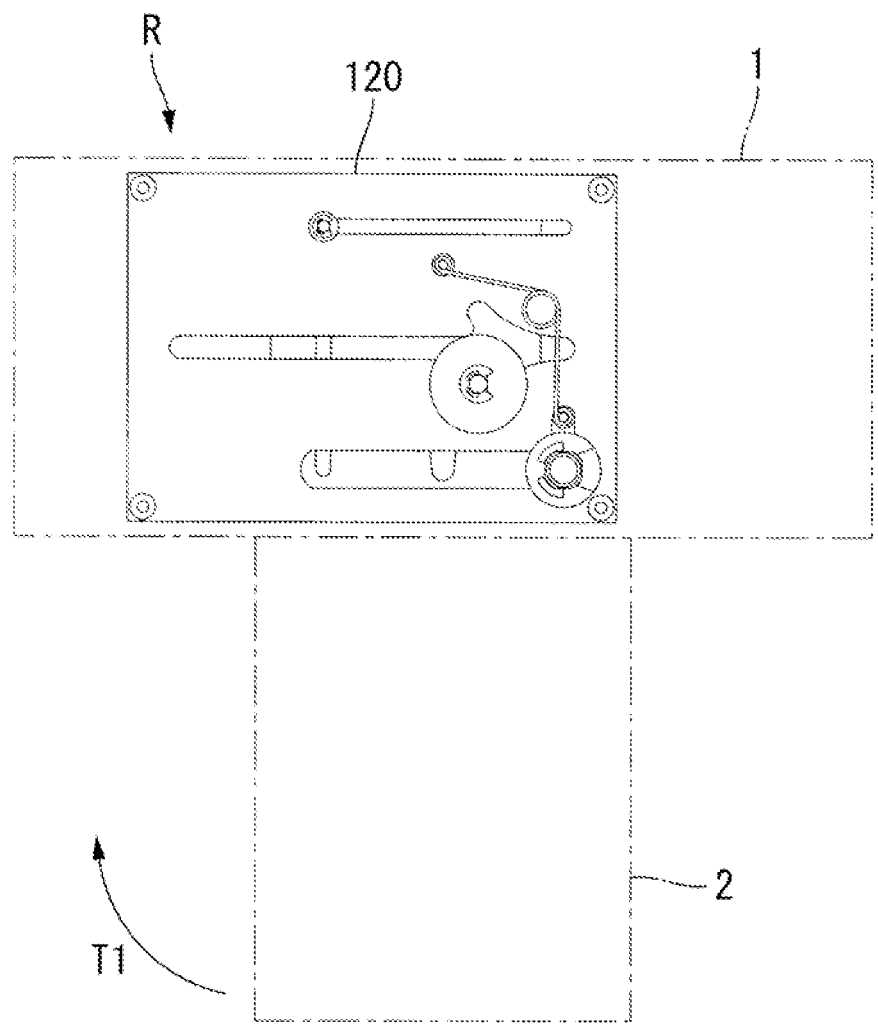
FIG. 61 is a top view of the slide mechanism of the third exemplary embodiment of the present invention in a state of having been rotated in the one direction side of the rotational direction and being in the second usage position.
Figure 62:
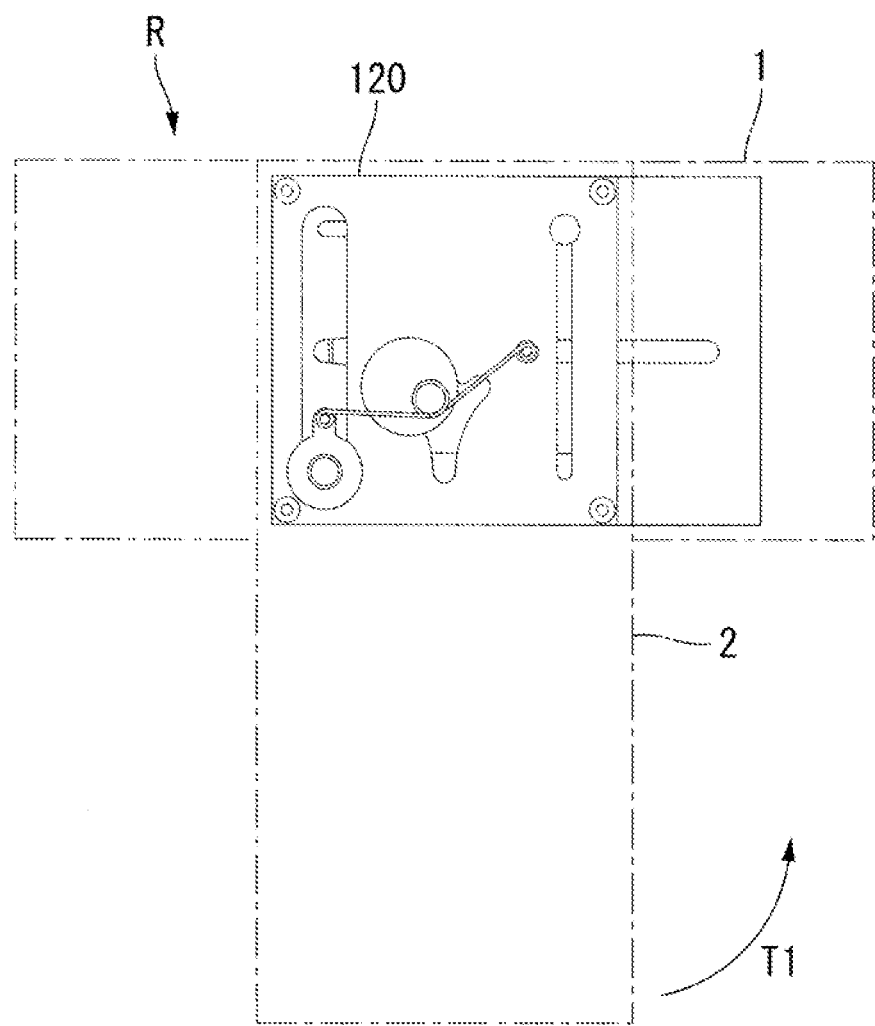
FIG. 62 is a bottom view of the slide mechanism of the third exemplary embodiment of the present invention in a state of having been rotated in the one direction side of the rotational direction and being in the second usage position.

The relationship between the auxiliary shaft 123, the fifth slit 131, and the sixth slit 132 in the case where the first casing section 2 and the second casing section 3 shift from the basic position P to the first usage position Q, is described, with reference to FIG. 58A to FIG. 58C.

As shown in FIG. 58A, the auxiliary shaft 123 in the basic position P is restrained by the first slit end 131a of the fifth slit 131 and the first slit end 132a of the sixth slit 132. As shown in FIG. 58B, when the second slit member 22 moves in the movement direction S, the auxiliary shaft 123 in the state of being restrained by the first slit end 131a moves within the sixth slit 132 from the first slit end 132a until it has come in contact with the second slit end 132b. Furthermore, having contacted with the second slit end 132b, the auxiliary shaft 123 in the state of being restrained by the second slit end 132b moves within the fifth slit 131 from the first slit end 131a to the second slit end 131b. As a result, as shown in FIG. 58C, in the first usage position Q, the auxiliary shaft 123 is restrained by the slit end 131b and the slit end 132b.

Figure 63A:
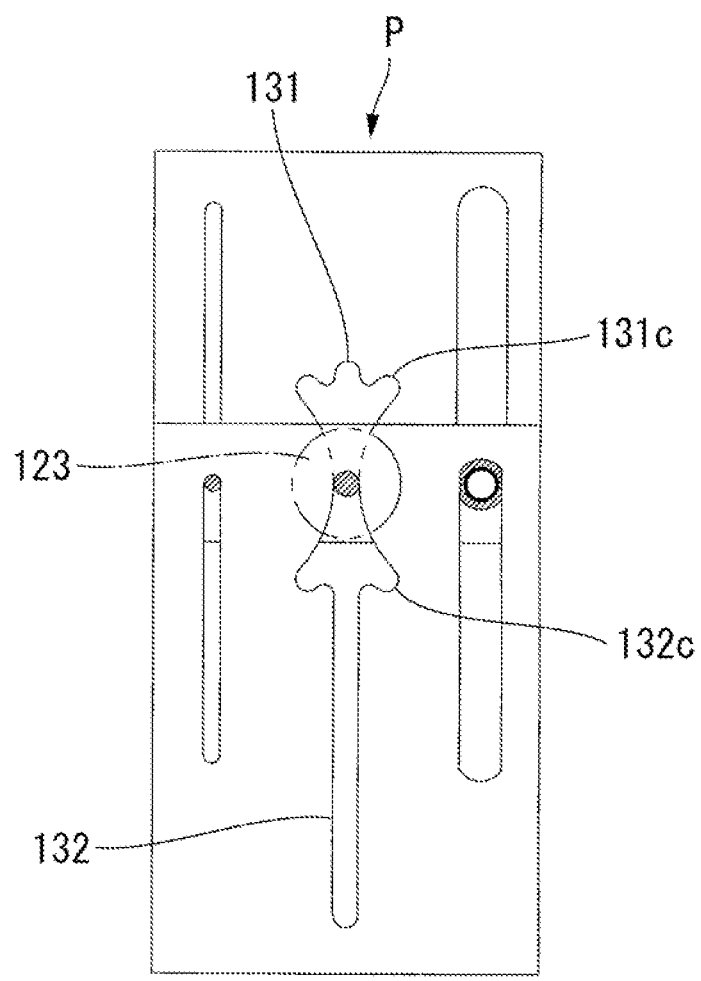
FIG. 63A is a cross-sectional view taken on the upper surface of the second slit member and seen from the underside, showing details of the auxiliary shaft of the slide mechanism of the third exemplary embodiment of the present invention in a state of being in the basic position.
Figure 63B:
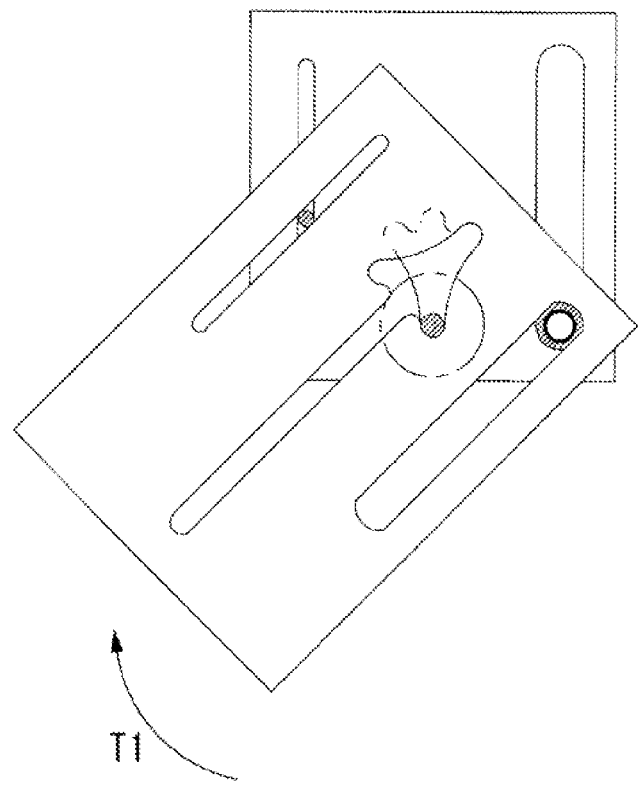
FIG. 63B is a cross-sectional view taken on the upper surface of the second slit member and seen from the underside, showing details of the auxiliary shaft of the slide mechanism of the third exemplary embodiment of the present invention in a state of being in the middle of shifting from the basic position to the second usage position.
Figure 63C:
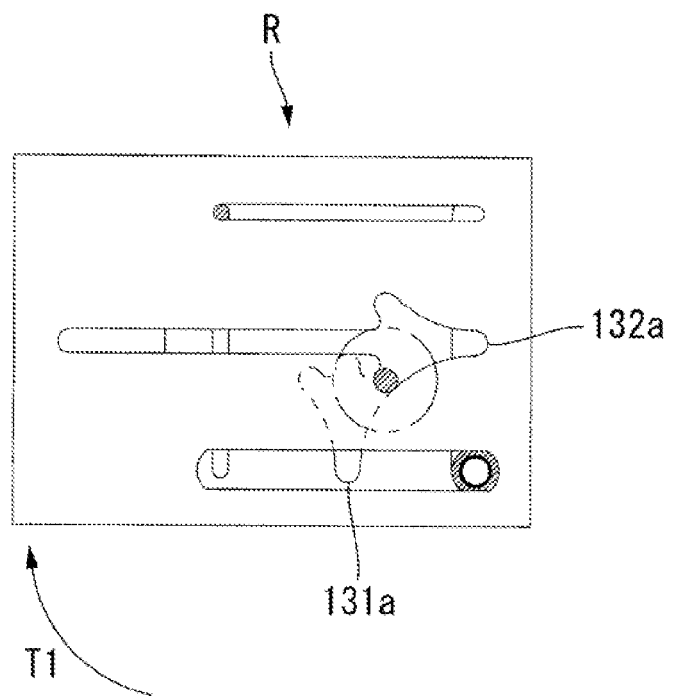
FIG. 63C is a cross-sectional view taken on the upper surface of the second slit member and seen from the underside, showing details of the auxiliary shaft of the slide mechanism of the third exemplary embodiment of the present invention in a state of being in the second usage position.
Figure 64:
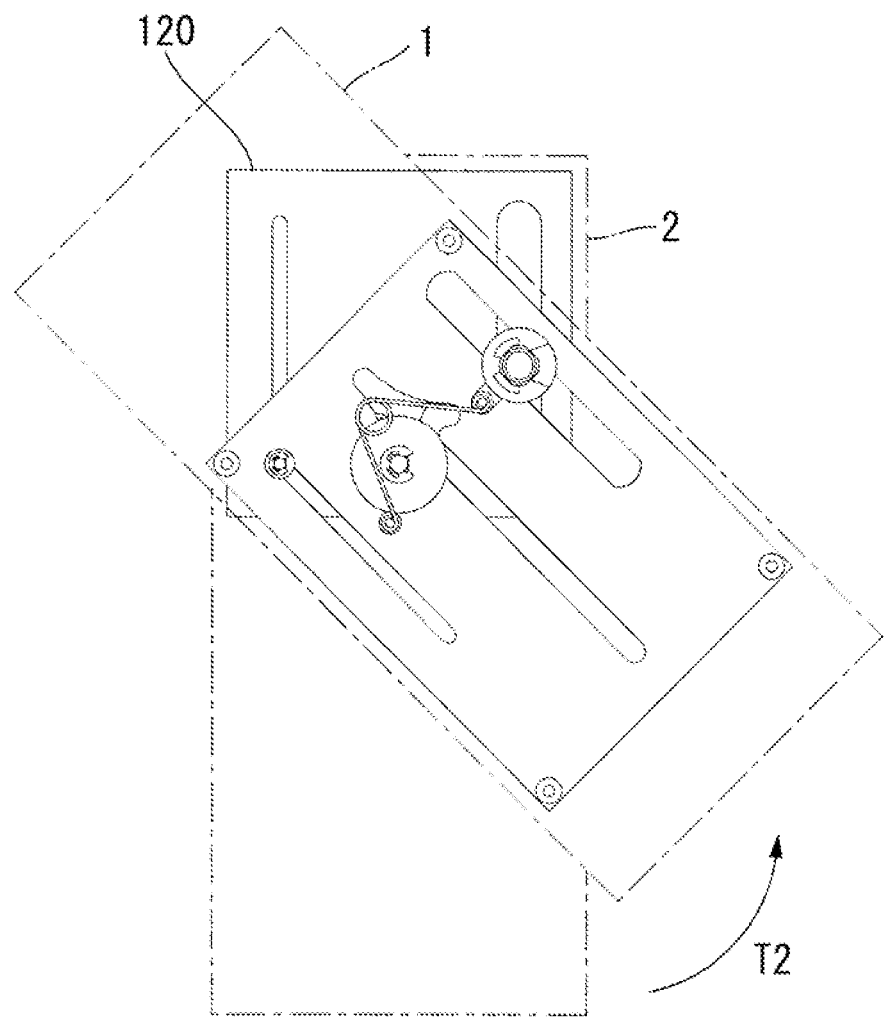
FIG. 64 is a top view of the slide mechanism of the third exemplary embodiment of the present invention in a state of being in the middle of rotating in the other direction side of the rotational direction.
Figure 65:
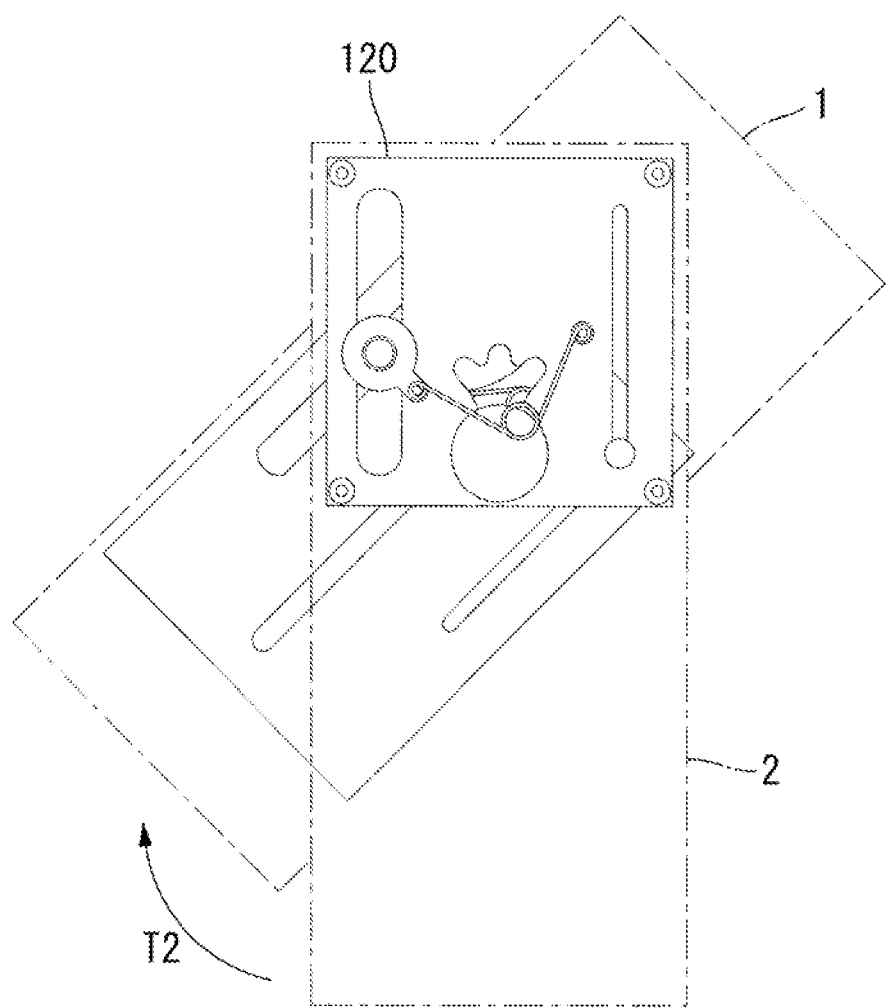
FIG. 65 is a bottom view of the slide mechanism of the third exemplary embodiment of the present invention in a state of being in the middle of rotating in the other direction side of the rotational direction.
Figure 66:
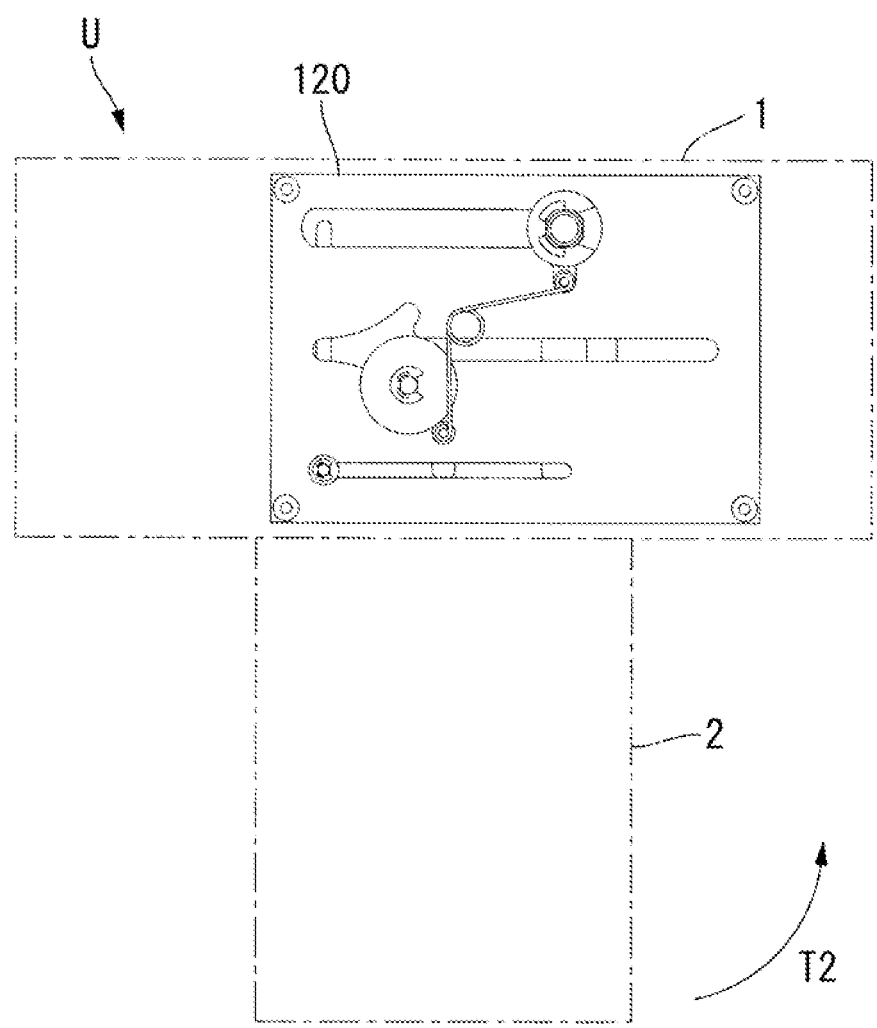
FIG. 66 is a top view of the slide mechanism of the third exemplary embodiment of the present invention in a state of having been rotated in the other direction side of the rotational direction and being in the second usage position.
Figure 67:
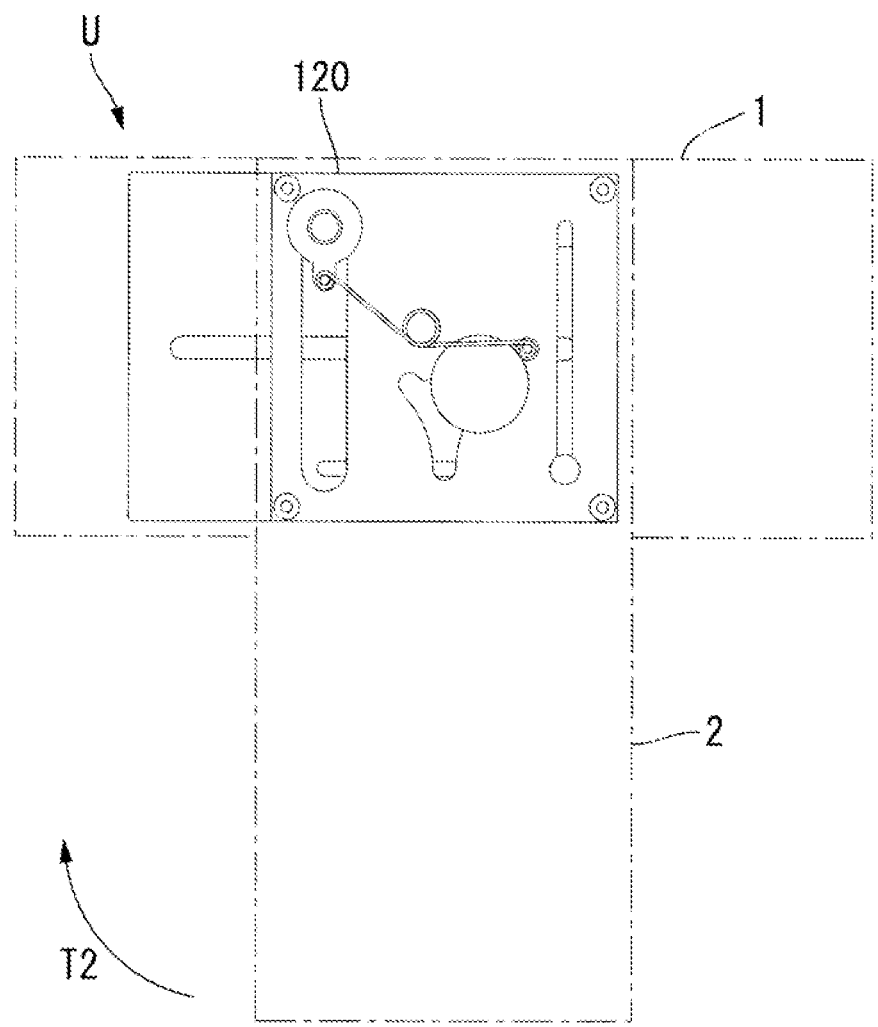
FIG. 67 is a bottom view of the slide mechanism of the third exemplary embodiment of the present invention in a state of having been rotated in the other direction side of the rotational direction and being in the second usage position.

The relationship between the auxiliary shaft 123, the fifth slit 131, and the sixth slit 132 in the case where the first casing section 2 and the second casing section 3 shift from the basic position P to the second usage position R, is described, with reference to FIG. 63A to FIG. 63C.

As shown in FIG. 63A, the auxiliary shaft 123 in the basic position P is restrained by the first slit end 131a of the fifth slit 131 and the first slit end 132a of the sixth slit 132. As shown in FIG. 63B, when the second slit member 22 slide-rotates to the one direction side T1 of the rotational direction, the auxiliary shaft 123 in the state of being restrained by the first slit end 131a moves within the sixth slit 132 from the first slit end 132a until it has come in contact with the third slit end 132c. Furthermore, having contacted with the third slit end 132c, the auxiliary shaft 123 in the state of being restrained by the third slit end 132c moves within the fifth slit 131 from the first slit end 131a to the third slit end 131c. As a result, as shown in FIG. 63C, in the second usage position R, the auxiliary shaft 123 is restrained by the third slit end 131c and the third slit end 132c.

Figure 68A:
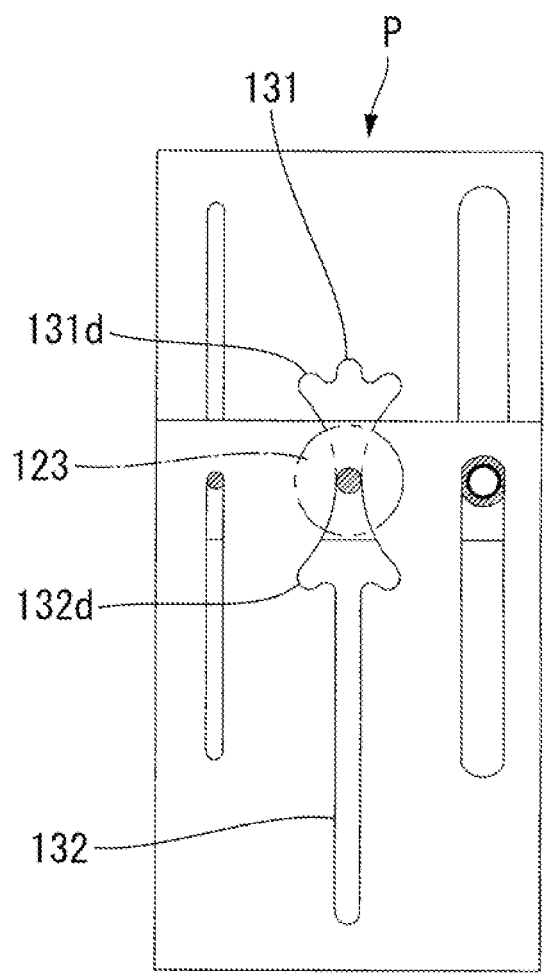
FIG. 68A is a cross-sectional view taken on the upper surface of the second slit member and seen from the underside, showing details of the auxiliary shaft of the slide mechanism of the third exemplary embodiment of the present invention in a state of being in the basic position.
Figure 68B:
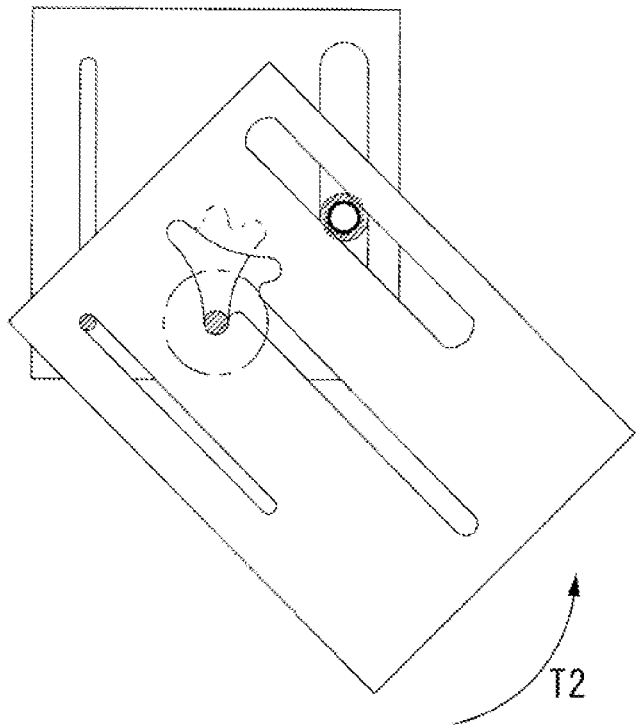
FIG. 68B is a cross-sectional view taken on the upper surface of the second slit member and seen from the underside, showing details of the auxiliary shaft of the slide mechanism of the third exemplary embodiment of the present invention in a state of being in the middle of shifting from the basic position to the fourth usage position.
Figure 68C:
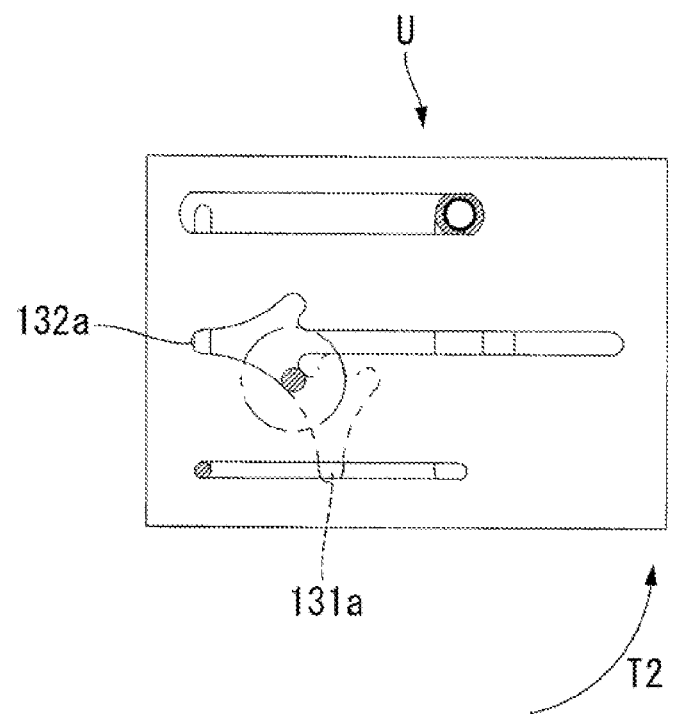
FIG. 68C is a cross-sectional view taken on the upper surface of the second slit member and seen from the underside, showing details of the auxiliary shaft of the slide mechanism of the third exemplary embodiment of the present invention in a state of being in the fourth usage position.
Figure 69:
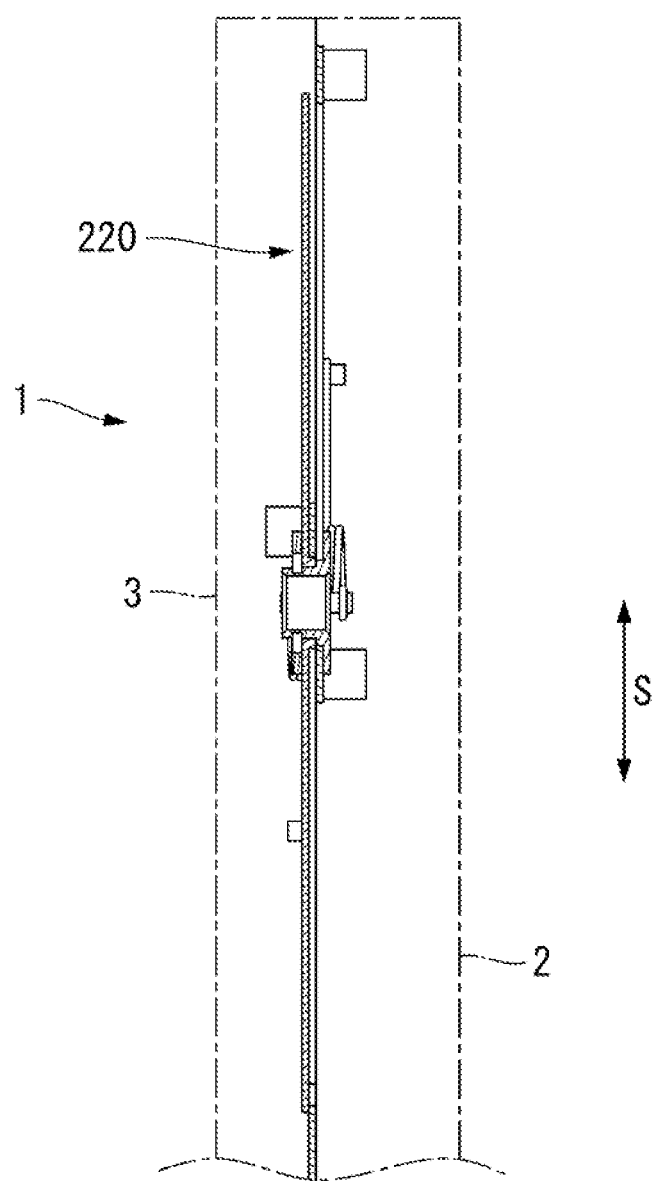
FIG. 69 is a cross-sectional view of a portable terminal of a fourth exemplary embodiment of the present invention in a state of being in the basic position, taken along the section line A-A in FIG. 1.
Figure 70:
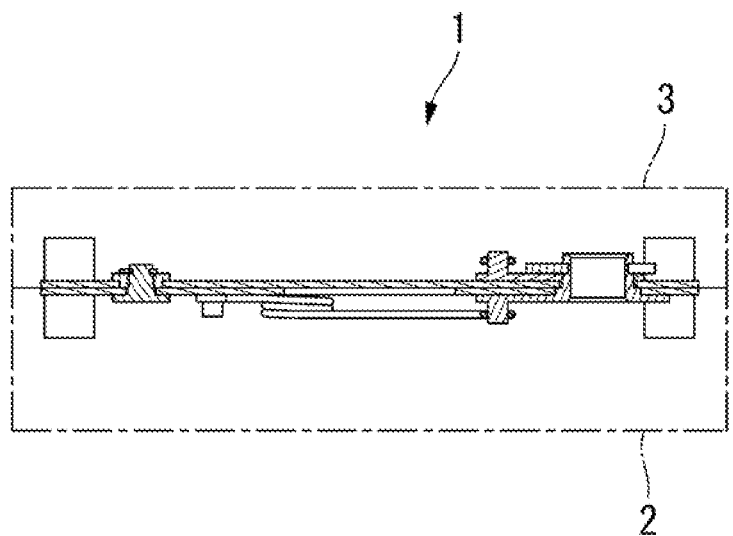
FIG. 70 is a cross-sectional view of the portable terminal of the fourth exemplary embodiment of the present invention in a state of being in the basic position, taken along the section line B-B in FIG. 1.
Figure 71A:
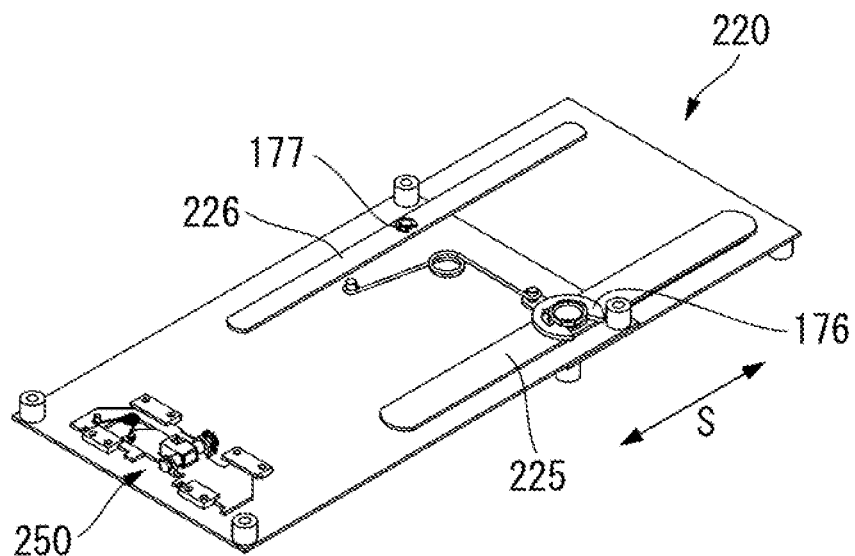
FIG. 71A is a perspective view of a slide mechanism of the fourth exemplary embodiment of the present invention in a state of being in the basic position.
Figure 71B:
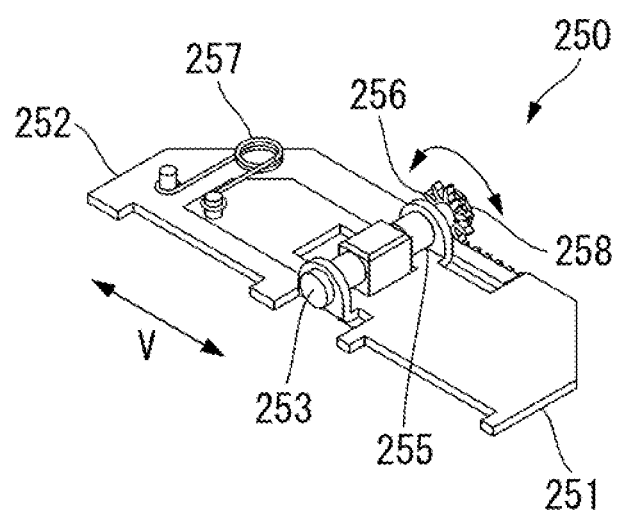
FIG. 71B is a perspective view of a lock mechanism of the fourth exemplary embodiment of the present invention.
Figure 72A:
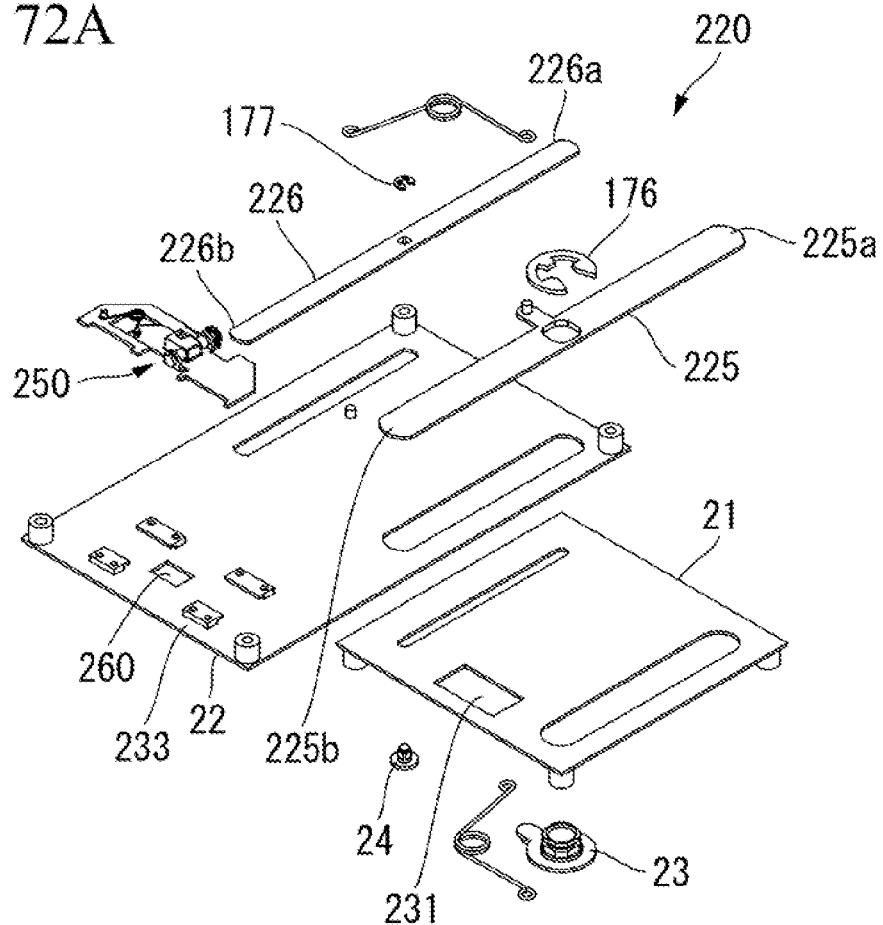
FIG. 72A is an exploded perspective view of the slide mechanism of the fourth exemplary embodiment of the present invention.
Figure 72B:
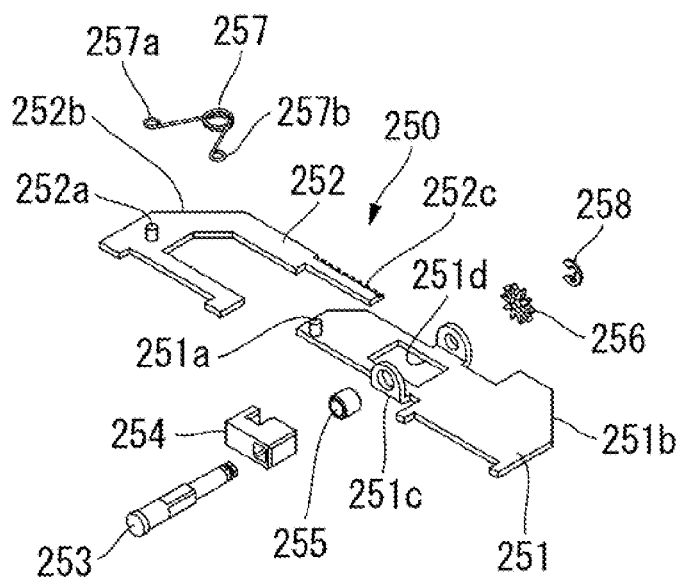
FIG. 72B is an exploded perspective view of the lock mechanism of the fourth exemplary embodiment of the present invention.
Figure 73:
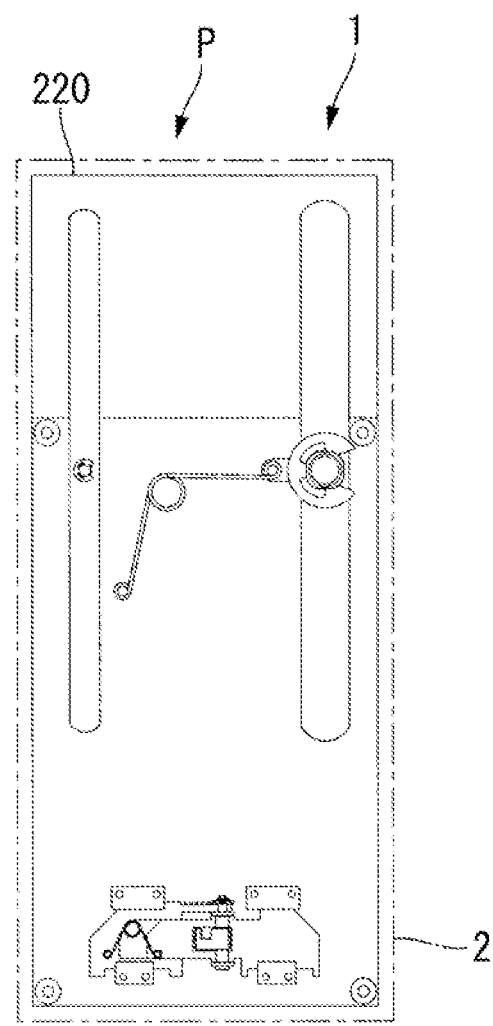
FIG. 73 is a top view of the slide mechanism of the fourth exemplary embodiment of the present invention in a state of being in the basic position.
Figure 74:
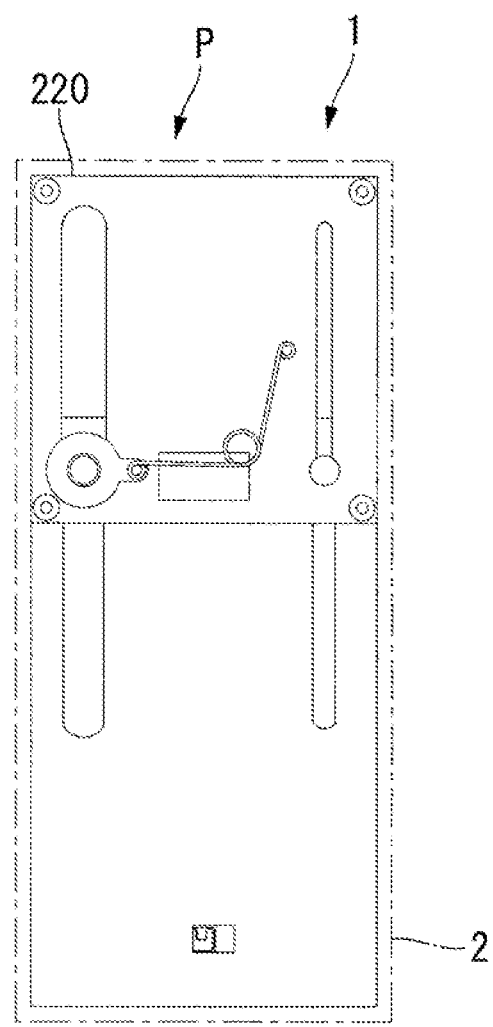
FIG. 74 is a bottom view of the slide mechanism of the fourth exemplary embodiment of the present invention in a state of being in the basic position.
Figure 75:
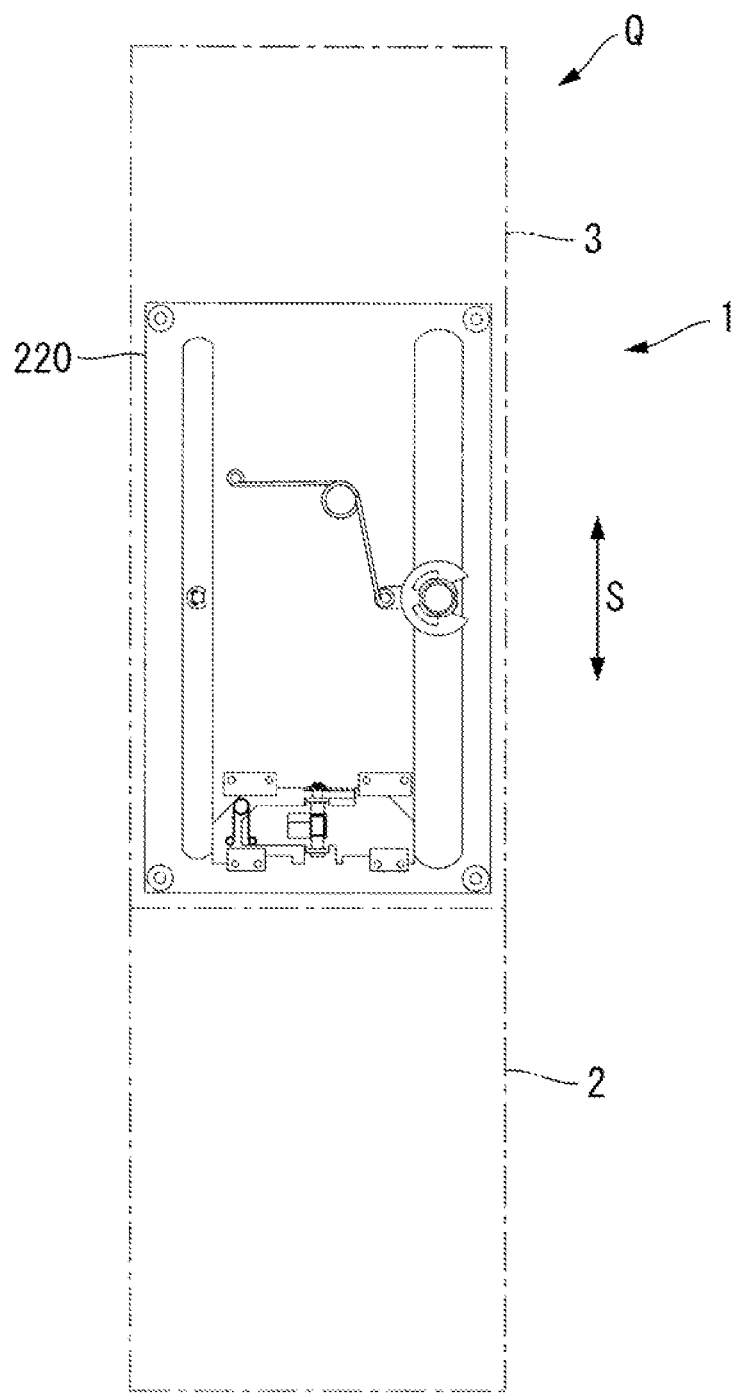
FIG. 75 is a top view of the slide mechanism of the fourth exemplary embodiment of the present invention in a state of being in the first usage position.
Figure 76:
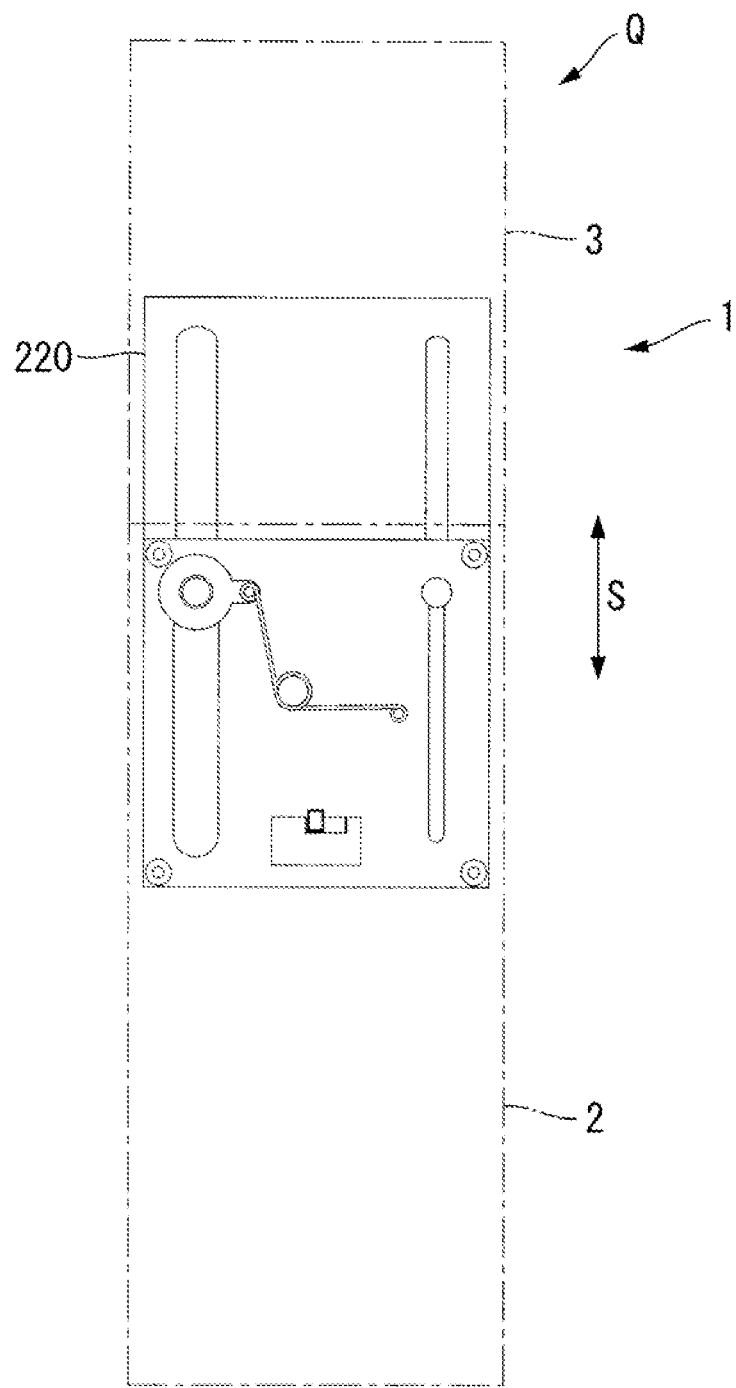
FIG. 76 is a bottom view of the slide mechanism of the fourth exemplary embodiment of the present invention in a state of being in the first usage position.

Next, the relationship between the auxiliary shaft 123, the fifth slit 131, and the sixth slit 132 in the case where the first casing section 2 and the second casing section 3 shift from the basic position P to the fourth usage position U, is described, with reference to FIG. 68A to FIG. 68C.

As shown in FIG. 68A, the auxiliary shaft 123 in the basic position P is restrained by the first slit end 131a of the fifth slit 131 and the first slit end 132a of the sixth slit 132. As shown in FIG. 68B, when the second slit member 22 slide-rotates to the other direction side T2 of the rotational direction, the auxiliary shaft 123 in the state of being restrained by the first slit end 131a moves within the sixth slit 132 from the first slit end 132a until it has come in contact with the fourth slit end 132d. Furthermore, having contacted with the fourth slit end 132d, the auxiliary shaft 123 in the state of being restrained by the fourth slit end 132d moves within the fifth slit 131 from the first slit end 131a to the fourth slit end 131d. As a result, as shown in FIG. 68C, in the fourth usage position U, the auxiliary shaft 123 is restrained by the fourth slit end 131d and the fourth slit end 132d.

As described above, in the third exemplary embodiment, the auxiliary shaft 123, the fifth slit 131, and the sixth slit 132 are added to the slide mechanism 120, without impairing the operation of the second casing section 3 with respect to the first casing section 2 in the first exemplary embodiment. With this configuration, when shifting from the basic position P to the first usage position Q, the connection between the first casing section 2 and the second casing section 3 is supported at three points by the first support shaft 23, the second support shaft 24, and the auxiliary shaft 123, and as a result, the first casing section 2 and the second casing section 3 can be connected more securely. As a result, it is possible to improve the level of so-called backlash prevention and forward-force-down strength.

The slide mechanism of the third exemplary embodiment is configured based on the slide mechanism of the first exemplary embodiment. However, a similar effect may be obtained by applying a similar configuration to the slide mechanism of the second exemplary embodiment.

Fourth Exemplary Embodiment

Next, a fourth exemplary embodiment of the present invention is described. A portable communication terminal of the fourth exemplary embodiment differs from the portable communication terminal of the first exemplary embodiment in that there is further provided a lock mechanism 250. With this configuration, the portable communication terminal of the fourth exemplary embodiment enables more secure connection between the first casing section 2 and the second casing section 3 when shifting from the basic position P to the first usage position Q, and it enables improvement in the level of so-called backlash prevention and forward-force-down strength.

FIG. 69 to FIG. 88C show the fourth exemplary embodiment of the present invention. In this exemplary embodiment, the common members used in the aforementioned exemplary embodiment are given the same reference symbols, and descriptions thereof are omitted.

There follows corresponding relationships between the diagrams used in the description of the fourth exemplary embodiment of the present invention, and the diagrams used in the description of the first exemplary embodiment. FIG. 69 to FIG. 76 correspond to FIG. 6 to FIG. 13. FIG. 79 to FIG. 82 correspond to FIG. 14 to FIG. 17. FIG. 84 to FIG. 87 correspond to FIG. 18 to FIG. 21. FIG. 77A to FIG. 77C, FIG. 78A to FIG. 78C, and FIG. 83A to FIG. 83C show details of a lock mechanism 250 provided in a portable communication terminal 1 of the fourth exemplary embodiment.

The configuration of the portable communication terminal 1 according to the fourth exemplary embodiment is basically similar to that of the portable communication terminal 1 of the first exemplary embodiment. Therefore, descriptions of FIG. 69 to FIG. 76, FIG. 79 to FIG. 82, and FIG. 84 to FIG. 87 are omitted.

As shown in FIG. 69 to FIG. 72, a slide mechanism 220 of this exemplary embodiment includes a lock mechanism 250 and rail members 233 in addition to the slide mechanism 20 of the first exemplary embodiment. In the first slit member 21, there is provided a lock receiving section 231 formed so as to pass through to both sides thereof. The lock receiving section 231 receives a lock member 254.

In the first exemplary embodiment, the first engagement member 25 and the second engagement member 26 are fitted respectively as a single component on the first support shaft 23 and the second support shaft 24. In the fourth exemplary embodiment, as a means for obtaining a similar effect, a first engagement member 225 and a second engagement member 226 are respectively fitted on the first support shaft 23 and the second support shaft 24 with an E type retaining ring 176 and an E type retaining ring 177.

The lock mechanism 250 includes a first slide member 251, a second slide member 252, a rotation shaft 253, a lock member 254, a spacer 255, a gear member 256, and a fourth spring member 257.

The first slide member 251 has a seventh supporting protuberance 251a, a contact section 251b, and a bearing section 251c. In the first slit member 251, there is provided an opening section 251d formed so as to pass through to both sides thereof. The seventh supporting protuberance 251a is of a substantially columnar shape. The contact section 251b is of an inclined surface which is inclined with respect to the movement direction S of the first engagement member 225. The bearing section 251c retains the rotation shaft 253 rotatably.

The second slide member 252 has an eighth supporting protuberance 252a, a contact section 252b, and a gear section 252c. The eighth supporting protuberance 252a is of a substantially columnar shape. The contact section 252b is of an inclined surface which is inclined with respect to the movement direction S of the second engagement member 226. The gear section 252c is a rack having teeth linearly attached thereon, and the circular gear member 256 interlocks therewith and rolls thereon.

The rail members 233 are provided on the second slit member 22.

The direction along the short edge 8b of the second casing section 3 is referred to as a second movement direction V. The movement direction S and the second movement direction V may be orthogonal to each other. The lock mechanism 250 is retained on the second slit member 22 by the rail members 233 so as to be capable of moving in the second movement direction V.

As the fourth spring member 257, a torsion coil spring is used for example.

The first spring member 257 is such that one end 257a thereof is fixed on the second slit member 252, and other end 257b thereof is fixed on the first support shaft 251. More specifically, the one end 257a of the fourth spring member 257 is wound on the eighth supporting protuberance 252a, and is attached thereon so as to be capable of rotating about the seventh supporting protuberance 252a. The other end 257a of the fourth spring member 257 is wound on the seventh supporting protuberance 251a, and is attached thereon so as to be capable of rotating about the seventh supporting protuberance 251a.

The seventh supporting protuberance 251a and the eighth supporting protuberance 252a are provided in positions distanced from each other in the second movement direction V. The eighth supporting protuberance 252a and the seventh supporting protuberance 251a are biased by the fourth spring member 257 so as to increase the distance therebetween.

The rotational direction which takes the center axis of the rotation shaft 253 as the rotation center thereof, is referred to as a second rotational direction. The rotational direction of the rotation shaft 253 when the second slide member 252 relatively approaches the first slide member 251, is referred to as one direction side W1 of the second rotational direction. Moreover, the rotational direction of the rotation shaft 253 when the second slide member 252 relatively moves away from the first slide member 251, is referred to as an other, second rotational direction side W1 of the second rotational direction.

On the rotation shaft 253, there are fixed, by an E type retaining ring, the gear member 256 and the lock member 254. The gear member 256 and the rotation member 254 are respectively attached on the rotation shaft 253 so as to be unable to relatively rotate with respect to the rotation shaft 253. Therefore, if the rotation shaft 253 rotates, the gear member 256 and the lock member 254 rotate to follow this rotation. Therefore, if the gear member 256 rolls on and moves on the gear section 252c, the lock member 254 rotates and follows this movement. To compare with the basic position P, in the first usage position Q, the rotation shaft 253 and the lock member 254 are set to rotate by 90 degrees to the one direction side W1 of the second rotational direction.

In the second slit member 21, there is provided an opening section 260 formed so as to pass through to both sides thereof. The opening section 251d of the first slide member 251, the opening section 260 of the second slit member 22, and the lock receiving section 231 of the first slit member 21 are respectively provided so that the lock member 254, the first slide member 251, the second slit member 22, and the first slit member 21 do not come in contact with the lock member 254 when the lock member 254 rotates by 90 degrees in the one direction W1 of the second rotational direction. The opening section 251d of the first slide member 251, the opening section 260 of the second slit member 22, and the lock receiving section 231 of the first slit member 21 are respectively positioned immediately below the lock member 254 in the state of the first usage position Q.

In the first usage position Q, the lock member 254 projects to a surface side of the first slit member 21 opposing to the first main surface 4 of the first casing section 2, through the opening section 251d of the first slide member 251, the opening section 260 of the second slit member 22, and the lock receiving section 231, which is an opening section of the first slit member 21. More specifically, the lock member 254 projects to this surface side of the first slit member 21 so as to sandwich the first slit member 21 and the second slit member 22 in the concave section thereof. Meanwhile, in the basic position P, the second usage position R, and the third usage position Q, the lock member 254 is positioned on a surface side of the second slit member 22 opposing to the slide surface 7 of the second casing section 3. That is to say, the lock member 254 does not project to the face side of the first slit member 21 opposing to the first main surface 4 of the first casing section 2.

As for the operations of the portable terminal 1 and the slide mechanism 220 of the fourth exemplary embodiment, there are described only points which differ from the first exemplary embodiment.

The operation of the lock mechanism 250 in the case where the first casing section 2 and the second casing section 3 shift from the basic position P to the first usage position Q, is described, with reference to FIG. 77A to FIG. 77C and FIG. 78A to FIG. 78C.

Figure 77A:
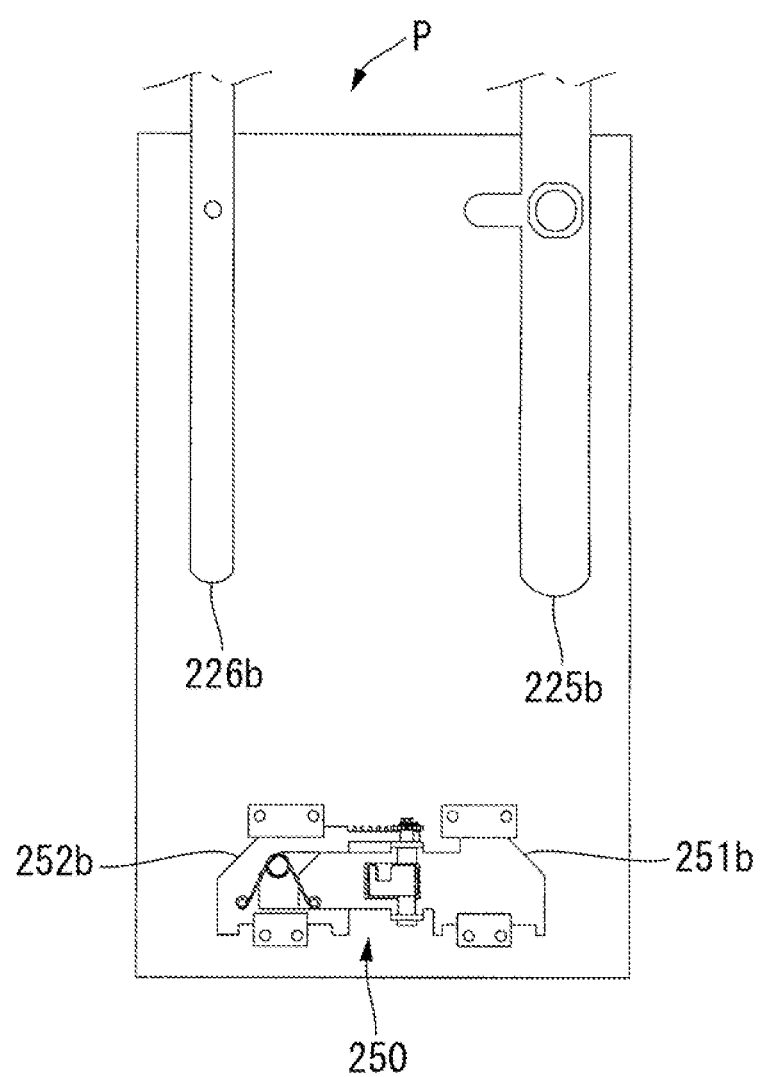
FIG. 77A is a cross-sectional view taken on the upper surface of the second slit member and seen from the underside, showing details of an auxiliary shaft of the slide mechanism of the fourth exemplary embodiment of the present invention in a state of being in the basic position.

When the first casing section 2 and the second casing section 3 are in the basic position P, the lock mechanism 250 is not in contact with neither the first engagement member 225 nor the second engagement member 226 as shown in FIG. 77A. Accordingly, in the basic position P, the lock mechanism 250 is brought to the state shown in FIG. 78A and FIG. 78B.

Figure 77B:
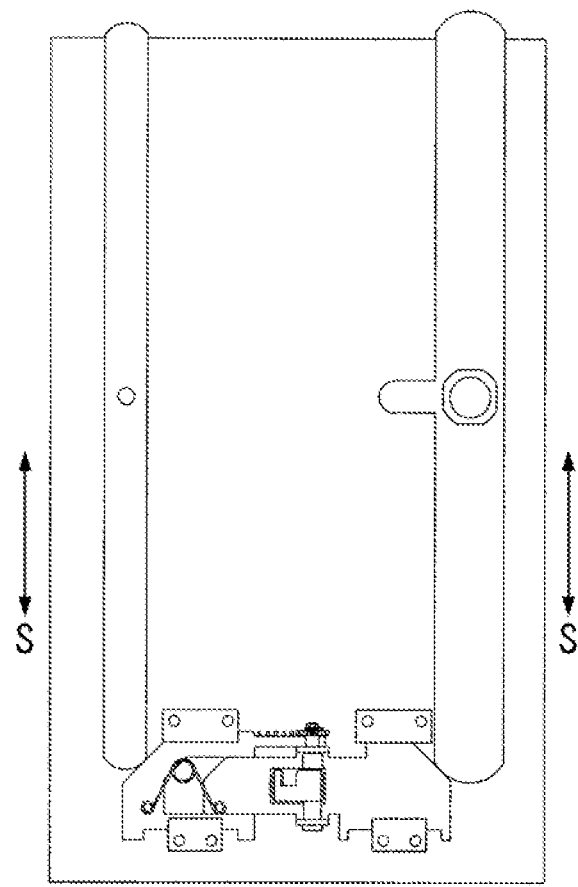
FIG. 77B is a cross-sectional view taken on the upper surface of the second slit member and seen from the underside, showing details of the auxiliary shaft of the slide mechanism of the fourth exemplary embodiment of the present invention in a state of being in the middle of shifting from the basic position to the first usage position.
Figure 77C:
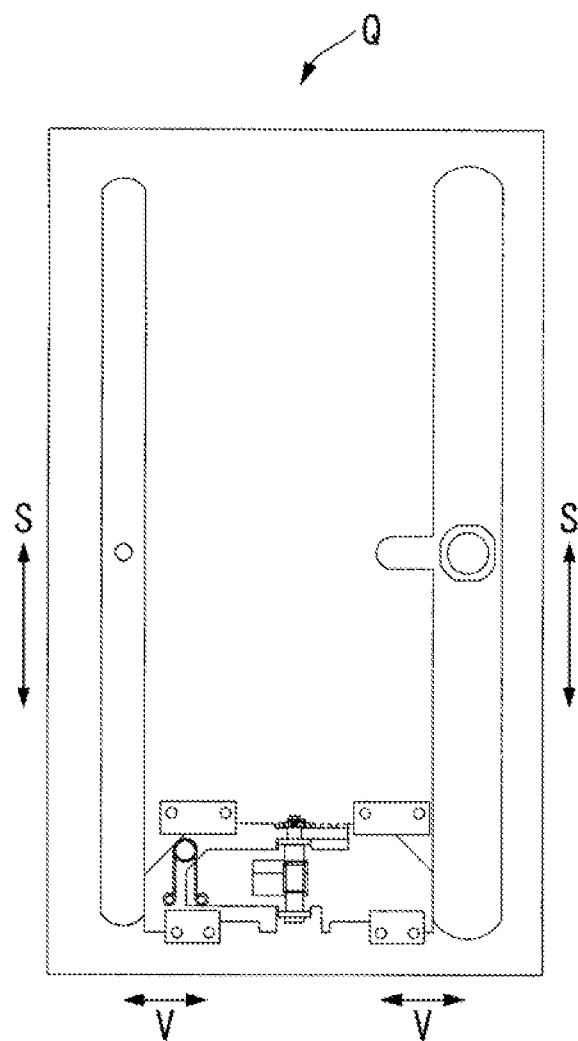
FIG. 77C is a cross-sectional view taken on the upper surface of the second slit member and seen from the underside, showing details of the auxiliary shaft of the slide mechanism of the fourth exemplary embodiment of the present invention in a state of being in the first usage position.
Figure 78A:
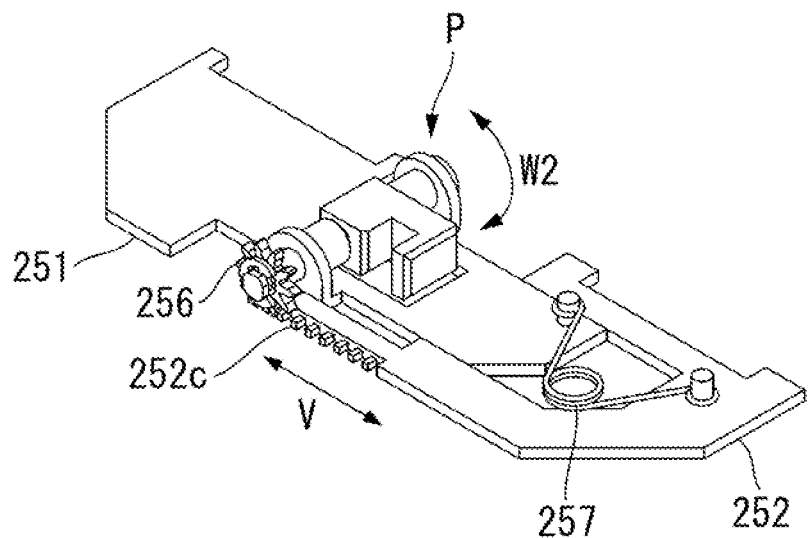
FIG. 78A is a perspective view of the lock mechanism of the fourth exemplary embodiment of the present invention in a state of being in the basic position.
Figure 78B:
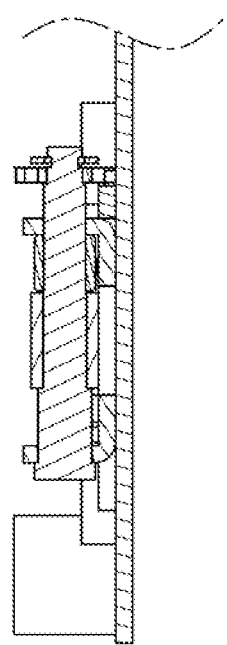
FIG. 78B is a cross-sectional view of the lock mechanism shown in FIG. 78A, taken along the axis of a rotation shaft.
Figure 78C:
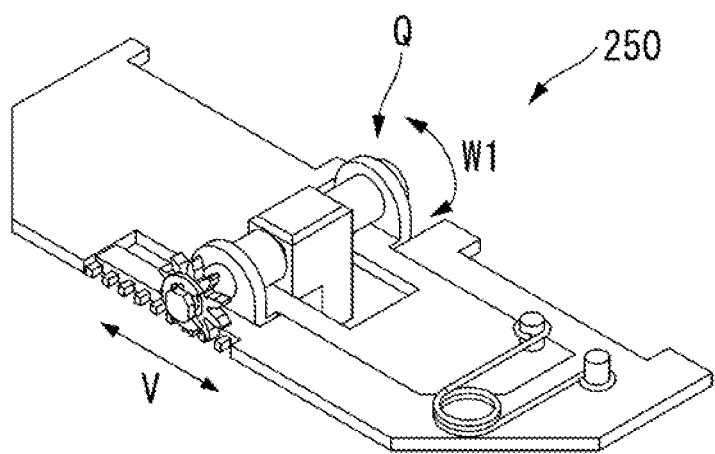
FIG. 78C is a perspective view of the lock mechanism of the fourth exemplary embodiment of the present invention in a state of being in the first usage position.
Figure 78D:
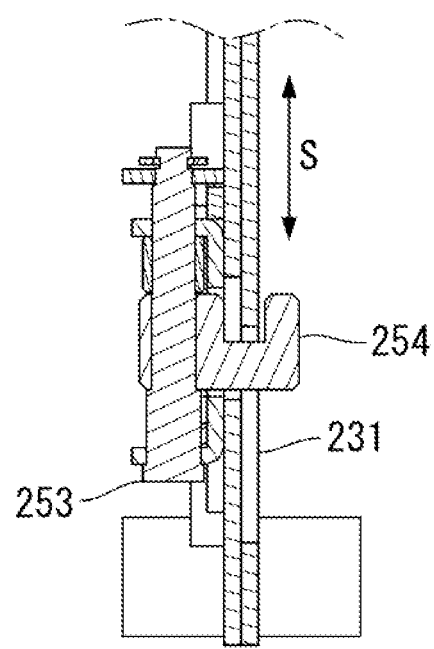
FIG. 78D is a cross-sectional view of the lock mechanism shown in FIG. 78C, taken along the axis of the rotation shaft.
Figure 79:
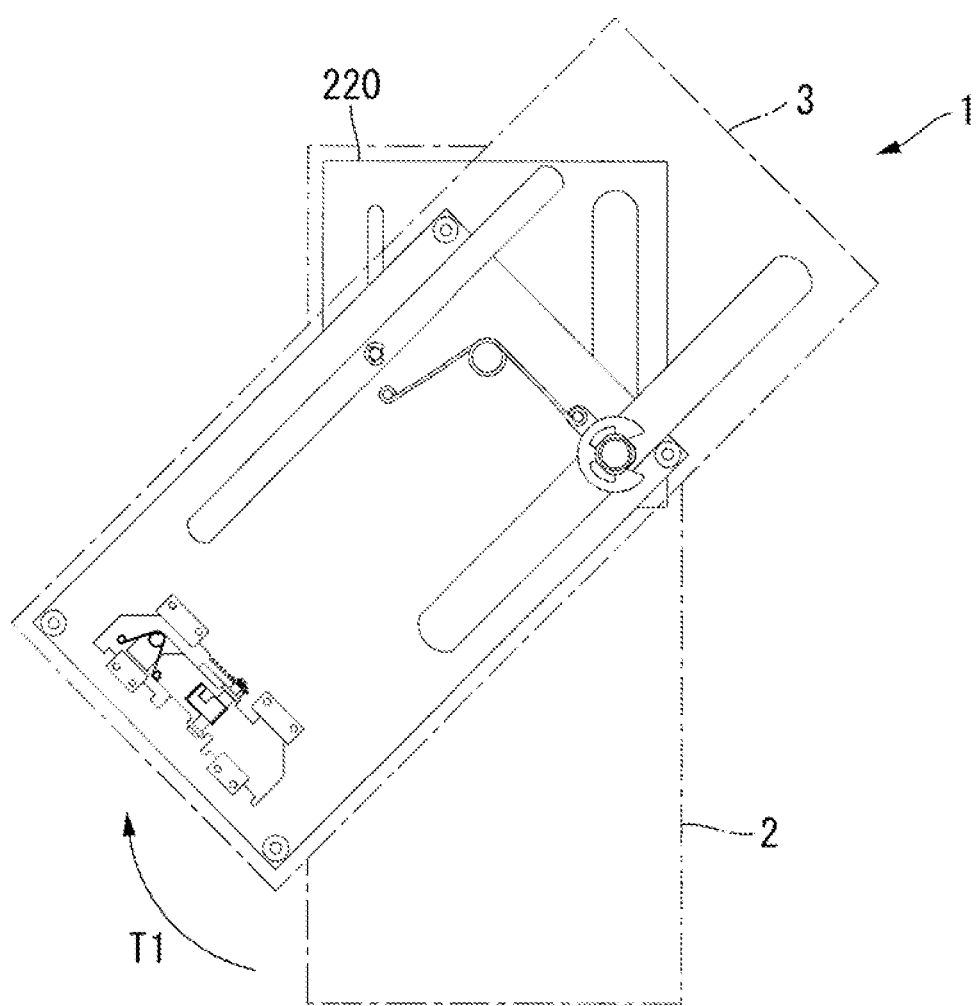
FIG. 79 is a top view of the slide mechanism of the fourth exemplary embodiment of the present invention in a state of being in the middle of rotating in the one direction side of the rotational direction.
Figure 80:
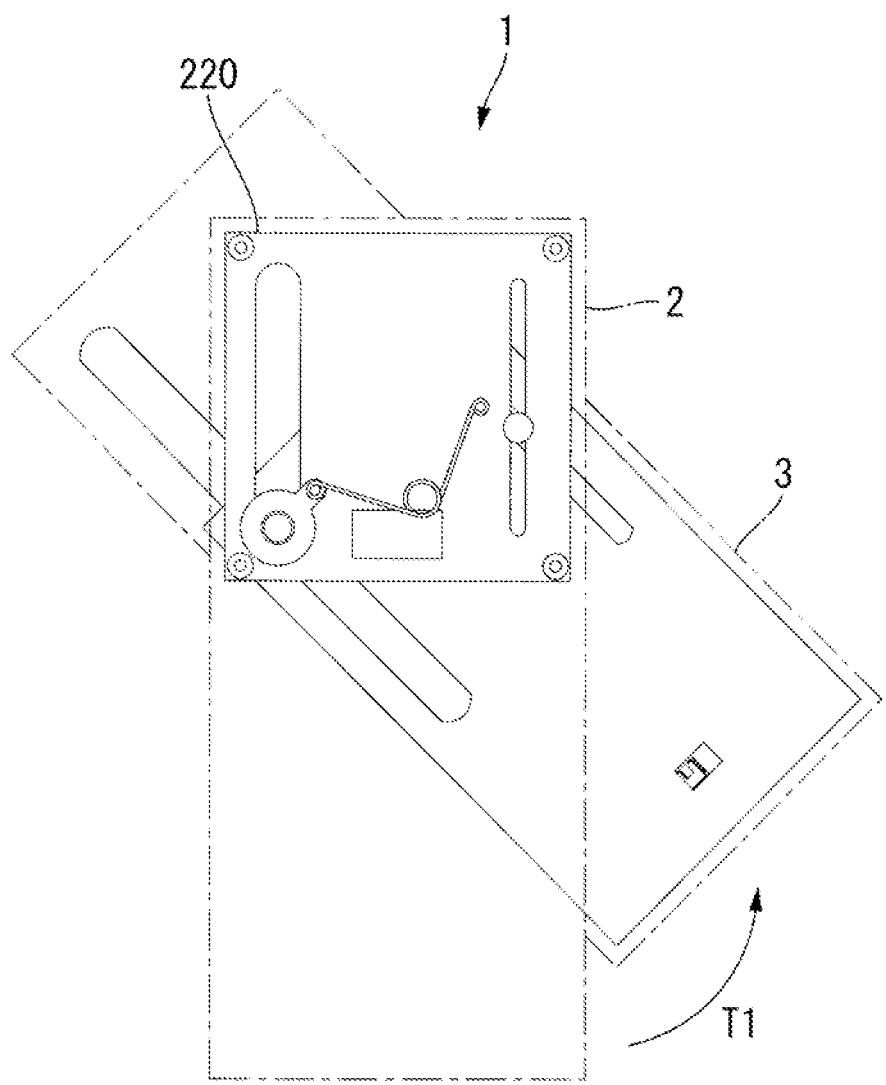
FIG. 80 is a bottom view of the slide mechanism of the fourth exemplary embodiment of the present invention in a state of being in the middle of rotating in the one direction side of the rotational direction.
Figure 81:
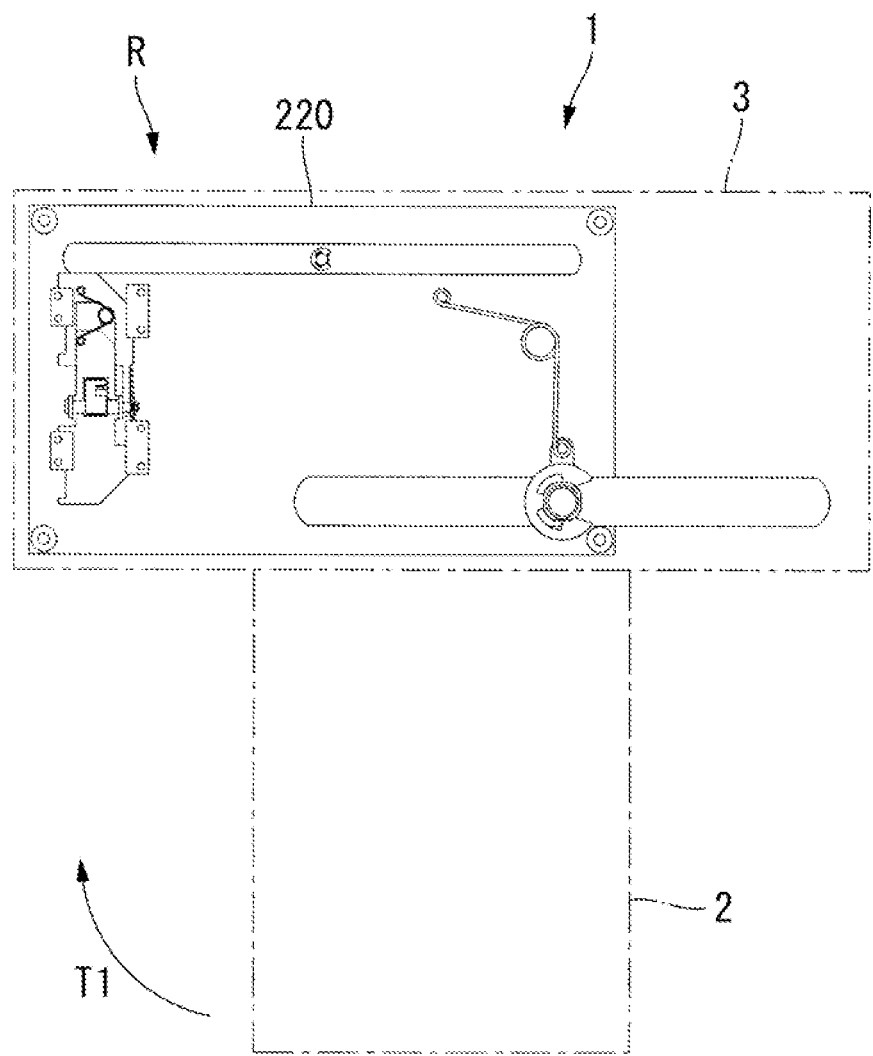
FIG. 81 is a top view of the slide mechanism of the fourth exemplary embodiment of the present invention in a state of having been rotated in the one direction side of the rotational direction and being in the second usage position.
Figure 82:
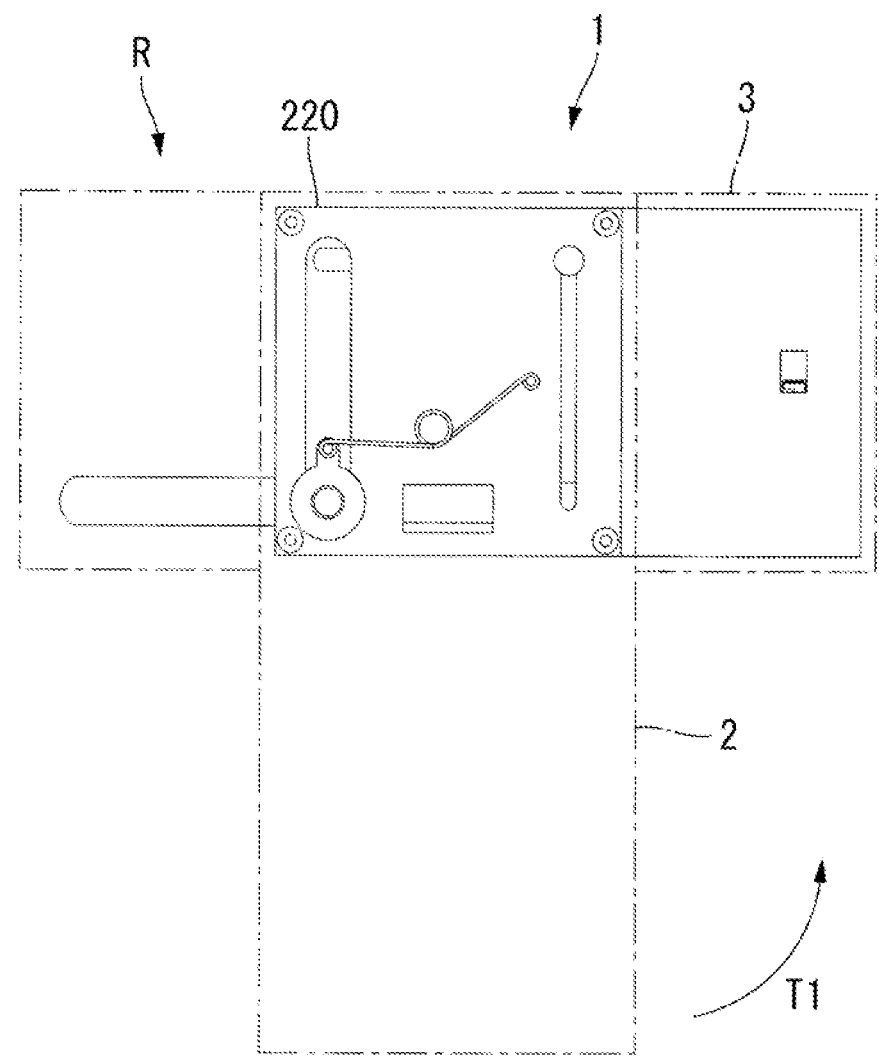
FIG. 82 is a bottom view of the slide mechanism of the fourth exemplary embodiment of the present invention in a state of having been rotated in the one direction side of the rotational direction and being in the second usage position.

There is described the state of the lock mechanism 250 where the first casing section 2 and the second casing section 3 are in the middle of shifting from the basic position P to the first usage position Q. In this case, as shown in FIG. 77B, in the lock mechanism 250, a contact section 225b of the first engagement member 225 and a contact section 251b of the first slide member 251 come in contact with each other, and similarly, a contact section 226b of the second engagement member 226 and a contact section 252b of the second slide member 252 come in contact with each other. When the contact section 225b and the contact section 226b further move in the advancing direction (movement direction S), a force is applied to the lock mechanism 250 respectively from the contact section 225b and the contact section 226b, in a direction of reducing the distance between the first slide member 251 and the second slide member 252. Consequently, the first slide member 251 and the second slide member 252 approach to each other in the second movement direction V along the rail members 233, against the force generated by the spring member 257. In response to this, the gear member 256 in contact with the gear section 252c, together with the lock member 254, enter the lock receiving section 231 while rotating about the rotation shaft 253 to the one direction side W1 of the second rotational direction, sandwiching the first slit member 21 and the second slit member 22. Accordingly, in the first usage position Q, the lock mechanism 250 is brought to the state shown in FIG. 78C and FIG. 78D.

Figure 83A:
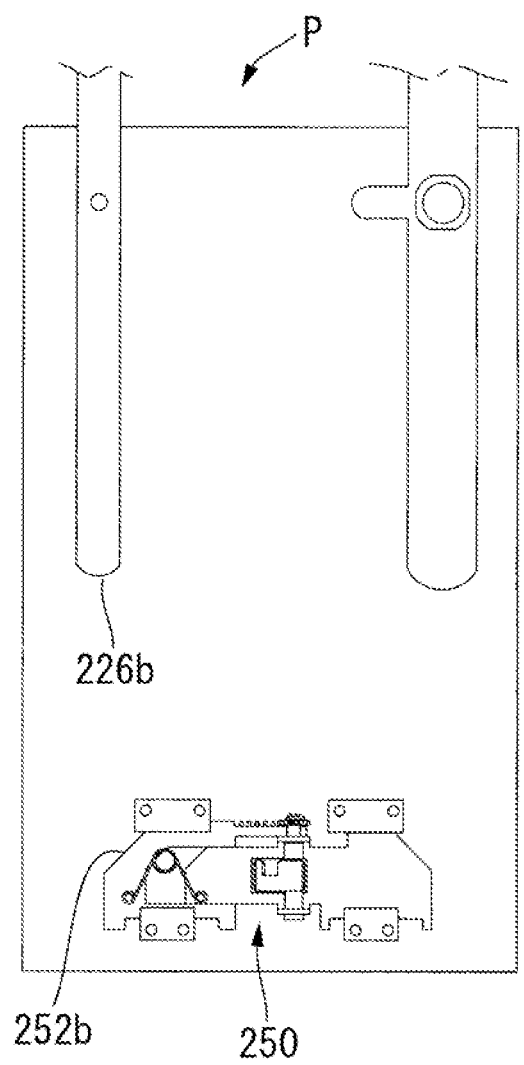
FIG. 83A is a cross-sectional view taken on the upper surface of the second slit member and seen from the underside, showing details of the auxiliary shaft of the slide mechanism of the fourth exemplary embodiment of the present invention in a state of being in the basic position.
Figure 83B:
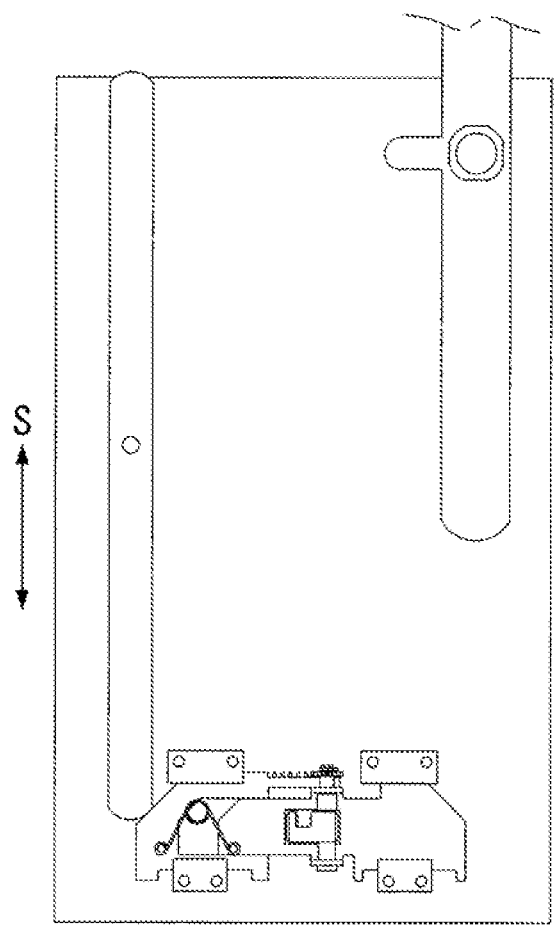
FIG. 83B is a cross-sectional view taken on the upper surface of the second slit member and seen from the underside, showing details of the auxiliary shaft of the slide mechanism of the fourth exemplary embodiment of the present invention in a state of being in the middle of shifting from the basic position to the second usage position.
Figure 83C:
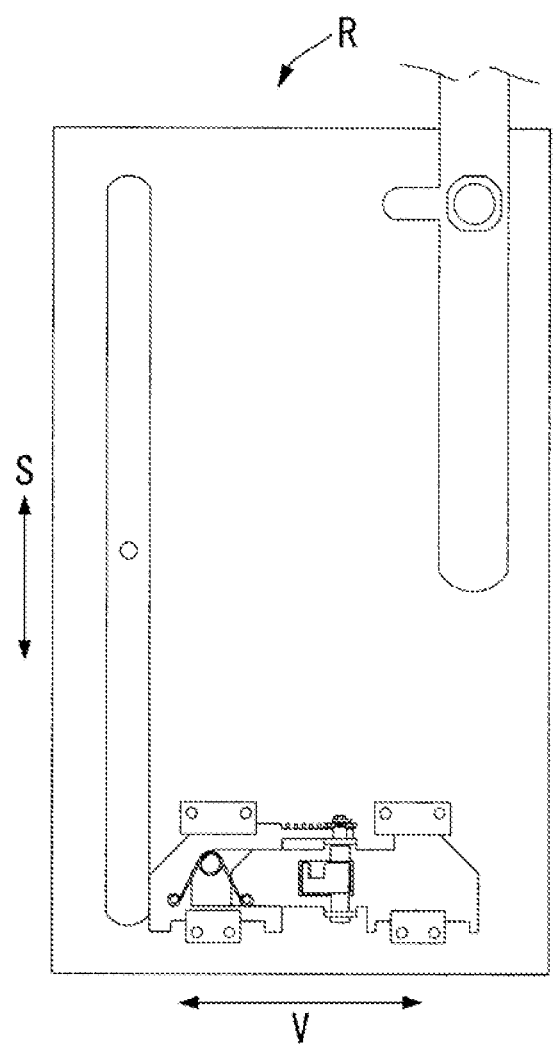
FIG. 83C is a cross-sectional view taken on the upper surface of the second slit member and seen from the underside, showing details of the auxiliary shaft of the slide mechanism of the fourth exemplary embodiment of the present invention in a state of being in the second usage position.
Figure 84:
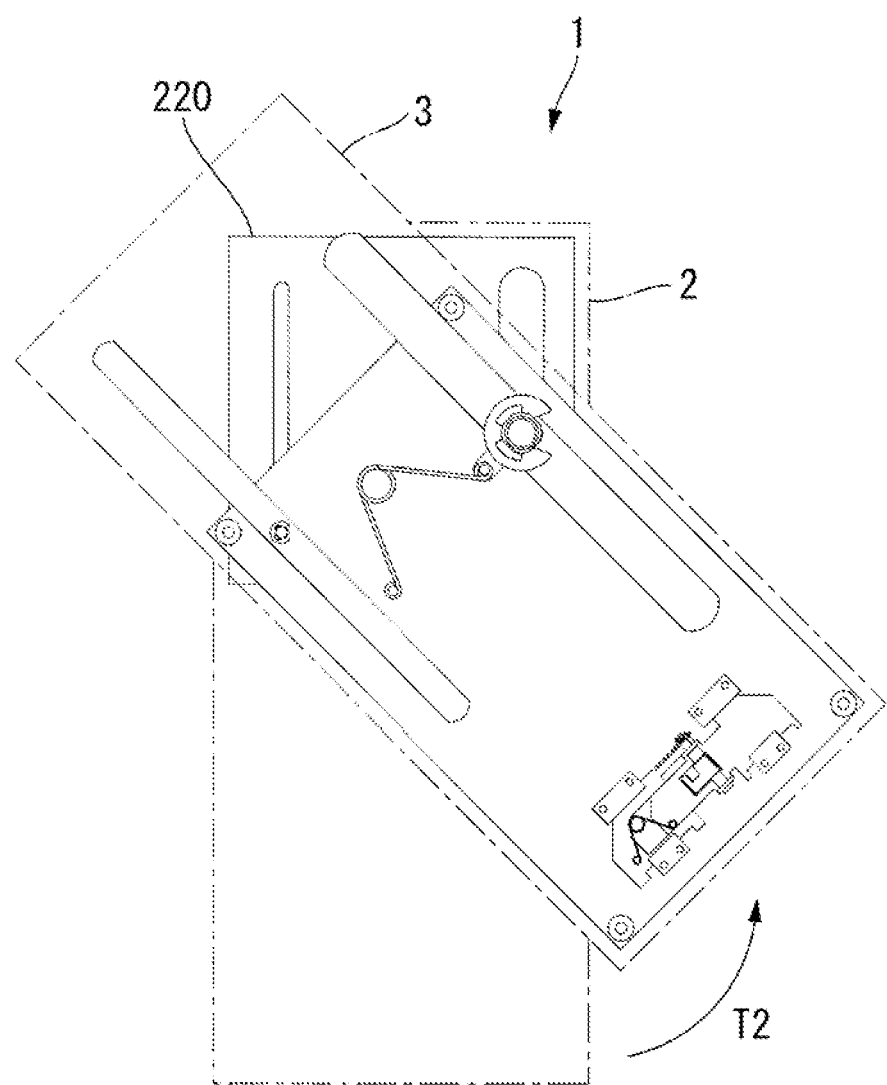
FIG. 84 is a top view of the slide mechanism of the fourth exemplary embodiment of the present invention in a state of being in the middle of rotating in the other direction side of the rotational direction.
Figure 85:
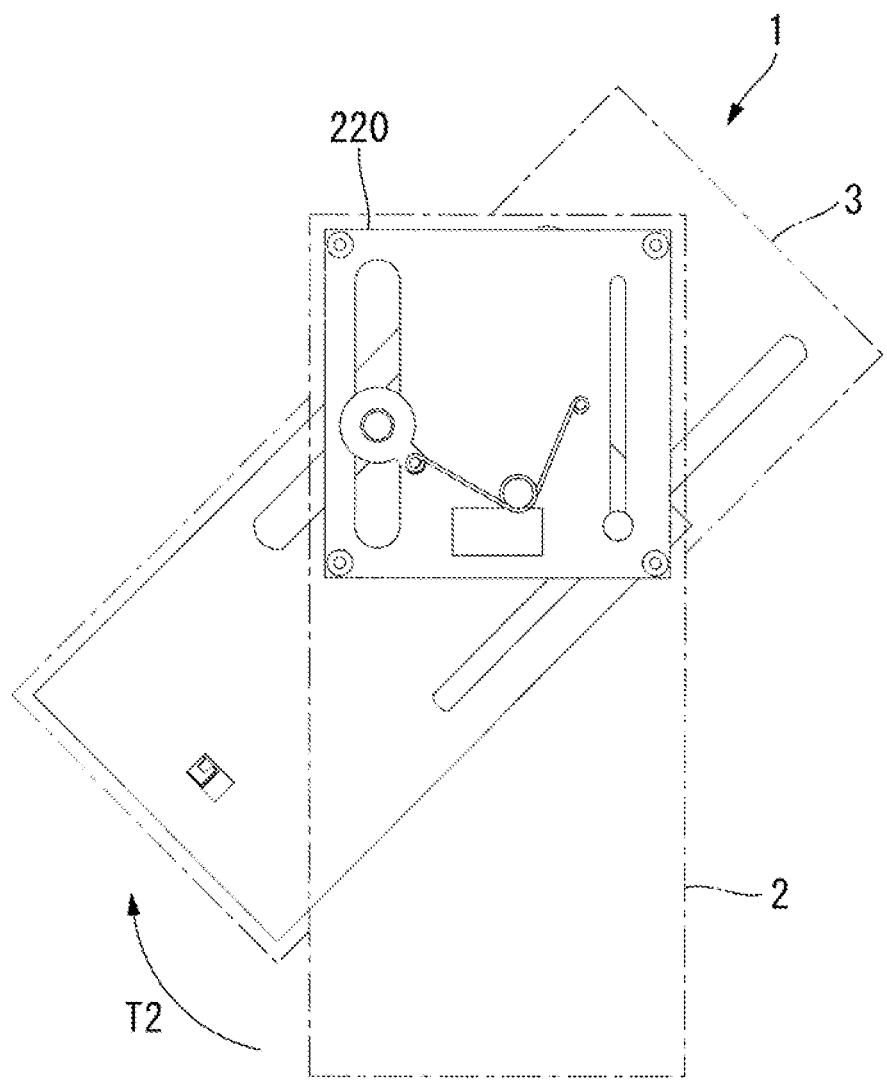
FIG. 85 is a bottom view of the slide mechanism of the fourth exemplary embodiment of the present invention in a state of being in the middle of rotating in the other direction side of the rotational direction.
Figure 86:
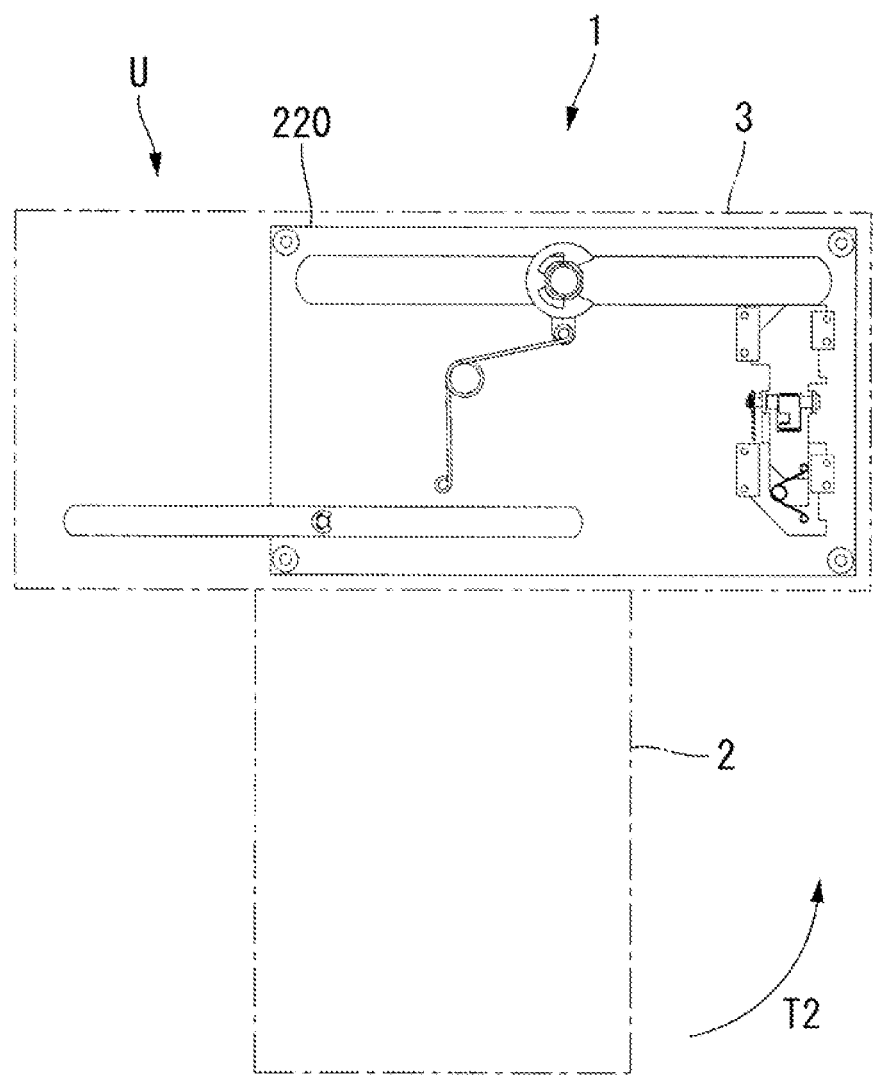
FIG. 86 is a top view of the slide mechanism of the fourth exemplary embodiment of the present invention in a state of having been rotated in the other direction side of the rotational direction and being in the second usage position.
Figure 87:
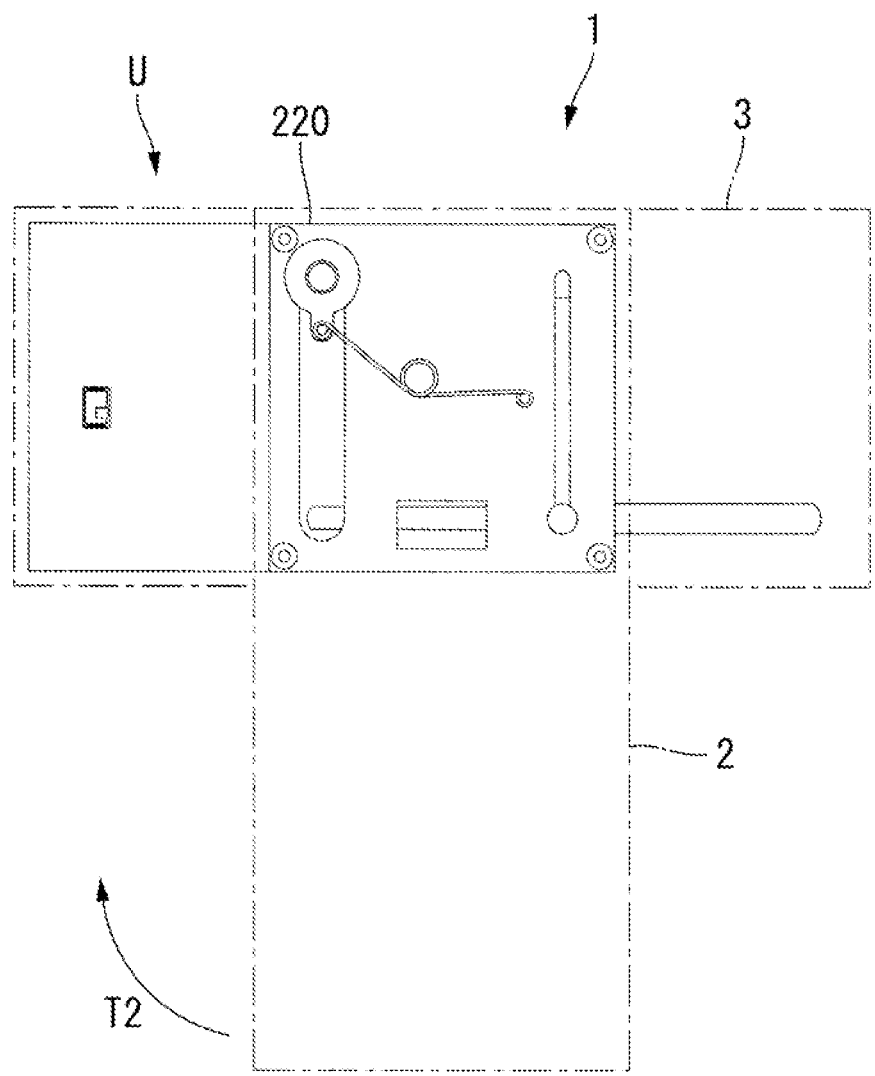
FIG. 87 is a bottom view of the slide mechanism of the fourth exemplary embodiment of the present invention in a state of having been rotated in the other direction side of the rotational direction and being in the second Usage position.

The operation of the lock mechanism 250 in the case where the first casing section 2 and the second casing section 3 shift from the basic position P to the second usage position R, is described, with reference to FIG. 83A to FIG. 83C.

When the first casing section 2 and the second casing section 3 are in the basic position P, the lock mechanism 250 is brought to the state shown in FIG. 83A as with the state described above.

There is described the state of the lock mechanism 250 where the first casing section 2 and the second casing section 3 are in the middle of shifting from the basic position P to the second usage position R. In this state, as shown in FIG. 83B, the contact section 226b of the second engagement member 226 and the contact section 252b of the second slide member 252 come in contact with each other. Consequently, the second slide member 252 moves along the rail members 232 in the second movement direction V. At this time, the contact section 225b of the first engagement member 225 and the contact section 251b of the first slide member 251 are not in contact with each other. Therefore, the first slide member 251 is able to move in the second movement direction V. As a result, the lock mechanism 250 moves in the second movement direction V while the positional relationship between the first slide member 251 and the second slide member 252 is retained by the spring member 257. Since the entire lock mechanism 250 moves in the second movement direction V in this manner, the lock member 254 does not rotate in the one direction W1 of the second rotational direction. Consequently, in the second usage position R, the lock mechanism 250 is brought to the state shown in FIG. 83C.

Figure 88A:
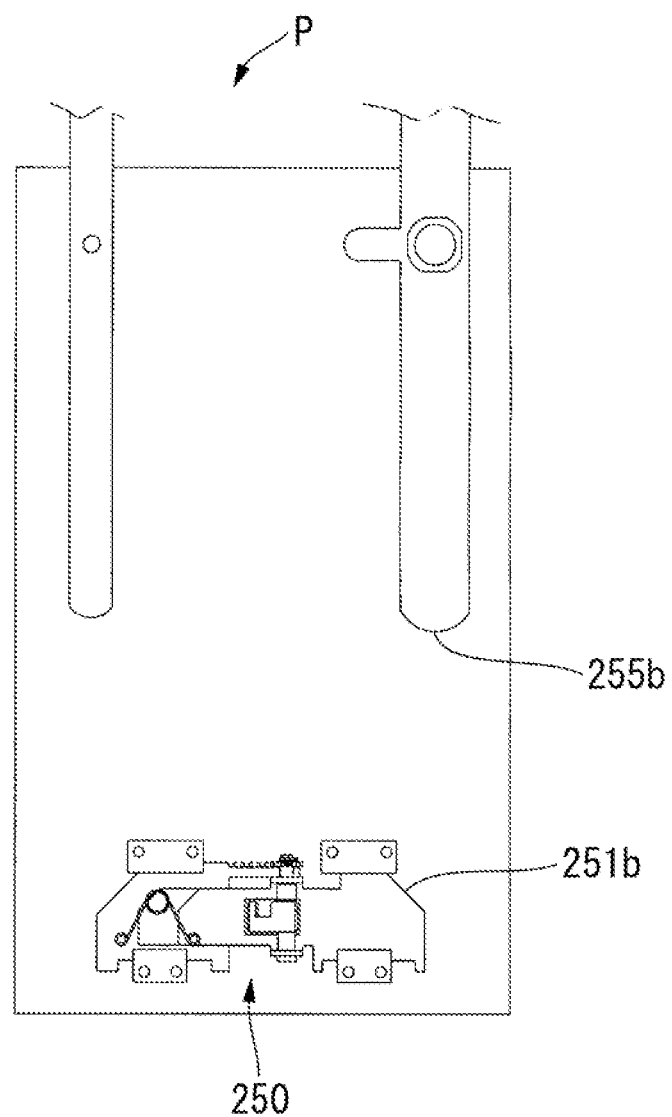
FIG. 88A is a cross-sectional view taken on the upper surface of the second slit member and seen from the underside, showing details of the auxiliary shaft of the slide mechanism of the fourth exemplary embodiment of the present invention in a state of being in the basic position.
Figure 88B:
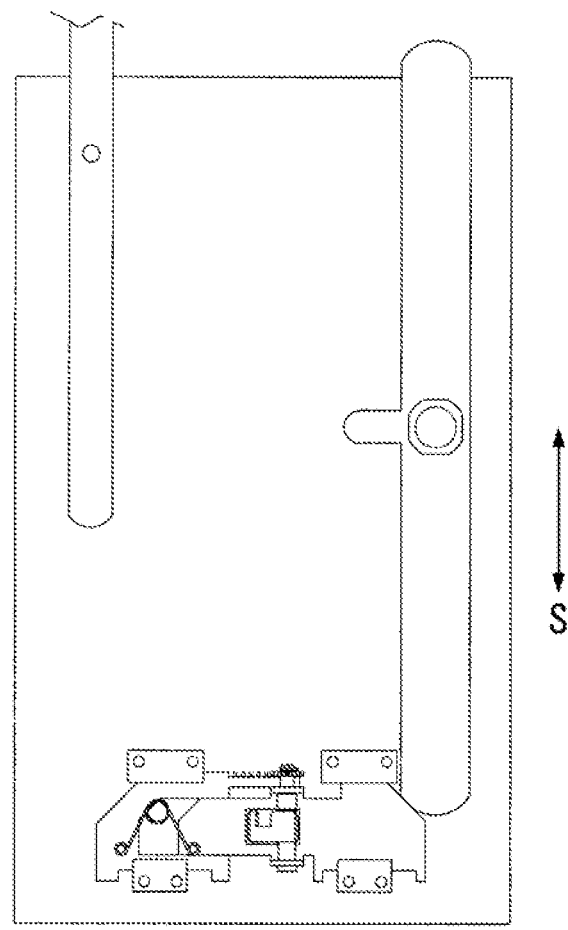
FIG. 88B is a cross-sectional view taken on the upper surface of the second slit member and seen from the underside, showing details of the auxiliary shaft of the slide mechanism of the fourth exemplary embodiment of the present invention in a state of being in the middle of shifting from the basic position to the fourth usage position.
Figure 88C:
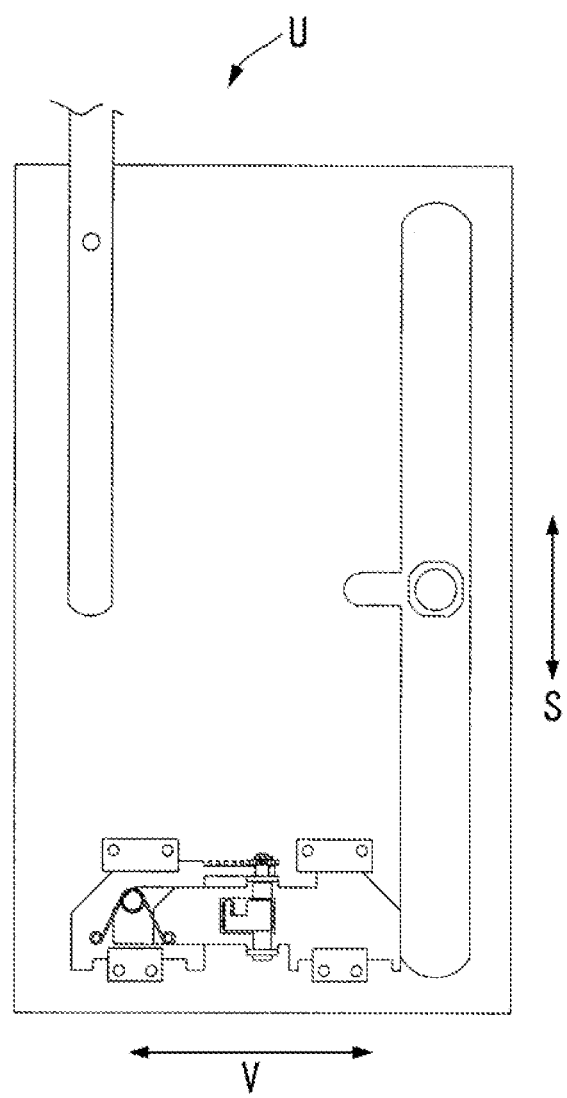
FIG. 88C is a cross-sectional view taken on the upper surface of the second slit member and seen from the underside, showing details of the auxiliary shaft of the slide mechanism of the fourth exemplary embodiment of the present invention in a state of being in the middle of shifting from the basic position to the fourth usage position.

The operation of the lock mechanism 250 in the case where the first casing section 2 and the second casing section 3 shift from the basic position P to the fourth usage position U, is described, with reference to FIG. 88A to FIG. 88C.

When the first casing section 2 and the second casing section 3 are in the basic position P, the lock mechanism 250 is brought to the state shown in FIG. 88A as with the state described above.

There is described the state of the lock mechanism 250 where the first casing section 2 and the second casing section 3 are in the middle of shifting from the basic position P to the fourth usage position U. In this state, as shown in FIG. 88B, the contact section 225b of the first engagement member 225 and the contact section 251b of the first slide member 251 come in contact with each other. Consequently, the first slide member 251 moves along the rail members 233 in the second movement direction V. At this time, the contact section 226b of the second engagement member 226 and the contact section 252b of the second slide member 252 are not in contact with each other. Therefore, the second slide member 252 is able to move in the second movement direction V. As a result, the lock mechanism 250 moves in the second movement direction V while the positional relationship between the first slide member 251 and the second slide member 252 is retained by the spring member 257. Since the entire lock mechanism 250 moves in the second movement direction V in this manner, the lock member 254 does not rotate in the one direction W1 of the rotational direction. Consequently, in the fourth usage position U, the lock mechanism 250 is brought to the state shown in FIG. 88C.

As described above, in the fourth exemplary embodiment, the lock mechanism 250 and the lock receiving section 231 are added to the slide mechanism 220, without impairing the operation of the second casing section 3 with respect to the first casing section 2 in the first exemplary embodiment. With this configuration, when shifting from the basic position P to the first usage position Q, the connection between the first casing section 2 and the second casing section 3 is supported at three points by the first support shaft 23, the second support shaft 24, and the lock member 254, and as a result, the first casing Section 2 and the second casing section 3 can be connected more securely. As a result, it is possible to improve the level of so-called backlash prevention and forward-force-down strength.

The slide mechanism of the fourth exemplary embodiment is configured based on the slide mechanism of the first exemplary embodiment. However, a similar effect may be obtained by applying a similar configuration to the slide mechanism of the second exemplary embodiment.

The exemplary embodiments of the present invention have been described in detail with reference to the diagrams. However, the specific configuration is not limited to these exemplary embodiments, and it may include design modifications without departing from the scope of the present invention.

The present application claims priority on Japanese Patent Application No. 2008-222680, filed Aug. 29, 2008, and Japanese Patent Application No. 2009-068724, filed Mar. 19, 2009, the contents of which are incorporated herein by reference.

INDUSTRIAL APPLICABILITY

The present invention may be applied to a slide mechanism, a portable communication terminal provided with the slide mechanism, and a slide movement method. According to this slide mechanism, the portable communication terminal provided with the slide mechanism, and the slide movement method, it is possible, with only a single operation, to relatively slide-move casing sections respectively from the position of a basic position to other positions of different usage states.

REFERENCE SYMBOLS 1, 40 Portable terminal
2 First casing section
3 Second casing section
4 First main surface (one surface)
5 First operation section (operation section)
7 Slide surface (one surface)
11 Display screen section
20, 50 Slide mechanism
21 First slit member
22 Second slit member
23, 51 First support shaft
24 Second support shaft
27 First spring member (retaining section)
28 Second spring member (retaining section)
31, 61 First slit
32 Second slit
33, 62 Third slit
34 Fourth slit
54 Third spring member (retaining section)
63 Slide section
64 Wide width section
65 Stopper section
70 Support shaft main body member
71 Support shaft auxiliary member
71b Guide hole
73a Engagement protuberance
120, 220 Slide mechanism
123 Auxiliary shaft
125 Third engagement member
131 Fifth slit
132 Sixth slit
225 First engagement member
225b Contact section
226 Second engagement member
226b Contact section
231 Lock receiving section
233 Rail member
250 Lock mechanism
251 First slide member
251b Contact section
252 Second slide member
252b Contact section
252c Gear section
253 Rotation shaft
254 Lock member
256 Gear member
257 Spring member
P Basic position
Q First usage position
Q' Third usage position
R Second usage position
S Movement direction (first movement direction)
T1 One direction side of the rotational direction (One direction side of the second rotational direction)
T2 Other direction side of the rotational direction (Other direction side of the second rotational direction)
U Fourth usage position
V Second movement direction
W1 One direction side of the rotational direction
W2 Other direction side of the rotational direction

The invention claimed is:

1. A slide mechanism provided between a first casing section and a second casing section arranged so that one surfaces thereof face each other, and that is capable of, with respect to the first casing section, relatively moving the second casing section, on the one surface of the first casing section, from a basic position, the slide mechanism comprising:
a first slit which extends along a predetermined linear movement direction on the one surface of the first casing section;
a second slit which extends in parallel with the first slit on the one surface of the first casing section;
a third slit which extends on the one surface of the second casing section so as to correspond to the first slit;
a fourth slit which extends on the one surface of the second casing section so as to correspond to the second slit;
a first support shaft which is inserted in the first slit and the third slit, is rotatable about its axis with respect to at least either one of the first slit and the third slit, and is movable along the first slit and the third slit; and
a second support shaft which is inserted in the second slit and the fourth slit, is rotatable about its axis with respect to at least either one of the second slit and the fourth slit, and is movable along the second slit and the fourth slit.

2. The slide mechanism according to claim 1, movement of the first support shaft, and a slit end of at least either one of the second slit and the fourth slit restricts movement of the second support shaft, so that the amount of movement in the movement direction and the rotation angle about the axis of each of the first support shaft and the second support shaft are restricted.

3. The slide mechanism according to claim 1, further comprising:
a retaining section which retains at least either one of the first support shaft and the second support shaft while it is in a state of being positioned at a slit end of corresponding one of at least either one of the first slit and the third slit, or at least either one of the second slit and the fourth slit.

4. The slide mechanism according to claim 3,
wherein the retaining section is a biasing member which biases at least either one of the first support shaft and the second support shaft toward the slit end of the corresponding one of at least either one of the first slit and the third slit, or at least either one of the second slit and the fourth slit.

5. The slide mechanism according to claim 1 wherein:
the first slit and the second slit are formed in a first slit member fixed on the first casing section; and
the third slit and the fourth slit are formed in a second slit member fixed on the second casing section.

6. The slide mechanism according to claim 1,
wherein in at least either one of the first support shaft and the second support shaft, a through hole is formed, inside which a conductive wire for electrically connecting between the first casing section and the second casing section can be inserted.

7. The slide mechanism according to claim 1,
wherein either one of the first support shaft and the second support shaft includes an oval rotation restriction section which is inserted into two corresponding slits, either the first slit and the third slit or the second slit and the fourth slit, and which includes a minor diameter approximately equal to a width of the slit to be inserted, and a major diameter greater than the width of the silt to be inserted.

8. The slide mechanism according to claim 1, wherein:
either one slit in at least either one pair of the first slit and the third slit, and the second slit and the fourth slit, includes a slide section which extends along the movement direction on corresponding one surface of the first casing section or the second casing section, and a wide width section which is formed with a wide width, at a position on the slide section serving as a rotation center; and
the first support shaft or the second support shaft corresponding to the either slit, includes: a support shaft main body member having a rotation restriction section which is rotatably inserted in the wide width section in the basic position, and is able to move forward and backward in the movement direction within the slide section while rotation thereof is restricted; and a supporting auxiliary member which is concentrically arranged so as to be able to rotate about its axis to only one direction side from a state of the basic position with respect to the support shaft main body, is able to move forward and backward in the movement direction within the other corresponding slit while rotation thereof is restricted.

9. The slide mechanism according to claim 8, further comprising:
an engagement protuberance which is provided on either one of the support shaft main body member and the support shaft auxiliary member; and
a guide hole which is provided along a circumferential direction of the other of the support shaft main body member and the support shaft auxiliary member, and in which the engagement protuberance is inserted so as to be able to move forward and backward along the circumferential direction,
wherein the engagement protuberance engages with one end section of the guide hole, so that the support shaft main body member and the support shaft auxiliary member are restricted from rotating about their axes to an other direction from the basic position, and the engagement protuberance engages with an other end section of the guide hole, so that the support shaft main body member and the support shaft auxiliary member are restricted from rotating about their axes to one direction.

10. The slide mechanism according to claim 8,
wherein on the wide width section of the slit section, a stopper section is provided which restricts the rotation restriction section of the support shaft main body member at a predetermined rotation position.

11. The slide mechanism according to claim 10,
wherein the stopper section restrict the support shaft main body member so as to be rotatable only in one direction from an orientation in which it is able to move forward and backward within the slide section, and restricts the support shaft main body member so as to be rotatable in the one direction to the rotation position.

12. A portable communication terminal comprising:
a slide mechanism according to claim 1, and
the first casing section and the second casing connected by the slide mechanism so as to be movable relatively,
an operation section is provided on the one surface of one of the first casing section and the second casing section, and a display screen section is provided on an other surface on the opposite side of the one surface of the other one.

13. A slide movement method for relatively moving a second casing section on one surface of the first casing section with respect to a first casing section, the second casing section arranged so that one surface of the second casing section is opposed to a the one surface of the first casing section, the method comprising:

relatively rotating the second casing section with respect to the first casing section, about a first support shaft serving as a predetermined rotation center on the one surface of the first casing section;

moving a second support shaft within a first slit at the same time as relatively rotating the second casing section, the first slit extending along a predetermined linear movement direction on the one surface of the first casing section, a position of the second support shaft differing from a position of the first support shaft; and moving the second support shaft axis within a second slit at the same time as relatively rotating the second casing section, the second slit extending on the one surface of the second casing section so as to correspond to the first slit.

\* \* \* \* \*